United States Patent
Iima et al.

(10) Patent No.: US 7,818,556 B2
(45) Date of Patent: Oct. 19, 2010

(54) STORAGE APPARATUS, CONTROL METHOD, AND CONTROL DEVICE WHICH CAN BE RELIABLY STARTED UP WHEN POWER IS TURNED ON EVEN AFTER THERE IS AN ERROR DURING FIRMWARE UPDATE

(75) Inventors: Hirotaka Iima, Kawasaki (JP); Hiroshi Tsurumi, Kawasaki (JP); Masataka Shitara, Kawasaki (JP); Katsushi Ohta, Kawasaki (JP); Masaaki Tamura, Kawasaki (JP); Yasuyuki Nagashima, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 659 days.

(21) Appl. No.: 11/881,002

(22) Filed: Jul. 25, 2007

(65) Prior Publication Data
US 2008/0052506 A1    Feb. 28, 2008

Related U.S. Application Data

(63) Continuation-in-part of application No. 11/643,216, filed on Dec. 21, 2006, now abandoned.

(30) Foreign Application Priority Data

Aug. 28, 2006   (JP) ............................. 2006-230303
Mar. 30, 2007   (JP) ............................. 2007-090976

(51) Int. Cl.
*G06F 9/00*    (2006.01)
*G06F 1/00*    (2006.01)
*G06F 11/00*   (2006.01)

(52) U.S. Cl. ................................ 713/1; 713/100; 714/6
(58) Field of Classification Search ...................... 713/1
See application file for complete search history.

(56) References Cited

U.S. PATENT DOCUMENTS

| 6,192,484 | B1 * | 2/2001 | Asano ......................... 714/6 |
| 6,708,231 | B1 * | 3/2004 | Kitagawa ..................... 710/10 |
| 6,816,950 | B2 * | 11/2004 | Nichols ....................... 711/162 |
| 6,907,504 | B2 * | 6/2005 | Burton et al. ............... 711/162 |

(Continued)

FOREIGN PATENT DOCUMENTS

JP    11-328040    11/1999

(Continued)

*Primary Examiner*—Suresh K Suryawanshi
(74) *Attorney, Agent, or Firm*—Greer, Burns & Crain, Ltd.

(57) ABSTRACT

Firmware FW1 and FW2 is separately stored in a non-volatile memory, in which a boot code for start-up and a restoration code are stored, and a first magnetic disk. A copy of the firmware FW1 stored in the non-volatile memory is stored in the first magnetic disk, and a copy of the entire firmware FW1 and FW2 stored in the first disk medium is stored in the second magnetic disk. When an error occurs during firmware update, upon next power-on, whether the volatile memory, the first magnetic disk, and the second magnetic disk are normal or abnormal is determined, and valid firmware is read and allocated to the volatile memory so as to perform start-up by a start-up mode corresponding to the determination contents.

24 Claims, 49 Drawing Sheets

| U.S. PATENT DOCUMENTS | | | | |
|---|---|---|---|---|
| 7,028,177 B2 * | 4/2006 | Schultz et al. | | 713/100 |
| 7,043,664 B1 * | 5/2006 | Chiloyan | | 714/5 |
| 7,594,135 B2 * | 9/2009 | Gonzalez et al. | | 714/5 |
| 7,600,224 B2 * | 10/2009 | Obayashi et al. | | 717/168 |

| FOREIGN PATENT DOCUMENTS | | |
|---|---|---|
| JP | 2005-038716 | 2/2005 |
| JP | 2005-063050 | 3/2005 |

\* cited by examiner

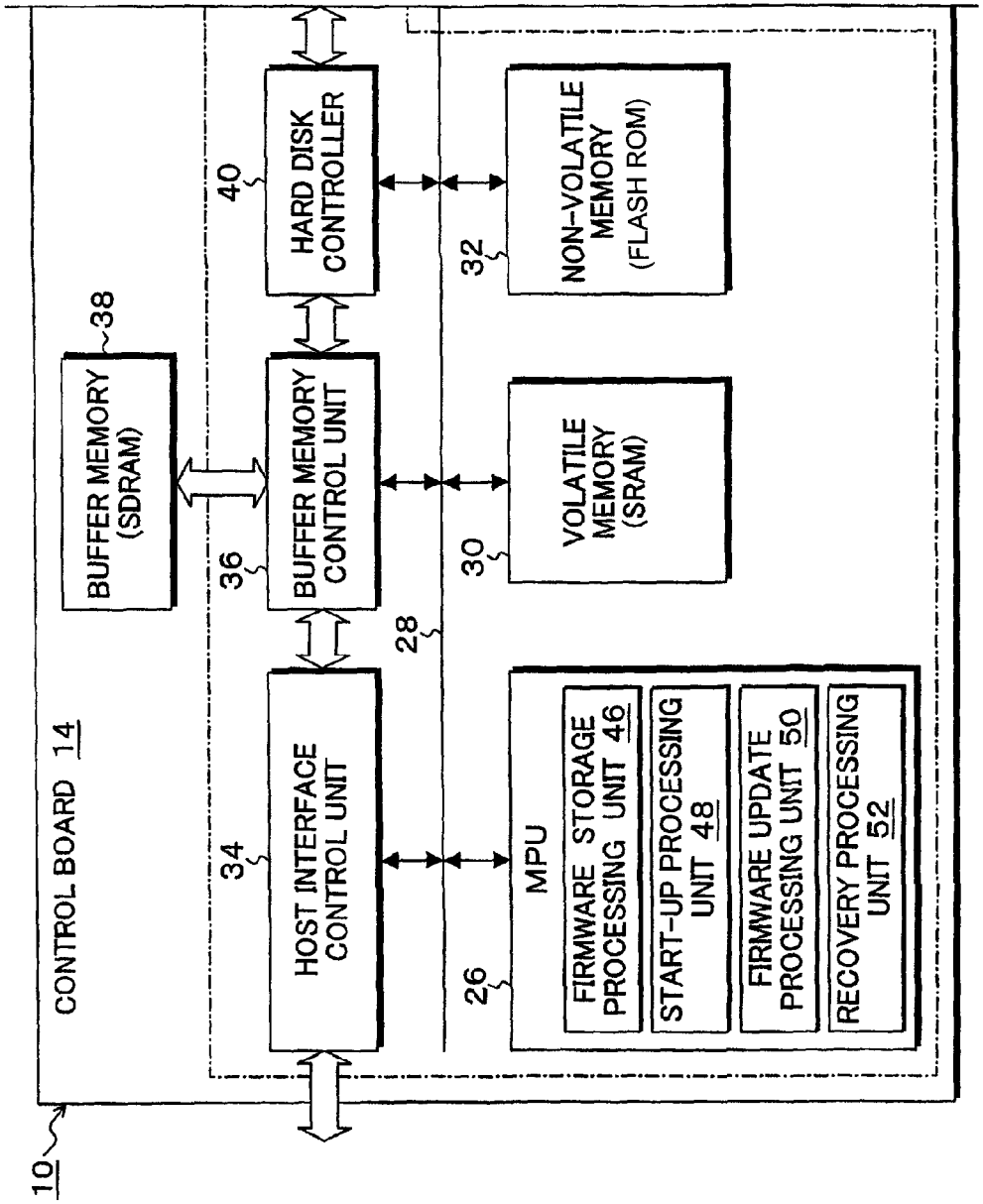

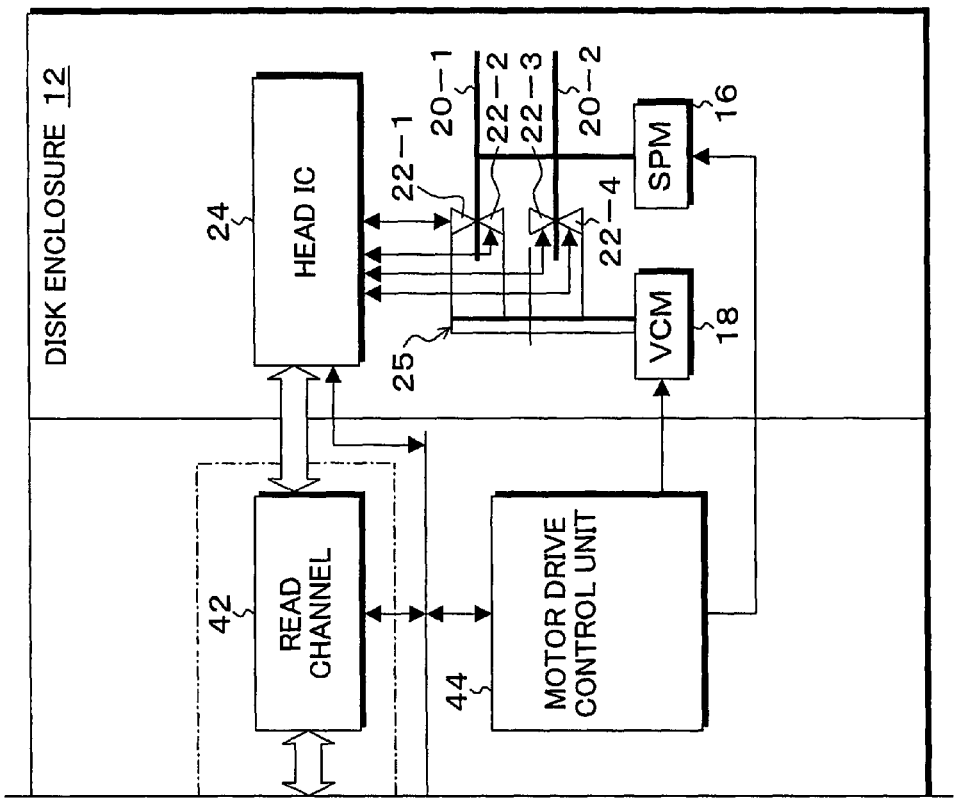

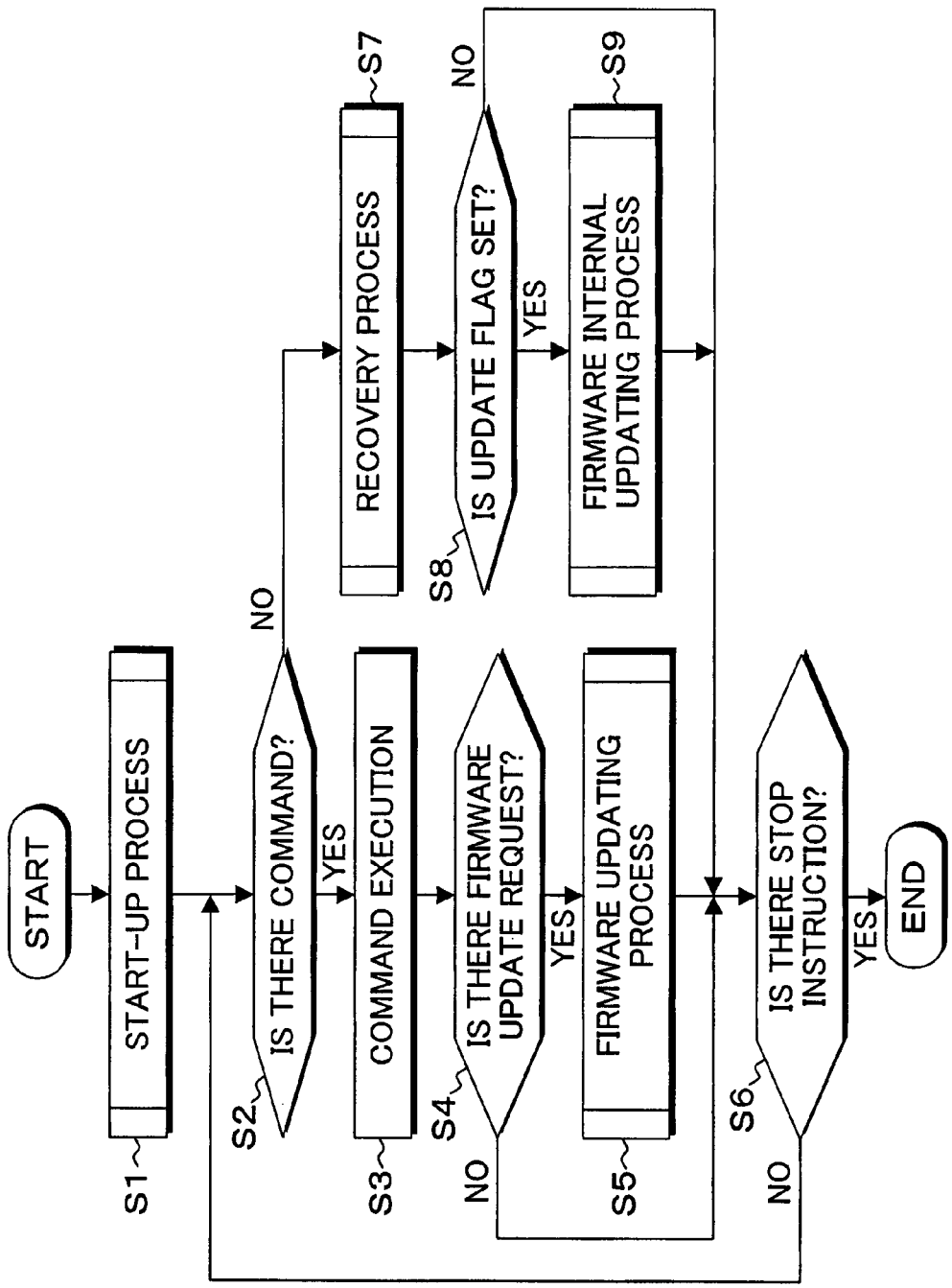

STORAGE APPARATUS, CONTROL METHOD, AND CONTROL DEVICE WHICH CAN BE RELIABLY STARTED UP WHEN POWER IS TURNED ON EVEN AFTER THERE IS AN ERROR DURING FIRMWARE UPDATE

This application is a continuation-in-part application of U.S. patent application Ser. No. 11/643,216, filed Dec. 21, 2006 now abandoned.

This application is a priority based on prior application No. JP 2006-23030, filed Aug. 28, 2006, and No. JP 2007-090976, filed Mar. 30, 2007, in Japan.

BACKGROUND OF THE INVENTION

1. Field of the Invention

The present invention relates to a storage apparatus, a control method, and a control device which download and update firmware which is drive control software which records and reproduces data in accordance with update requests from a host, and particularly relates to a storage apparatus, a control method, and a control device which download new firmware from a host in an operating state of the apparatus and update old software in the apparatus side.

2. Description of the Related Arts

Conventionally, firmware which is mounted as drive control software in a controller of a magnetic disk apparatus undergoes version upgrading when countermeasures against various factors generated during operation are made after the apparatus thereof is shipped to a user, and firmware of new versions is sequentially downloaded and updated. Such update of firmware in magnetic disk apparatuses has to be performed for each one of the magnetic disk apparatuses. For example, in a disk array system which is connected to a host as a subsystem, with respect to a large number of magnetic disk apparatuses mounted in the disk array, new-version firmware is transferred and downloaded from the host to the apparatus side, and update of the firmware is executed in the apparatuses. In the conventional magnetic disk apparatus, firmware is separately stored in a flash memory which is a non-volatile memory provided in the apparatus and a magnetic disk. When the apparatus is started up, a boot code stored at a top position of the flash memory is executed, the firmware in the flash memory and the firmware in the magnetic disk medium is read, written to a buffer memory and a SRAM which are volatile memories, and executed by a CPU so as to execute recording/reproducing of data to or from the magnetic disk medium. A conventional firmware updating process for such magnetic disk apparatus is performed according to the following procedure.

However, such a conventional firmware updating method has a problem that, when an error occurs during update of the firmware with respect to the flash ROM and the magnetic disk medium and the data is destroyed, or when a process is disrupted by an error immediately after update of the flash ROM and the firmware of the magnetic disk medium cannot be updated, a diagnosis error of the flash ROM occurs when the power is turned on again next time, the firmware cannot be started up, and the apparatus becomes unusable.

SUMMARY OF THE INVENTION

According to the present invention to provide a storage apparatus, a control method, and a control device which are highly reliable and can be reliably started up when the power thereof is turned on even after there is an error during firmware update.

(Apparatus)

The present invention provides a storage apparatus which records/reproduces data to or from a disk medium. The storage apparatus of the present invention is characterized by having a firmware storage processing unit which stores firmware, which is drive control software which records/reproduces data to or from a disk medium, separately in a non-volatile memory, in which a start-up code and a restoration code are stored, and a first disk medium, stores a copy of the firmware, which is stored in the non-volatile memory, in the first disk medium, and stores a copy of the entire firmware, which is stored in the first disk medium, in a second disk medium; and a start-up processing unit which executes, upon power-on, any of a first start-up mode in which the firmware of the non-volatile memory and the first disk medium is read and allocated to a volatile memory so as to perform start-up based on the start-up code when the non-volatile memory is normal, a second start-up mode in which the firmware of the non-volatile memory and the second disk medium is read and allocated to the volatile memory so as to perform start-up when the first disk medium is abnormal in the first start-up mode, a third start-up mode in which the entire firmware is read and allocated from the first disk medium to the volatile memory so as to perform start-up based on the restoration code when the non-volatile memory is abnormal, and a fourth start-up mode in which the entire firmware is read and allocated from the second disk medium to the volatile memory so as to perform start-up when the first disk medium is abnormal in the third start-up mode.

Furthermore, the storage apparatus of the present invention is characterized by having a firmware update processing unit which switches old firmware, which is allocated to the volatile memory, to new firmware transferred from an upper-level apparatus and executes the new firmware when an update request of the firmware is received from the upper-level apparatus, and then writes the new firmware of the volatile memory to the first disk medium, the non-volatile memory, and the second disk medium in the described order so as to perform update.

The storage apparatus of the present invention is characterized in that a recovery processing unit which operates by a background process is further provided; and the recovery processing unit copies the firmware of the first disk medium to the second disk medium when the start-up processing unit performs start-up by the first start-up mode, and copies the firmware of the second disk medium to the first disk medium when the start-up processing unit performs start-up by the second start-up mode.

The recovery processing unit further copies the firmware of the first disk medium to the second disk medium when the start-up processing unit performs start-up by the third start-up mode, and copies the firmware of the second disk medium to the first disk medium when the start-up processing unit performs start-up by the fourth start-up mode.

The start-up processing unit confirms validity of the firmware stored in the non-volatile memory and determines normal or otherwise determines abnormality in the first to the fourth start-up modes;

determines normal when the firmware stored in the first disk medium and the second disk medium is readable, valid, and a version of the firmware is same as the firmware of the non-volatile memory or otherwise determines abnormality in the first or the second start-up mode; and confirms that the firmware stored in the first disk medium and the second disk medium is readable and valid and determines normal, or otherwise determines abnormality in the third or fourth start-up mode.

The firmware update processing unit writes the new firmware stored in the buffer memory over and updates the old firmware allocated to the volatile memory, and then starts up the apparatus so as to switch to a process of the new firmware;

notifies the upper-level apparatus of update completion by executing the new firmware after the switch; and writes the new firmware of the volatile memory to the first disk medium, the non-volatile memory, and the second disk medium in the described order by a background process so as to perform update.

(Method)

The present invention provides a control method of the storage apparatus which records/reproduces data. The control method of the storage apparatus according to the present invention is characterized by including a firmware storage processing step in which firmware, which is drive control software which records/reproduces data to or from a disk medium, is separately stored in a non-volatile memory, in which a start-up code and a restoration code are stored, and a first disk medium, a copy of the firmware, which is stored in the non-volatile memory, is stored in the first disk medium, and a copy of the entire firmware, which is stored in the first disk medium, is stored in a second disk medium; and a start-up processing step in which, upon power-on, any of a first start-up mode in which the firmware of the non-volatile memory and the first disk medium is read and allocated to a volatile memory so as to perform start-up based on the start-up code when the non-volatile memory is normal, a second start-up mode in which the firmware of the non-volatile memory and the second disk medium is read and allocated to the volatile memory so as to perform start-up when the first disk medium is abnormal in the first start-up mode, a third start-up mode in which the entire firmware is read and allocated from the first disk medium to the volatile memory so as to perform start-up based on the restoration code when the non-volatile memory is abnormal, and a fourth start-up mode in which the entire firmware is read and allocated from the second disk medium to the volatile memory so as to perform start-up when the first disk medium is abnormal in the third start-up mode is executed.

The control method of the storage apparatus according to the present invention is further characterized by including a firmware update processing step in which old firmware, which is allocated to the volatile memory, is switched to new firmware transferred from an upper-level apparatus and the new firmware is executed when an update request of the firmware is received from the upper-level apparatus, and then the new firmware of the volatile memory is written to the first disk medium, the non-volatile memory, and the second disk medium in the described order so as to perform update.

(Control Device)

The present invention provides a control device of the storage apparatus which records/reproduces data. The control device of the storage apparatus according to the present invention is characterized by having a firmware storage processing unit which stores firmware, which is drive control software which records/reproduces data to or from a disk medium, separately in a non-volatile memory, in which a start-up code and a restoration code are stored, and a first disk medium, stores a copy of the firmware, which is stored in the non-volatile memory, in the first disk medium, and stores a copy of the entire firmware, which is stored in the first disk medium, in a second disk medium; and a start-up processing unit which executes, upon power-on, any of a first start-up mode in which the firmware of the non-volatile memory and the first disk medium is read and allocated to a volatile memory so as to perform start-up based on the start-up code when the non-volatile memory is normal, a second start-up mode in which the firmware of the non-volatile memory and the second disk medium is read and allocated to the volatile memory so as to perform start-up when the first disk medium is abnormal in the first start-up mode, a third start-up mode in which the entire firmware is read and allocated from the first disk medium to the volatile memory so as to perform start-up based on the restoration code when the non-volatile memory is abnormal, and a fourth start-up mode in which the entire firmware is read and allocated from the second disk medium to the volatile memory so as to perform start-up when the first disk medium is abnormal in the third start-up mode.

The control device of the storage apparatus according to the present invention is further characterized by having a firmware update processing unit which switches old firmware, which is allocated to the volatile memory, to new firmware transferred from an upper-level apparatus and executes the new firmware when an update request of the firmware is received from the upper-level apparatus, and then writes the new firmware of the volatile memory to the first disk medium, the non-volatile memory, and the second disk medium in the described order so as to perform update.

(Apparatus without Non-Volatile Memory)

The present invention provides a storage apparatus which does not have a non-volatile memory which stores firmware. The storage apparatus of the present invention is characterized by having a firmware storage processing unit which stores firmware, which is drive control software which records/reproduces data to or from a disk medium, in a first disk medium, in which a start-up code and a restoration code are stored, and stores a copy of the firmware, which is stored in the first disk medium, to each of a second disk medium and a third disk medium;

a start-up processing unit which executes, upon power-on, any of a first start-up mode in which the firmware of the first disk medium and the second disk medium is read and allocated to a volatile memory so as to perform start-up based on the start-up code when the first disk medium is normal, a second start-up mode in which the firmware of the first disk medium and the second disk medium is read and allocated to the volatile memory so as to perform start-up when the second disk medium is abnormal in the first start-up mode, and a third start-up mode in which the entire firmware is read and allocated from the third disk medium to the volatile memory so as to perform start-up when the second disk medium is abnormal in the second start-up mode; and a firmware update processing unit which switches old firmware, which is allocated to the volatile memory, to and executes new firmware, which is transferred from an upper-level apparatus, when an update request of the firmware is received from the upper-level apparatus, and then writes the new firmware of the volatile memory to the first disk medium, the second disk medium, and the third disk medium in the described order so as to perform update.

Furthermore, in the storage apparatus of the present invention, a recovery processing unit which operates by a background process is further provided; and the recovery processing unit copies the firmware of the first disk medium to the second disk medium and a third disk medium when the start-up processing unit performs start-up by the first start-up mode, copies the firmware of the second disk medium to the third disk medium and the first disk medium when the start-up processing unit performs start-up by the second start-up mode, and copies the firmware of the third disk medium to the first disk medium and the second disk medium when the start-up processing unit performs start-up by the third start-up mode.

(Initial Update of Magnetic Disk)

Another mode of the present invention provides a storage apparatus in which firmware is stored in a non-volatile memory and a disk medium, and, in update of new firmware, the non-volatile memory is updated in background after the disk medium is updated.

The storage apparatus of the present invention is characterized by having a firmware storage processing unit which stores firmware, which is drive control software which records/reproduces data to or from a disk medium, separately in a non-volatile memory, in which a start-up code and a restoration code are stored, and a disk medium, and stores a copy of the firmware, which is stored in the non-volatile memory, in the disk medium;

a start-up processing unit which executes, upon power-on, either a first start-up mode in which the firmware of the non-volatile memory and the disk medium is read and allocated to a volatile memory so as to perform start-up based on the start-up code when the non-volatile memory is normal, or a second start-up mode in which the entire firmware is read from the disk medium and allocated to the volatile memory based on the restoration code so as to perform start-up when the non-volatile memory is abnormal in the first start-up mode; and a firmware updating unit which, when an update request of the firmware is received from an upper-level apparatus, writes new firmware stored in a buffer memory to the disk medium so as to perform update, then destroys old firmware of the non-volatile memory, switches old firmware, which is allocated to the volatile memory, to the new firmware so as to execute the new firmware, then notifies the upper-level apparatus of update termination, and then writes the new firmware of the volatile memory to the non-volatile memory by a background process so as to perform update.

Another mode of the present invention provides a storage apparatus in which firmware is stored in a non-volatile memory, a first disk medium, and a second disk medium, and, in update of new firmware, the non-volatile memory and the second disk medium are updated in background after the first disk medium is updated.

The storage apparatus of the present invention is characterized by having a firmware storage processing unit which stores firmware, which is drive control software which records/reproduces data to or from a disk medium, separately in a non-volatile memory, in which a start-up code and a restoration code are stored, and a first disk medium, stores a copy of the firmware, which is stored in the non-volatile memory, in the first disk medium, and stores a copy of the entire firmware, which is stored in the first disk medium, in a second disk medium;

a start-up processing unit which executes, upon power-on, any of a first start-up mode in which the firmware of the non-volatile memory and the disk medium is read and allocated to a volatile memory so as to perform start-up based on the start-up code when the non-volatile memory is normal, a second start-up mode in which the entire firmware is read and allocated from the first disk medium to the volatile memory based on a restoration code so as to perform start-up when the non-volatile memory is abnormal in the first start-up mode, and a third start-up mode in which the entire firmware is read and allocated from the second disk medium to the volatile memory so as to perform start-up when the first disk medium is abnormal in the second start-up mode; and a firmware updating unit which, when an update request of the firmware is received from an upper-level apparatus, writes new firmware stored in a buffer memory to the first disk medium so as to perform update, then destroys old firmware of the non-volatile memory, switches old firmware, which is allocated to the volatile memory, to the new firmware so as to execute the new firmware, then notifies the upper-level apparatus of update termination, and then writes the new firmware of the first disk medium sequentially to the non-volatile memory and then the second disk medium by a background process so as to perform update.

According to the present invention, in addition to firmware separately stored in a non-volatile memory such as a flash ROM and a first disk medium, a copy of the entire firmware is stored in each of the first disk medium and a second disk medium, and update is performed in the order of the first disk medium, the non-volatile memory, and the second disk medium when new firmware is downloaded from an upper-level apparatus; and, even when an error occurs during the update, by virtue of reading allocation of the firmware by the combination of the non-volatile memory and the first disk medium or the second disk medium based on a start-up code, or reading allocation of the entire firmware from the first disk medium or the second disk medium based on a restoration code when there is a diagnosis error in the non-volatile memory, even if there is data destruction or unupdated part in a part of the firmware stored in the non-volatile memory, the first disk medium, and the second disk medium, the apparatus can be reliably started up by updated firmware, the apparatus can be reliably prevented from becoming unusable when it cannot be started up upon power-on after the error during firmware update, and reliability can be enhanced.

In another embodiment of the present invention, when a firmware update command is received from the upper-level apparatus, in the first place, the disk medium is updated to new firmware, a part of the old firmware of the non-volatile memory is then destroyed, the upper-level apparatus is notified of command termination after it is switched to execution of the new firmware, and then, the non-volatile memory is updated to the new firmware in background. As a result, even when the power of the apparatus is turned off immediately after the update command is normally terminated and the non-volatile memory is not updated, upon next power-on, the old firmware of the non-volatile memory always becomes abnormal due to the partial destruction performed along with the update process. Therefore, when the restoration code is executed, the new firmware of the disk medium is read and allocated to the volatile memory, and start-up by the new firmware can be performed.

Moreover, in another mode of the present invention, when write to the disk medium according to a firmware update command fails, the command can be abnormally terminated; therefore, abnormality of the storage apparatus can be detected in an early stage by the upper-level apparatus, and a necessary countermeasure can be made. The above and other objects, features, and advantages of the present invention will become more apparent from the following detailed description with reference to the drawings.

BRIEF DESCRIPTION OF THE DRAWINGS

FIGS. 1A and 1B are block diagrams of a magnetic disk apparatus showing an embodiment of the present invention;

FIG. 20 is a flow chart showing processing operation of the present embodiment;

DETAILED DESCRIPTION OF THE PREFERRED EMBODIMENTS

Figure 2:
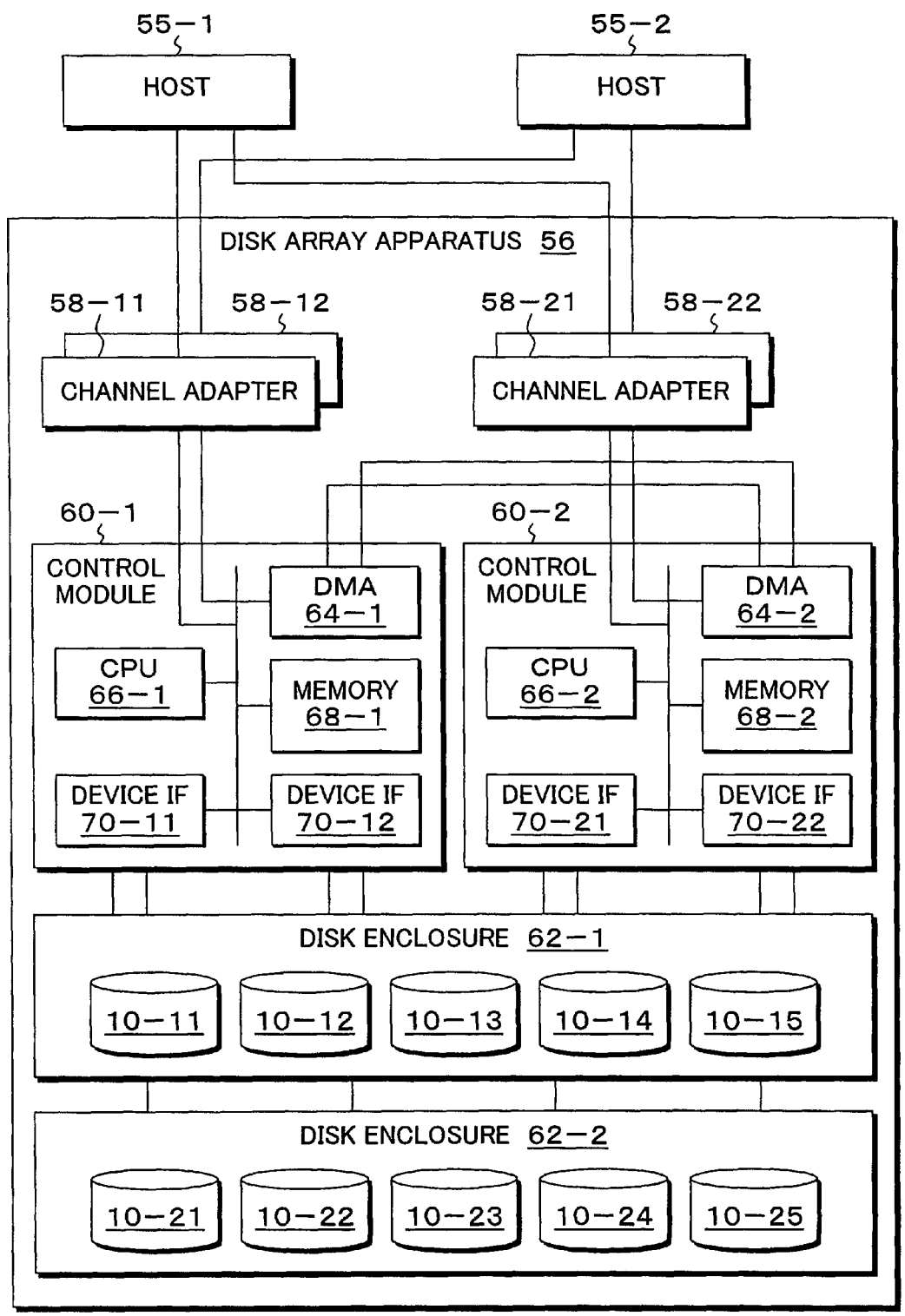
FIG. 2 is a block diagram of a disk array apparatus having magnetic disk apparatuses of the present embodiment.

FIGS. 1A and 1B are block diagrams of a magnetic disk apparatus to which the present invention is applied. In FIGS. 1A and 1B, the magnetic disk apparatus 10 which is known as a hard disk drive (HDD) is composed of a disk enclosure 12 and a control board 14. A spindle motor 16 is provided in the disk enclosure 12, and magnetic disks 20-1 and 20-2 are attached to a rotating shaft of the spindle motor 16 as disk media and rotated at, for example, 4200 rpm for a certain period of time. Moreover, a voice coil motor 18 is provided in the disk enclosure 12, and the voice coil motor 18 has head actuators having arm distal ends of a rotary actuator 25 on which heads 22-1 to 22-4 are mounted and performs positioning of the heads with respect to recording surfaces of the magnetic disks 20-1 and 20-2. In each of the heads 22-1 to 22-2, a write head element and a read head element are mounted in an integrated manner. A magnetic recording method used by the heads 22-1 to 22-4 with respect to the magnetic disks 20-1 and 20-2 may be either a longitudinal magnetic recording method or a perpendicular magnetic recording method. The head 22-1 and 22-2 are connected to a head IC 24 by signal lines, and the head IC 24 selects one head according to a head select signal based on a write command or a read command from a host serving as an upper-level apparatus, thereby performing a write or a read. Moreover, in the head IC 24, a write driver is provided for a write system, and a preamplifier is provided for a read system. An MPU 26 is provided in the control board 14; and, with respect to a bus 28 of the MPU 26, a volatile memory 30 using an SRAM or the like to which firmware which is drive control software including a control code and a variable is deployed upon start-up of the apparatus and a non-volatile memory 32 using a flash ROM or the like which stores a boot code serving as a start-up code and the firmware to be deployed to the volatile memory 30 are provided. Note that, in the present embodiment, the firmware is separately stored in the non-volatile memory 32 and, for example, the magnetic disk 20-1. Moreover, on the bus 28 of the MPU 26, a host interface control unit 34, a buffer memory control unit 36 which controls a buffer memory 38 using an SDRAM or the like, a hard disk controller 40 which functions as a format, a read channel 42 which functions as a write modulation unit and a read demodulation unit, and a motor drive control unit 44 which controls the voice coil motor 18 and the spindle motor 16 are provided. Furthermore, the MPU 26, the memory 30, the non-volatile memory 32, the host interface control unit 34, the buffer memory control unit 36, the hard disk controller 40, and the read channel 42 provided on the control board 12 constitute a control circuit 15, and the control circuit 15 is realized as one LSI circuit. In the present embodiment, a partial area of the buffer memory 38 is allocated to a direct access area of the MPU 26, and, upon start-up of the apparatus, part of the firmware read from the non-volatile memory 32 and the magnetic disk 20-1 is written to and allocated to the direct access area. The magnetic disk apparatus 10 performs a writing process and a reading process by executing a control code of the firmware based on a command from the host. Herein, normal operations in the magnetic disk apparatus will be described below. When a write command and write data from the host is received by the host interface control unit 34, the write command is decoded by the MPU 26, and the received write data is stored in the buffer memory 38 in accordance with needs. Then, in the hard disk controller 40, the data is converted into a predetermined data format, and an ECC code is added thereto by an ECC encoding process; and, after scrambling, RLL code conversion, and write compensation is performed in the write modulation system in the read channel 42, the data is written from the write head of, for example, the head 22-1 which is selected from a write amplifier via the head IC 24 to the disk medium 20-1. In this course, a head positioning signal is given from the MPU 26 to the motor drive control unit 44 using a DSP or the like, and the head is caused to seek a target track, which is specified by the command, by the voice coil motor 18 and is placed on the track, thereby performing track following control. On the other hand, when a read command from the host is received by the host interface control unit 34, the read command is decoded by the MPU 26, a read signal read from a read head which is selected by head selection of the head IC 24 is amplified by the preamplifier and then input to a read demodulation system of the read channel 42, the read data is demodulated by partial response maximum likelihood detection (PRML) or the like, and an error(s) is corrected by performing an ECC decoding process by the hard disk controller 40. Then, the data is buffered to the buffer memory 38, and the read data is transferred from the host interface control unit 34 to the host.

FIG. 2 is a block diagram of a disk array apparatus in which a plurality of the magnetic disk apparatuses of the present embodiment are provided. In FIG. 2, in the disk array apparatus 56, channel adapters 58-11 and 58-12 and channel adapters 58-21 and 58-22 are provided separately in two systems and connected to hosts 55-1 and 55-2 which are servers or the like. Moreover, in the disk array apparatus 56, duplex control modules 60-1 and 60-2 are provided. Disk enclosures 62-1 and 62-2 are provided for the control modules 60-1 and 60-2, and magnetic disk apparatuses 10-11 to 10-15 and 10-21 to 10-25 which are same as that shown in FIGS. 1A and 1B are respectively provided therein. The five magnetic disk apparatuses 10-11 to 10-15 or 10-21 to 10-25 of the disk enclosure 62-1 or 62-2 form a disk array having a RAID configuration of a predetermined RAID level, for example, RAID 1 or RAID 5. In the control modules 60-1 and 60-2, CPUs 66-1 and 66-2, DMA controllers 64-1 and 64-2, memories 68-1 and 68-2, and device interfaces 70-11, 70-12, 70-21, and 70-22 are provided. The disk array apparatus 56 executes read processes and write processes with respect to the magnetic disk apparatuses 10-11 to 10-15 and 10-21 to 10-25, which are provided in the disk enclosures 62-1 and 62-2, in accordance with input/output requests from the hosts 55-1 and 55-2. Referring again to FIGS. 1A and 1B, in the MPU 26 on the control board 14, as functions realized by program control, functions of a firmware storage processing unit 46, a start-up processing unit 48, a firmware update processing unit 50, and a recovery processing unit 52 are provided. The firmware storage processing unit 46 is a function realized by executing a program which is downloaded to the non-volatile memory 32 in a manufacturing step of the magnetic disk apparatus 10 of the present embodiment, and the program is deleted from the non-volatile memory 32 when a storage process is finished. In the magnetic disk apparatus 10 of the present embodiment, the firmware storage processing unit 46 stores firmware, which is drive control software for recording/reproducing data to or from the magnetic disks 20-1 to 20-2, separately in the non-volatile memory 32 using a flash ROM and, for example, in the first magnetic disk 20-1, stores a copy of the firmware, that is stored in the non-volatile memory 32, in the first magnetic disk 20-1, and stores a copy of the entire firmware, that is stored in the first magnetic disk 20-1, in the other second magnetic disk 20-2. Hereinafter, the magnetic disk 20-1 is referred to as a first magnetic disk, and the magnetic disk 20-2 is referred to as a second magnetic disk.

Figure 3:
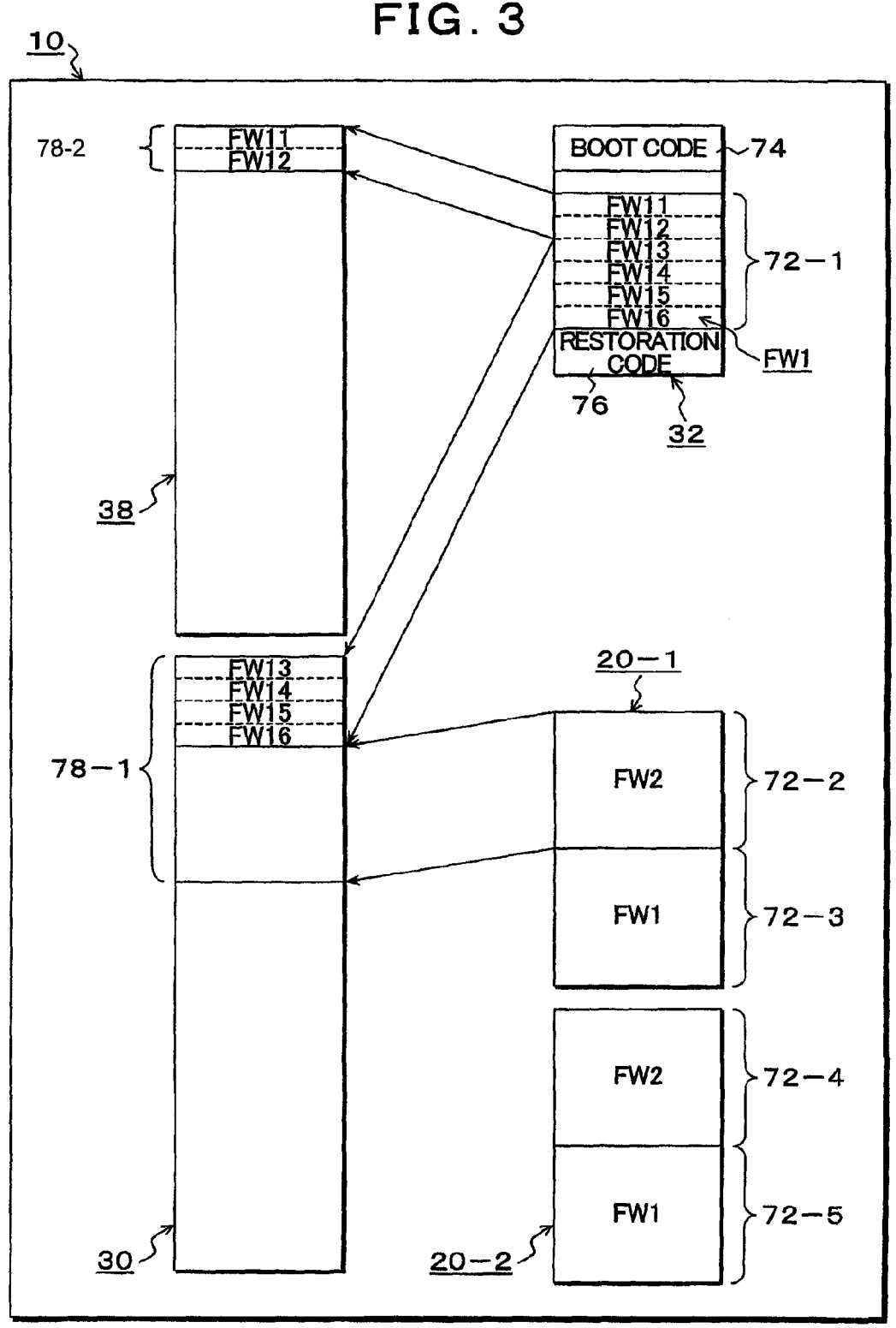
FIG. 3 is an explanatory diagram showing reading allocation upon storage and startup of firmware in the present embodiment.

FIG. 3 shows a state of the firmware stored by the firmware storage processing unit 46 of FIGS. 1A and 1B and focuses on the buffer memory 38, the volatile memory 30, the non-volatile memory 32, the first magnetic disk 20-1, and the second magnetic disk 20-2 in the embodiment of FIGS. 1A and 1B. A boot code 74 for start-up is stored at a top position of the non-volatile memory 32, and, in a firmware storage area 72-1 subsequent to that, firmware FW1 which is a part of the firmware is stored. Furthermore, in the non-volatile memory 32, a restoration code 76 which performs a start-up process when a diagnosis error of the non-volatile memory 32 occurs and start-up cannot be carried out by the boot code 74 upon power-on is stored. In a firmware storage area 72-2 of the first magnetic disk 20-1, firmware FW2 serving as a part which forms one firmware in combination with the firmware FW1 of the non-volatile memory 32 is stored. Herein, it is assumed that processing of the firmware FW1 is required before a drive-ready state is attained after the apparatus is started up, and processing of the firmware FW2 is operable after drive is ready. In addition, in the present embodiment, a copy of the firmware FW1 of the non-volatile memory 32 is stored in a firmware storage area 72-3 of the first magnetic disk 20-1. Therefore, as a result of storing the partial firmware FW1 and FW2 in the firmware storage areas 72-2 and 72-3 of the first magnetic disk 20-1, the entire firmware is stored therein. Furthermore, firmware storage areas 72-4 and 72-5 are provided in the second magnetic disk 20-2, and copies of the firmware FW2 and FW1 of the first magnetic disk 20-1 are stored therein. When the power of the magnetic disk apparatus is turned on, the boot code 74 at the top of the non-volatile memory 32 is read and executed by the MPU 26, thereby reading the firmware FW1 of the non-volatile memory 32 and the firmware FW2 of the first magnetic disk 20-1 and allocating them to the buffer memory 38 and the volatile memory 30. In the present embodiment, a firmware allocation area 78-1 is provided in the volatile memory 30; and, at the same time, a direct access area of the MPU 26 is reserved in the buffer memory 38 side, and this area is used as a firmware allocation area 78-2. Capacity shortage of the volatile memory 30 is covered by using the part of the buffer memory 38. In this example, the firmware FW1 of the non-volatile memory 32 is divided into firmware FW11 to FW16, the divided firmware FW11 and FW12 is read and allocated to the buffer memory 38, the remaining divided firmware FW13 to FW16 is read and allocated to the volatile memory 30, and the firmware FW2 of the first magnetic disk 20-1 is read and allocated to the volatile memory 30. The firmware FW1 and FW2 which is the drive control software of the present embodiment is composed of control codes and variables for controlling each of the host interface control unit 34, the buffer memory control unit 36, the hard disk controller 40, the read channel 42, the motor drive control unit 44, and the head IC 24 of FIGS. 1A and 1B. In the firmware FW1 and FW2, the control codes of which processing time is required to be reduced and the variables which are frequently referenced are allocated to the firmware storage area 78-1 of the volatile memory 30; and test codes and self-test codes which are not directly related for ensuring performance, the variables which are not frequently referenced, and data which has to be placed in the buffer are allocated to the firmware storage area 78-1 of the buffer memory 38.

Figure 4:
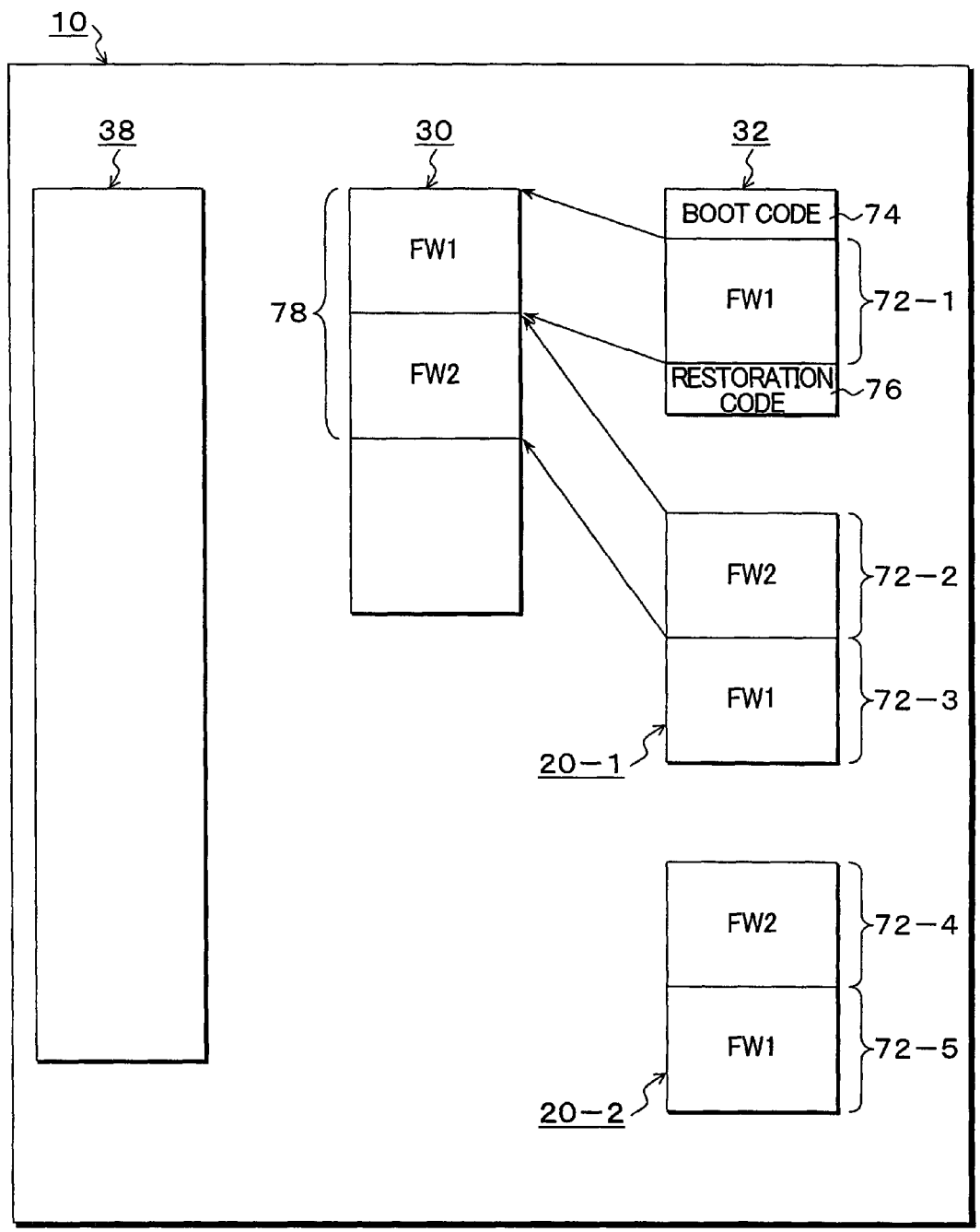
FIG. 4 is an explanatory diagram of a start-up process of a first start-up mode by a start-up processing unit of the present embodiment.

FIG. 4 is an explanatory diagram in which, for convenience of explanation, reading and allocation of the firmware FW1 and FW2 of FIG. 3 is performed merely to the volatile memory 30. In an actual apparatus, a part of the firmware is allocated to the buffer memory 38 as shown in FIG. 3; however, in order to simplify the explanation in the below explanation, the explanation is given on the assumption that the entire firmware is read and allocated to the volatile memory 30 as shown in FIG. 4. Referring again to FIGS. 1A and 1B, the start-up processing unit 48 provided in the MPU 26 performs start up upon power-on by any of a first start-up mode, a second start-up mode, a third start-up mode, and a fourth start-up mode. In the first start-up mode, when the non-volatile memory 32 is normal, the firmware of the non-volatile memory 32 and the first magnetic disk 20-1 is read and allocated to the volatile memory 30 based on the boot code 74, thereby performing start-up. In the second start-up mode, when the first magnetic disk 20-1 is abnormal in the first start-up mode, the firmware of the non-volatile memory 32 and the second magnetic disk 20-2 is read and allocated to the volatile memory 30, thereby performing start-up. In the third start-up mode, when the non-volatile memory 32 is abnormal, the entire firmware is read from the first magnetic disk 20-1 and allocated to the volatile memory 30 based on the restoration code 76, thereby performing start-up. In the fourth start-up mode, when the first magnetic disk 20-1 is abnormal in the third start-up mode, the entire firmware is read from the second magnetic disk 20-2 and allocated to the volatile memory 30, thereby performing start-up. The start-up processing unit 48 will be further described in detail below. When the power is turned on, initialization and diagnosis of the devices is performed by a start-up program which is stored in the non-volatile memory 32 and has a function corresponding to BIOS, and, also for the non-volatile memory 32, for example, a checksum of the stored firmware is diagnosed. When a diagnosis error does not occur in the diagnosis of the non-volatile memory 32 and it is normal, the start-up processing unit 48 is in the first start-up mode, the firmware FW1 of the non-volatile memory 32 and the firmware FW2 of the first magnetic disk 20-1 is read and allocated to the firmware storage area 78 of the volatile memory 30 by execution of the boot code 74 as shown in FIG. 4, and it is executed by the MPU 26. The reading and allocation of the firmware FW2 from the first magnetic disk 20-1 is performed on the condition that the firmware of the magnetic disk 20-1 is normal. Therefore, before the firmware FW2 is read and allocated, the following check is performed for the first magnetic disk 20-1.

(1) Whether the stored firmware is readable.

(2) Whether the checksum is correct.

(3) Whether the version of the stored firmware is same as the firmware of the non-volatile memory 32. When all of (1) to (3) is cleared, it is determined to be normal; and, when at least one of them is not cleared, it is determined to be abnormal.

Figure 5:
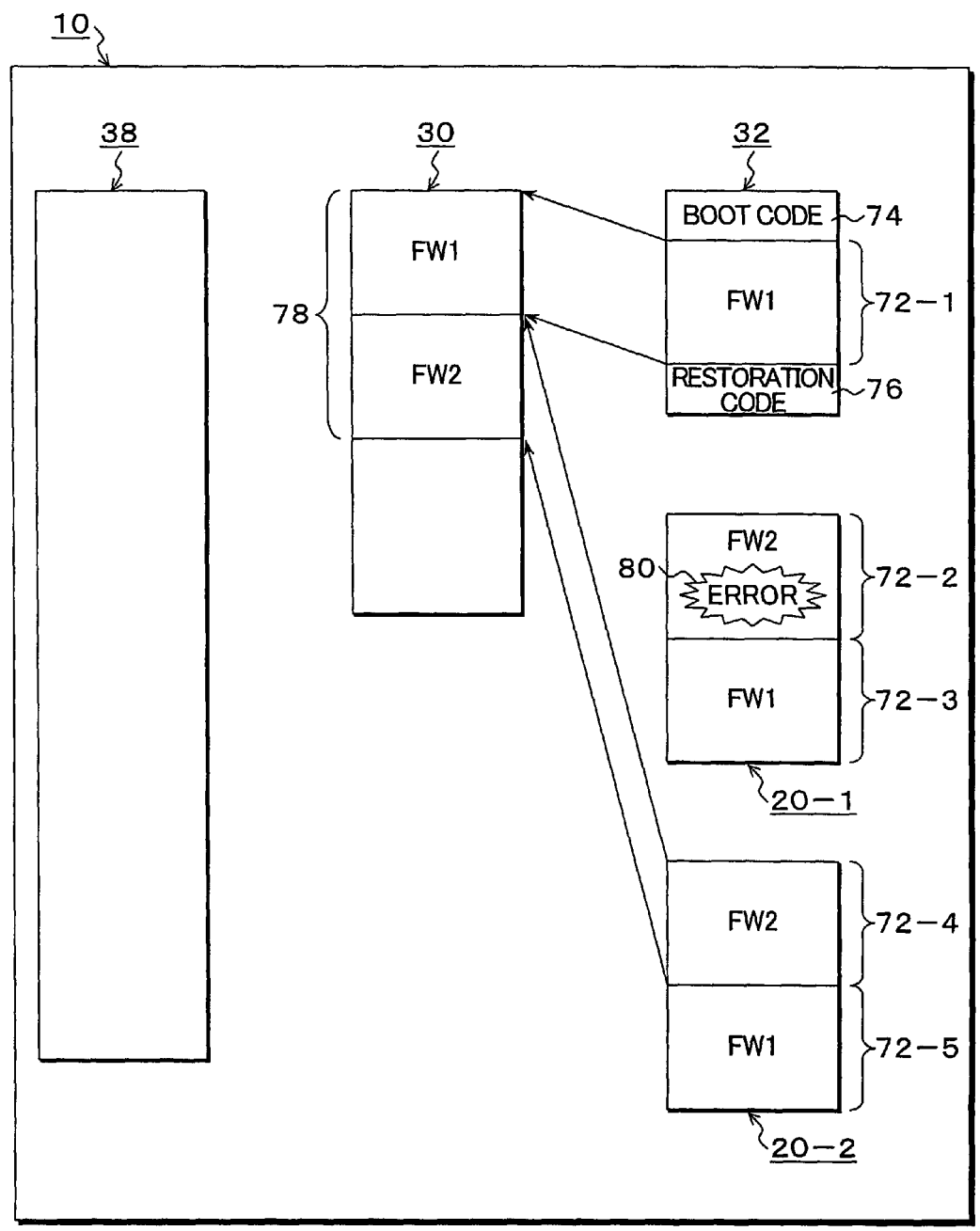
FIG. 5 is an explanatory diagram of a start-up process of a second start-up mode by the start-up processing unit of the present embodiment.

When abnormality is determined for the first magnetic disk 20-1 in the first start-up mode shown in FIG. 4, the second start-up mode shown in FIG. 5 is employed. In the second start-up mode, since the first magnetic disk 20-1 is determined to have an error and be abnormal, in this case, on the condition that the second magnetic disk 20-2 is normal, the firmware FW1 and FW2 is read from the combination of the non-volatile memory 32 and the second magnetic disk 20-2, allocated to the volatile memory 30, and executed.

Figure 6:
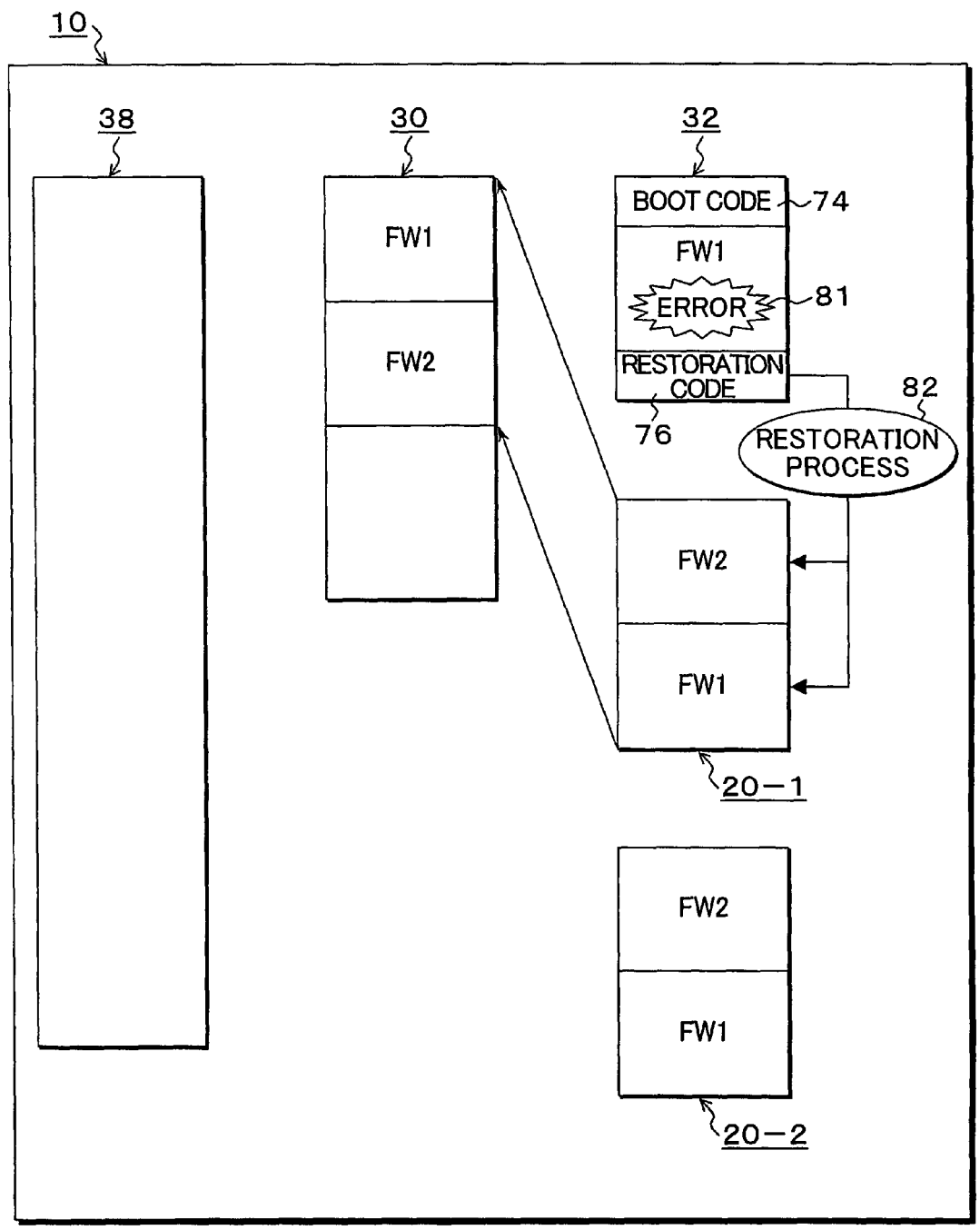
FIG. 6 is an explanatory diagram of a start-up process of a third start-up mode by the start-up processing unit of the present embodiment.

When the checksum of the firmware FW1 of the non-volatile memory 32 is an error 81 upon power-on as shown in FIG. 6, the start-up processing unit 48 performs start-up in the third start-up mode. In the third start-up mode, since the non-volatile memory 32 is determined to be abnormal due to the diagnosis error, a start-up process using the boot code 74 cannot be performed, and, in this case, a restoration process 82 is performed by executing the restoration code 76, which is newly provided in this embodiment. In the restoration process 82 based on the restoration code 76, on the condition that the first magnetic disk 20-1 is normal, the firmware FW1 and FW2 is read from the first magnetic disk 20-1, allocated to the volatile memory 30, and executed. In the check of the magnetic disk in the third start-up mode, it is determined to be normal when (1) whether the stored firmware is readable.

(2) whether the checksum is correct.

are cleared, otherwise, it is determined to be abnormal. When an error 80 is present as shown in FIG. 5 in the check of the first magnetic disk 20-1 in the third start-up mode and it is determined to be abnormal, the start-up processing unit 48 performs start-up in the fourth start-up mode. In the fourth start-up mode, on the condition that the second magnetic disk 20-2 is normal, the firmware FW1 and FW2 of the magnetic disk 20-2 is read and deployed to the volatile memory 30 by the restoration process 82 based on the restoration code 76.

Figure 8:
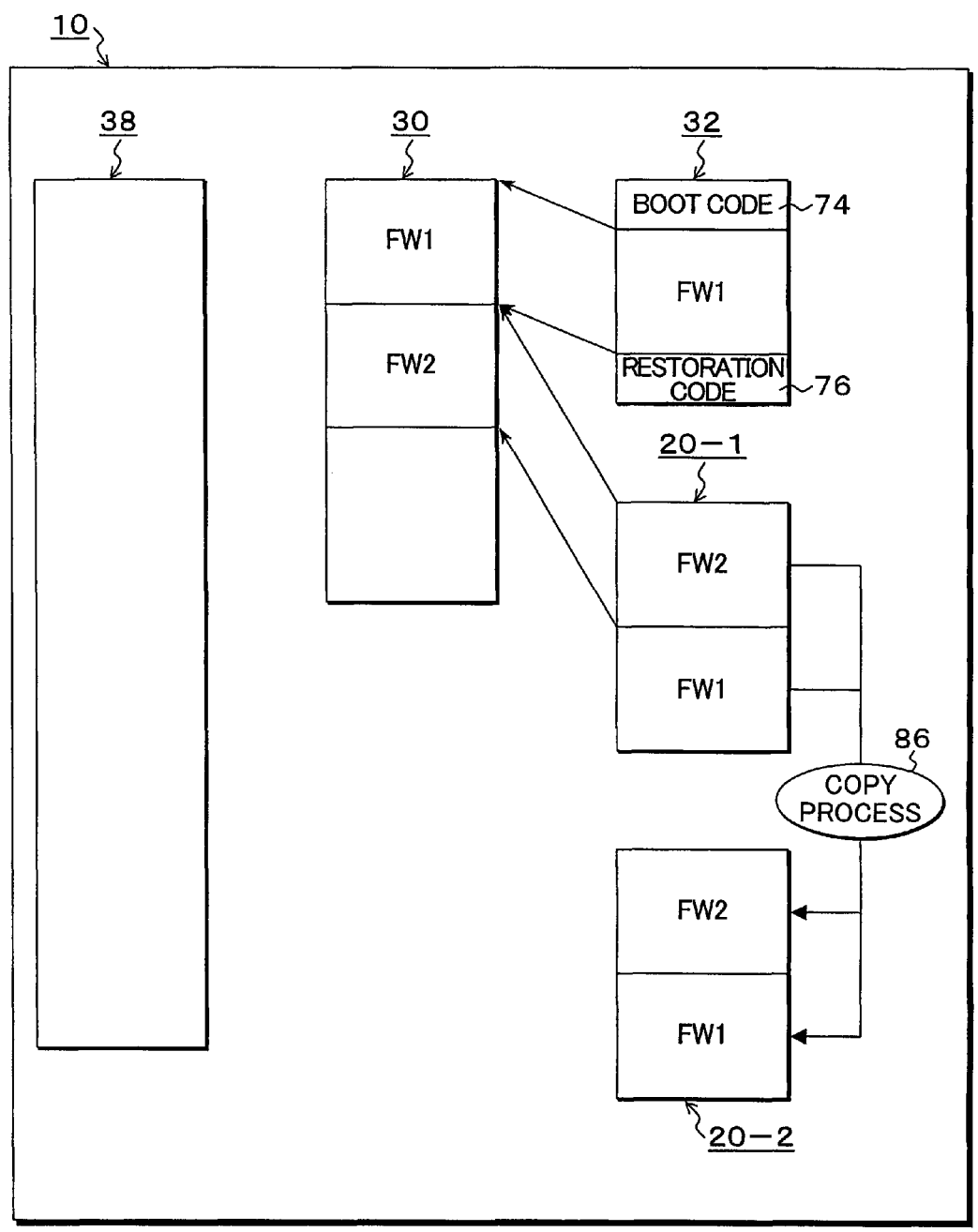
FIG. 8 is an explanatory diagram of a recovery process during operation when start-up is performed by using a first magnetic disk.
Figure 9:
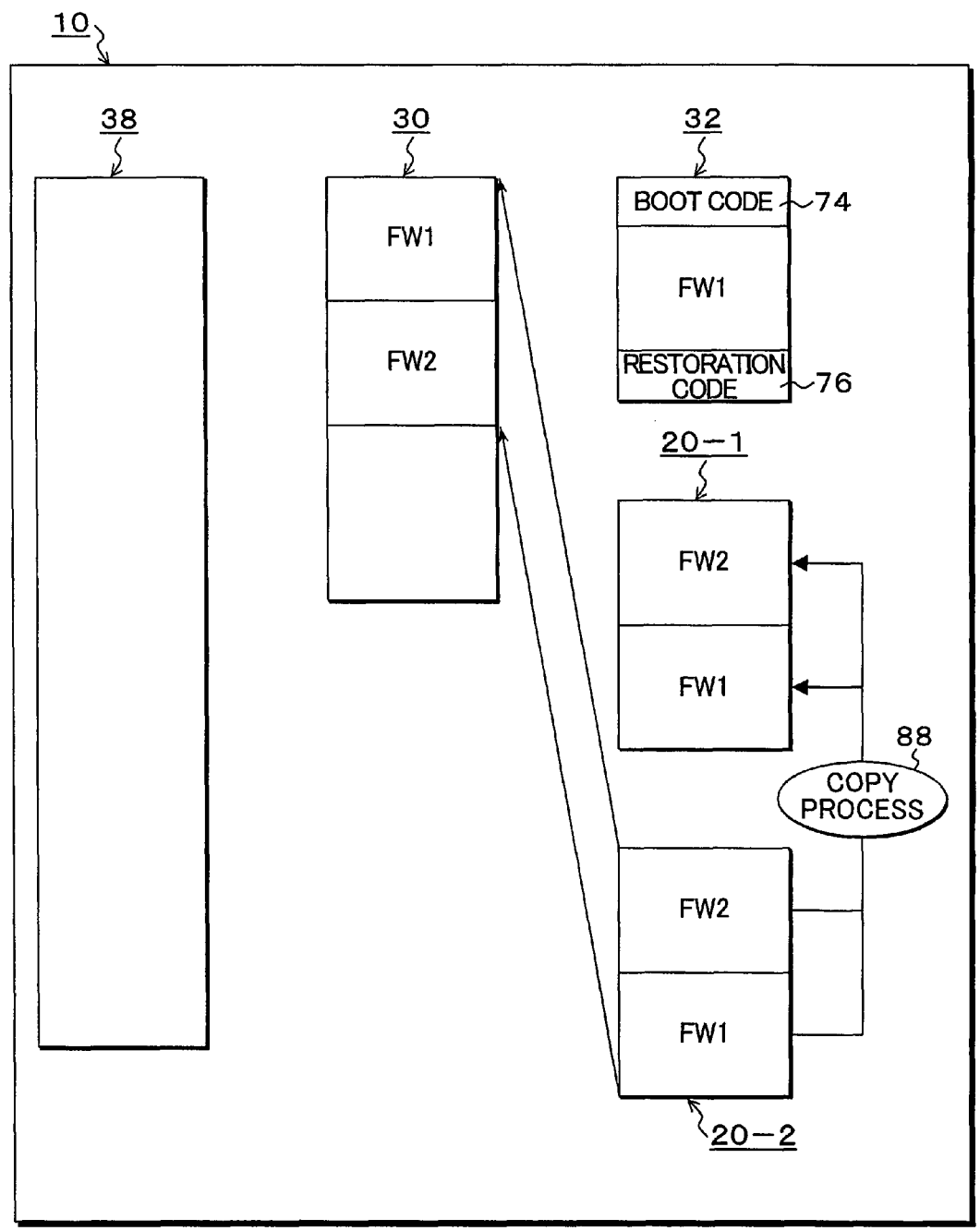
FIG. 9 is an explanatory diagram of a recovery process during operation when start-up is performed by using a second magnetic disk.

The recovery processing unit 52 provided in the MPU 26 of FIGS. 1A and 1B will next be described. When the start-up processing unit 48 performs start-up in the first start-up mode of FIG. 4, the recovery processing unit 52 copies the firmware of the first magnetic disk 20-1, which is used in start-up, to the second magnetic disk 20-1 as shown in FIG. 8, thereby ensuring the identity between the first magnetic disk 20-1 and the second magnetic disk 20-2 in which it is duplicated and saved. Moreover, when the start-up processing unit 48 performs start-up in the second start-up mode of FIG. 5, the recovery processing unit 52 copies the firmware of the second magnetic disk 20-2, which is used in start-up, to the first magnetic disk 20-2 as shown in FIG. 9, thereby ensuring the identity between the first magnetic disk 20-1 and the second magnetic disk 20-2 in which it is duplicated and saved.

Figure 7:
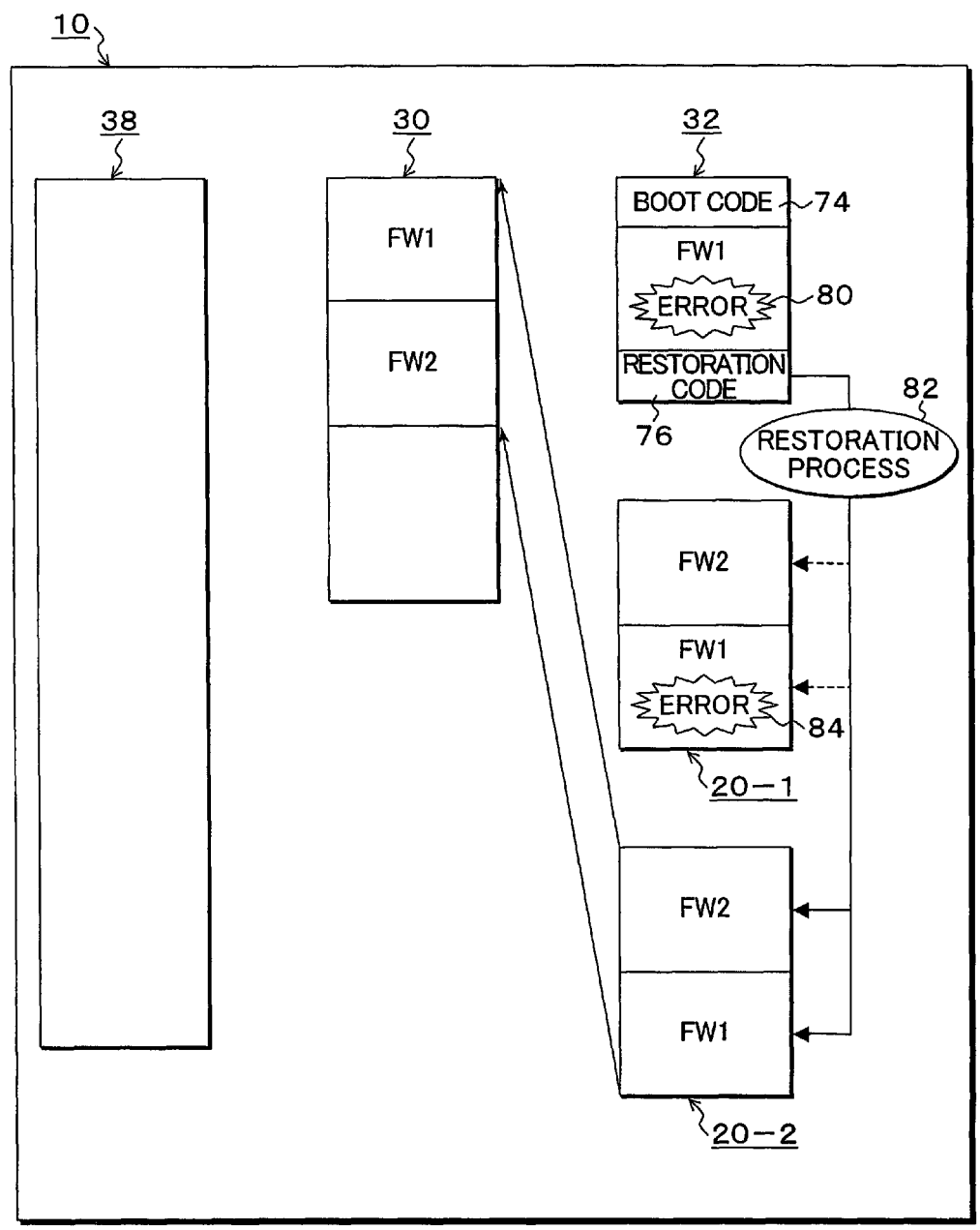
FIG. 7 is an explanatory diagram of a start-up process of a fourth start-up mode by the start-up processing unit of the present embodiment.

Furthermore, when the start-up processing unit 48 performs start-up in the third start-up mode of FIG. 6, the recovery processing unit 52 copies the firmware of the first magnetic disk 20-1, which is used in start-up, to the second magnetic disk 20-2 as shown in FIG. 8 as well as the first start-up mode. When the start-up processing unit 48 performs start-up in the fourth start-up mode of FIG. 7, the recovery processing unit 52 may copy the firmware of the second magnetic disk 20-2, which is used in start-up, to the first magnetic disk 20-1 as shown in FIG. 9.

Figure 10:
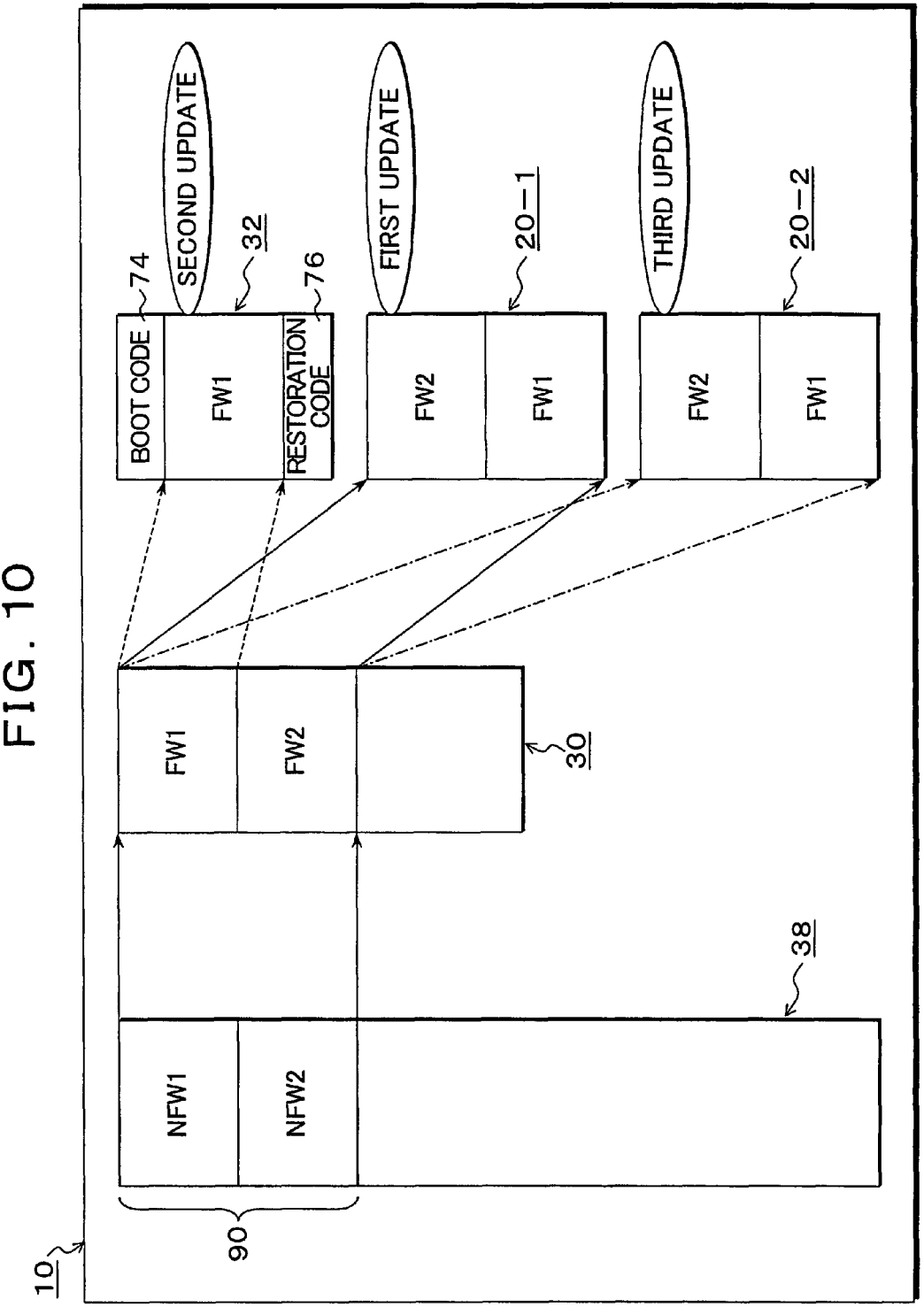
FIG. 10 is an explanatory diagram of a firmware updating process.

The function of the firmware update processing unit 50 provided in the MPU 26 of FIGS. 1A and 1B will next be described. When a firmware update request is received from a host serving as an upper-level apparatus, as shown in FIG. 10, the firmware update processing unit 50 downloads new firmware NFW1 and NFW2 to the firmware storage area 90 of the buffer memory 38, then overwrites the old firmware FW1 and FW2, which is read and allocated to the volatile memory 30 and executed, so as to switch it to the new firmware, and then performs a reboot process which is caused by power-on (power-on start), thereby switching to execution of the new firmware. In this course, the start-up (reboot of power-on start) after the old firmware of the volatile memory 30 is switched to the new firmware is a start-up process in which execution from a top code of the new firmware of the volatile memory 30 is merely started without performing reading and allocation of the firmware by executing the boot code 74. When the switching in which the downloaded new firmware is allocated to the volatile memory 30 and executed is thus finished, in the present embodiment, the host is notified of update completion of the firmware. Herein, the new firmware NFW1 and NFW2 has an update completion notification code at a top position thereof; and, when it is written to the volatile memory 30 and switching is executed, the update completion notification code is executed first, and the update completion notification is caused to transmitted to the host. The update completion notification code is a code which is executed merely once, is deleted or invalidated after the execution, and is not stored in the non-volatile memory 32 side. Therefore, in the upper-level apparatus, the firmware update completion notification can be obtained without waiting actual completion of the firmware update with respect to the non-volatile memory 32 or the first magnetic disks 20-1 and 20-2 in the magnetic disk apparatus 10 side of the present embodiment. Thus, when, as shown in FIG. 2, the plurality of magnetic disk apparatuses 10-11 to 10-25 are disposed in the disk enclosures 62-1 and 62-2 of the disk array apparatus 56 and update of firmware is requested for each of them from the control module 60-1 side, the firmware update processing time of each of the magnetic disk apparatuses viewed from the disk array apparatus 56 can be reduced, and reduction in processing performance upon the firmware update as a whole system can be suppressed.

In FIG. 10, after the new firmware NFW1 and NFW2 is written to the volatile memory 30 and executed, the update process of the new firmware with respect to the non-volatile memory 32, the first magnetic disk 20-1, and the second magnetic disk 20-2 is executed by a background process during operation. The update process of the firmware is performed in the order of (1) the first magnetic disk 20-1, (2) the non-volatile memory 32, and (3) the second magnetic disk 20-2.

This order is denoted in FIG. 10 as "1st update", "2nd update", and "3rd update". Processing operations of the start-up processing unit 48 after an error occurs during firmware update shown in FIG. 10 performed by the firmware update processing unit 50 provided in the MPU 26 of FIGS. 1A and 1B will be described.

Figure 11:
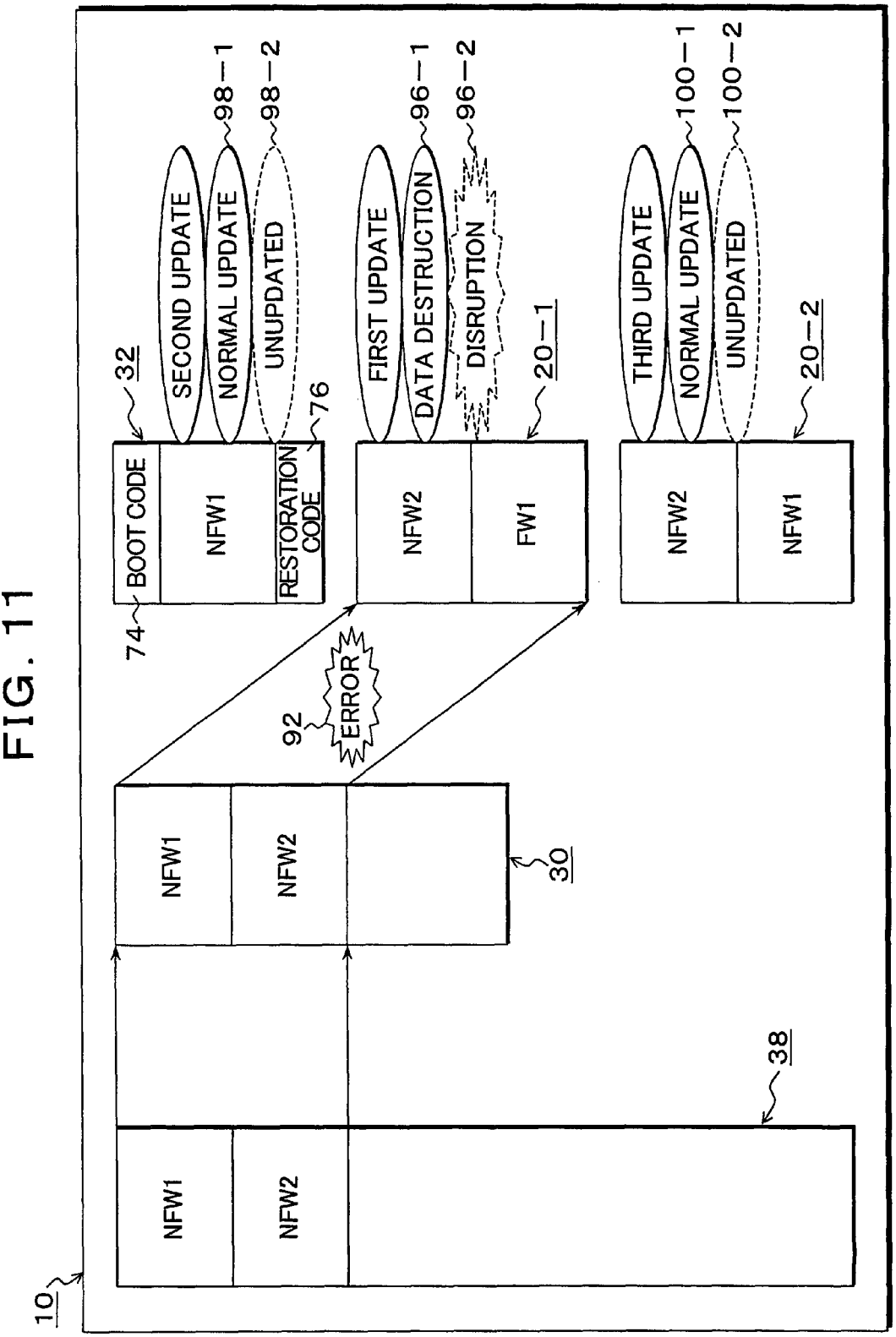
FIG. 11 is an explanatory diagram of the case in which an error occurs during update or immediately after update of the first magnetic disk.

FIG. 11 shows the case in which failure occurs and an error 92 is generated when the new firmware NFW1 and NFW2 of the volatile memory 30 is written to the first magnetic disk 20-1 and updated at the beginning, and, in this case, data destruction 96-1 occurs in the firmware of the first magnetic disk 20-1 due to generation of the error 92.

Figure 12:
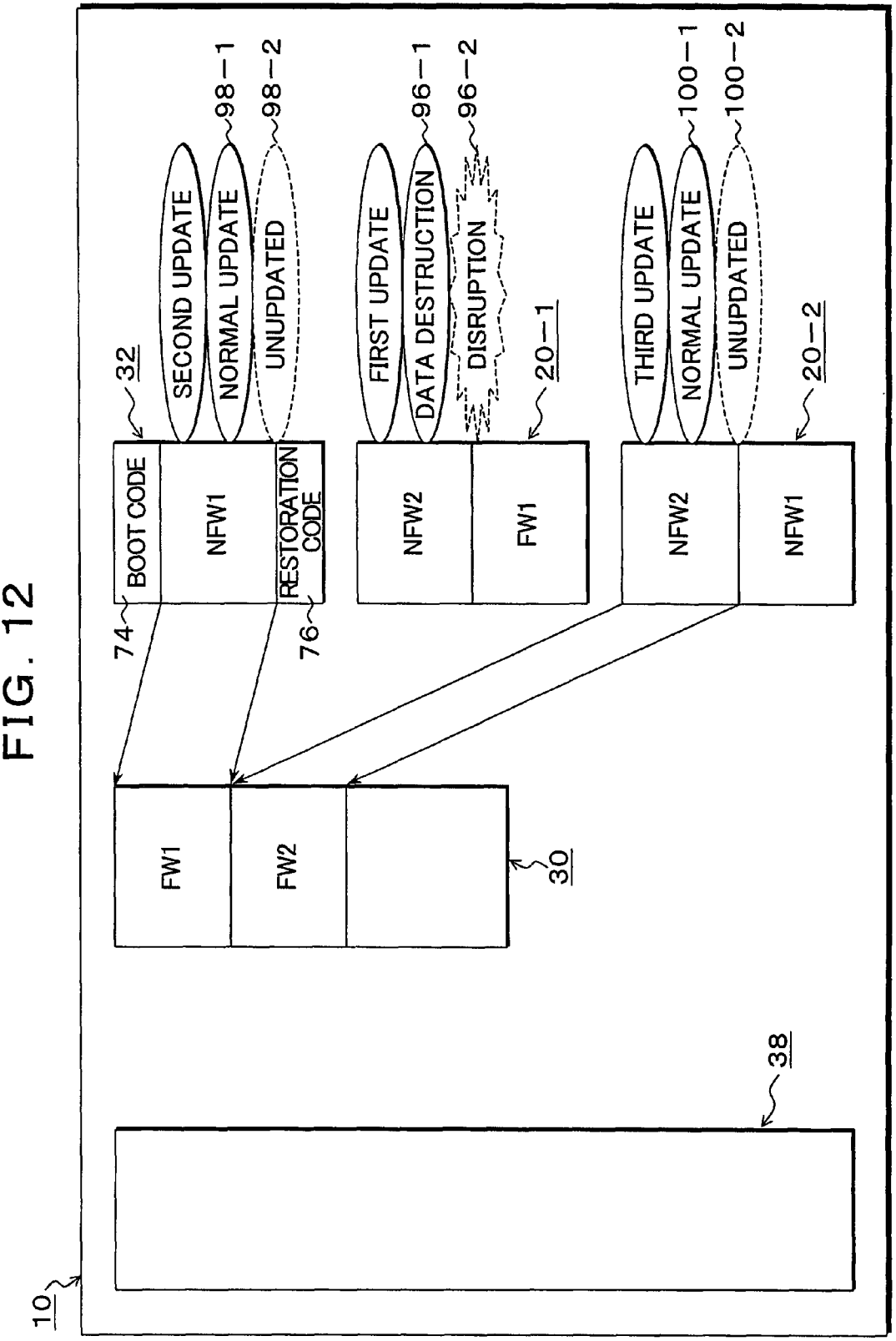
FIG. 12 is an explanatory diagram of a start-up process caused by power supply after an error occurs during update of FIG. 11.

When the power is turned on after such a firmware update error is generated, as shown in FIG. 12, the start-up processing unit 48 performs start-up in the first start-up mode at first. More specifically, since the non-volatile memory 32 is normal, the boot code 74 is executed, the firmware NFW1 of the non-volatile memory 32 is read and allocated to the volatile memory 30, and then the first magnetic disk 20-1 is checked. However, the data of the firmware NFW2 of the first magnetic disk 20-1 is destructed 96-1 due to the error occurred during the update or it is unreadable due to disruption 96-2, and abnormality is determined. Therefore, the start-up processing unit 48 shifts to the second start-up mode, and checks the second magnetic disk 20-2; since it is normal in this case, the firmware NFW2 can be read from the second magnetic disk 20-2 and allocated to the volatile memory 30, and the firmware NFW1 and NFW2 can be executed, thereby normally performing start-up.

Figure 13:
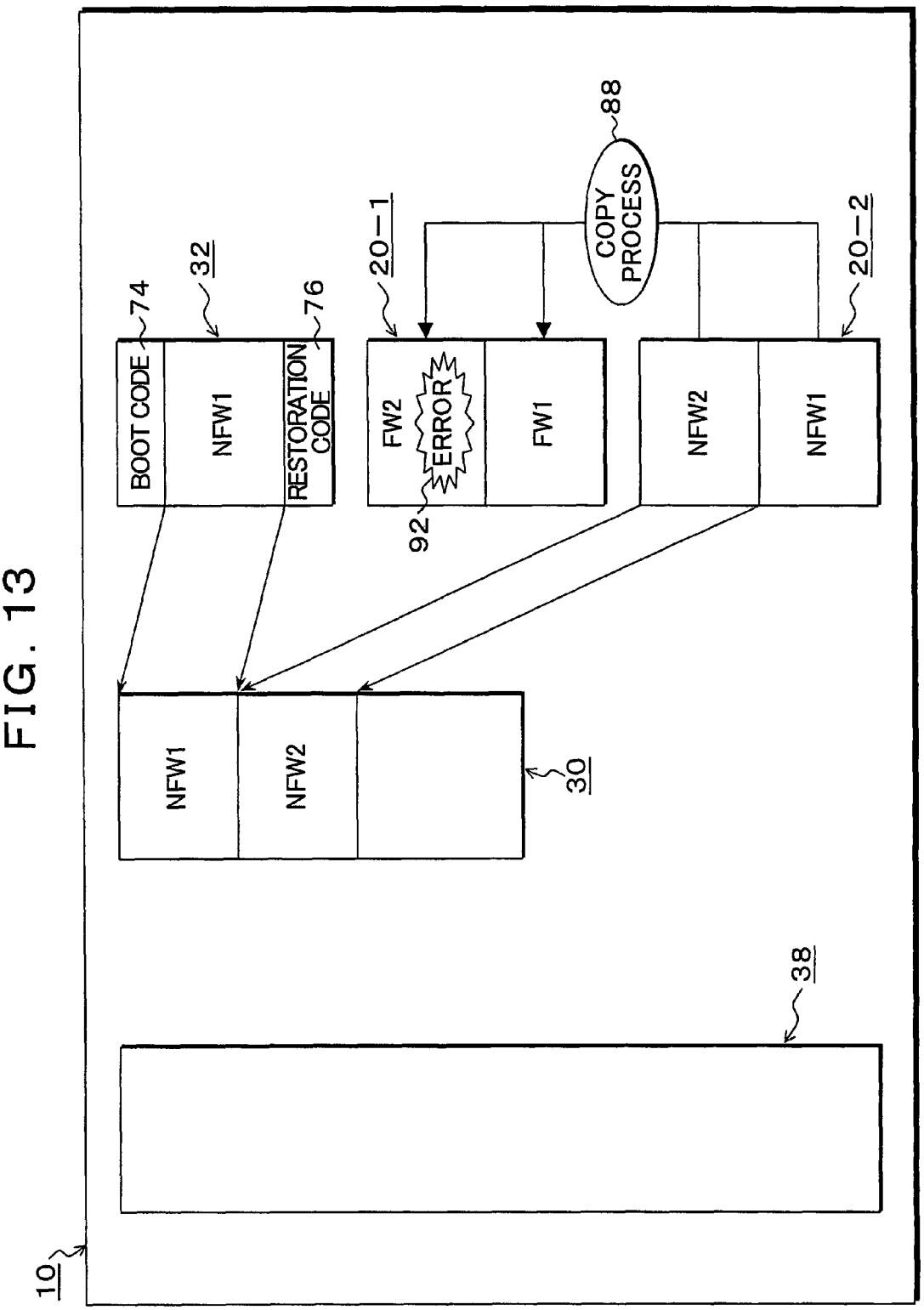
FIG. 13 is an explanatory diagram of a recovery process performed during operation after start-up is performed by the start-up process of FIG. 12.

As shown in FIG. 12, when normal start-up is performed by reading and allocation of the firmware FW1 and FW2 by the start-up processing unit 48 by the combination of the non-volatile memory 32 and the second magnetic disk 20-2, a recovery process shown in FIG. 13 is performed by the recovery processing unit 52 as a background process during operation after the start-up. This recovery process is equivalent to the recovery process shown in FIG. 9, wherein the firmware FW1 and FW2 of the second magnetic disk 20-2 is written to the first magnetic disk 20-1 in which the error 92 has occurred, thereby solving the data destruction and generating a correct storage state of the firmware FW1 and FW2.

Figure 14:
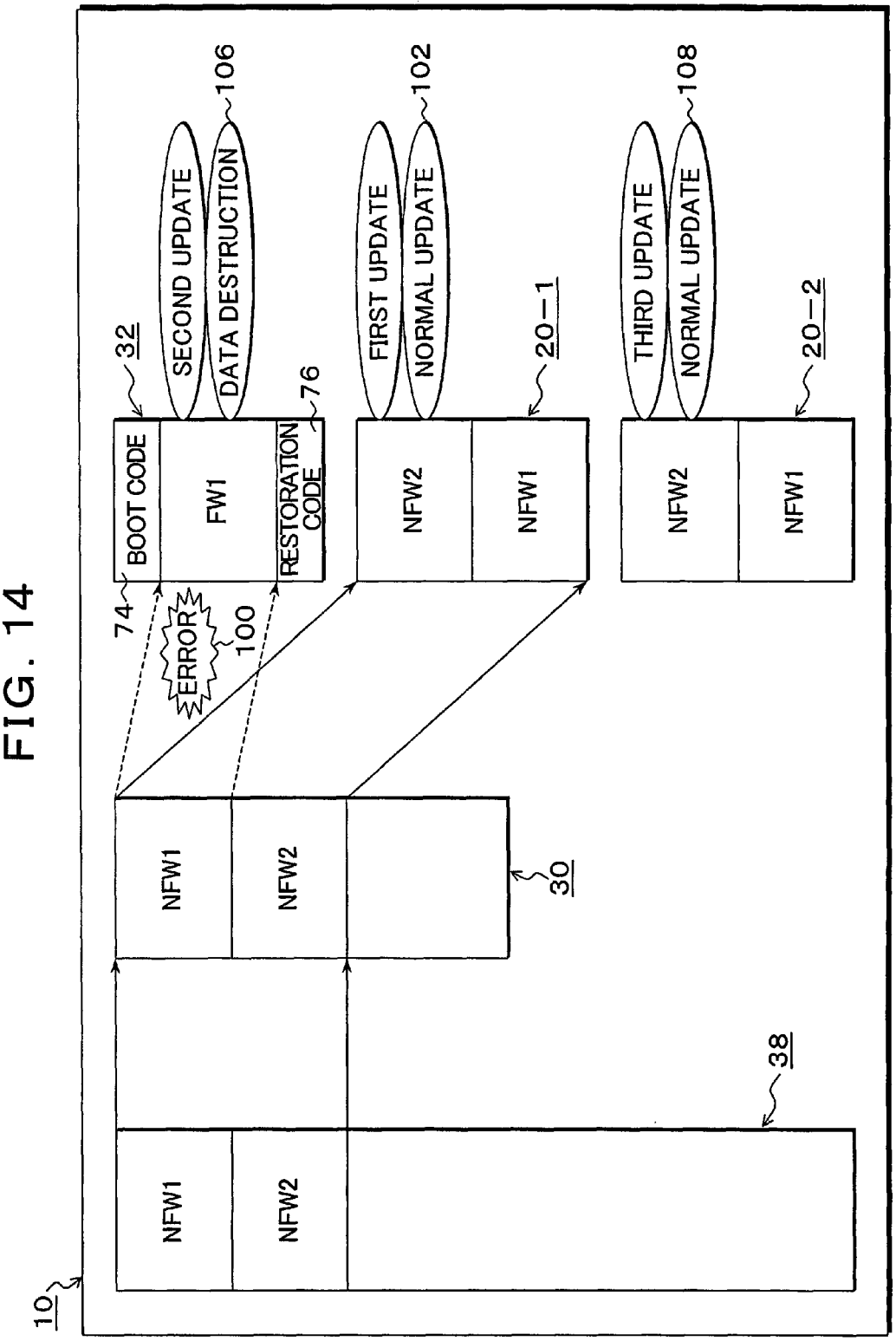
FIG. 14 is an explanatory diagram of the case in which an error occurs during update of a non-volatile memory.

FIG. 14 shows the case in which, after update of the new firmware NFW2 and NFW1 with respect to the first magnetic disk 20-1 is completed as normal update 102 by the firmware update processing unit 50, an error 104 occurs during update of the new firmware NFW1 with respect to the non-volatile memory 32, which is a second update, and data destruction 106 is caused.

Figure 15:
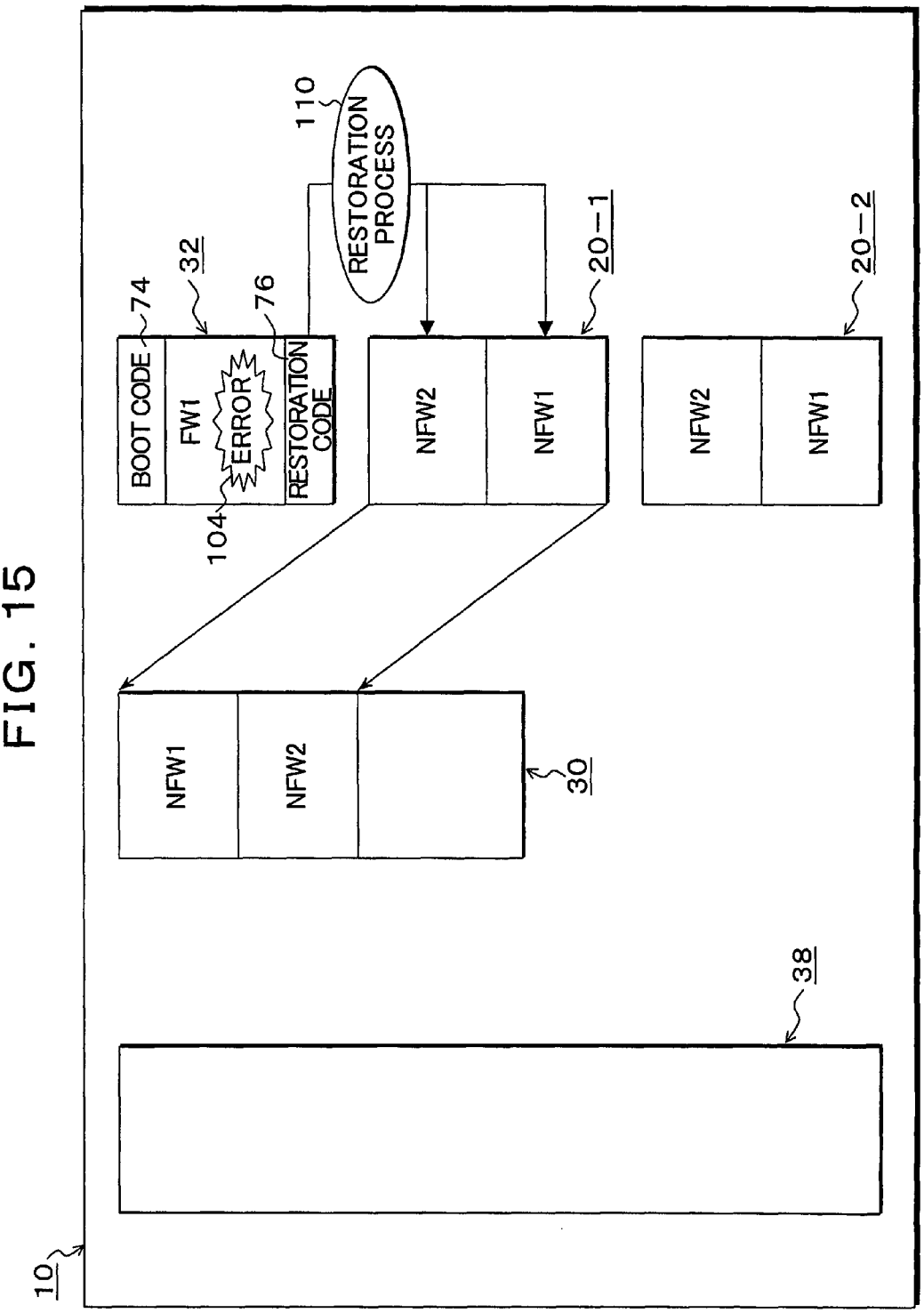
FIG. 15 is an explanatory diagram of a start-up process caused by power supply after an error occurs during update of FIG. 14.

FIG. 15 is an explanatory diagram of a start-up process performed by the start-up processing unit 48 when a second error status is saved according to the error during update of the non-volatile memory 32 of FIG. 14, and the power of the apparatus is then turned on. In the start-up process in this case caused by the power-on, in a diagnosis process accompanying the power-on in which the checksum of the firmware FW1 stored in the non-volatile memory 32 is tested, the checksum is abnormal due to the data destruction due to the error 104, and a diagnosis error is detected. Therefore, the non-volatile memory 32 is determined to be abnormal due to the diagnosis error, and the start-up processing unit 48 performs a restoration process 110 according to the third start-up mode by executing the restoration code 76. In the restoration process 110 of the third start-up mode, the firmware NFW1 and NFW2 of the first magnetic disk 20-1 is read, allocated to the volatile memory 30, and executed; thus normal update can be performed.

Figure 16:
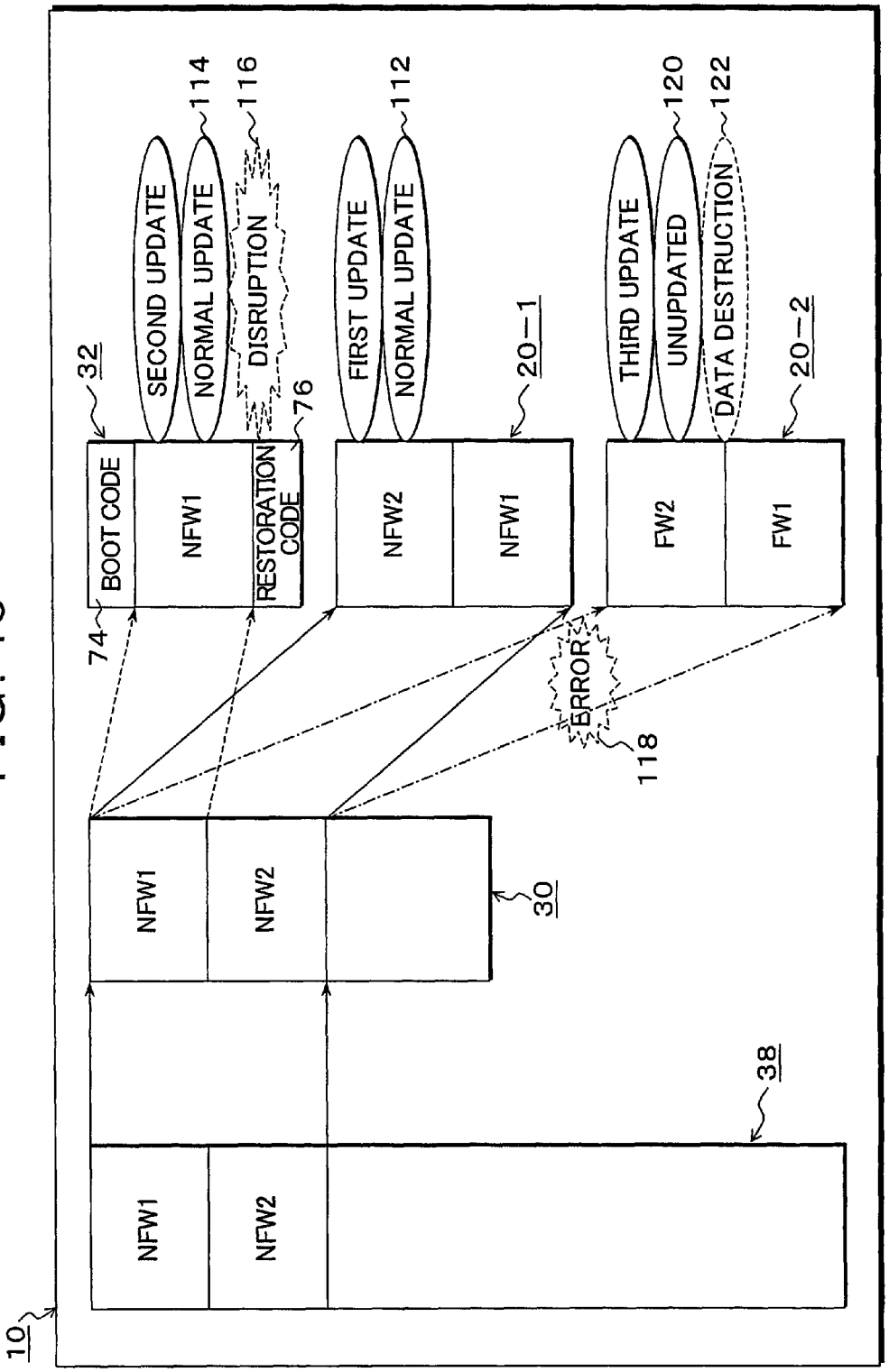
FIG. 16 is an explanatory diagram of the case in which an error occurs immediately after update of the non-volatile memory or during update of the second magnetic disk.

FIG. 16 is the case in which disruption 116 occurs immediately after the firmware update with respect to the non-volatile memory 32 which is a second update performed by the firmware update processing unit 50 of FIGS. 1A and 1B, and, in this case, the firmware FW1 and FW2 of the second magnetic disk 20-2 is unupdated. Also, in the case in which, although update of the non-volatile memory 32 is normally performed and disruption does not occur, an error 118 occurs during update of the second magnetic disk 20-2 which is the 3rd update, and data destruction 122 occurs, the firmware FW1 and FW2 of the second magnetic disk 20-2 is unupdated as well as the case of the error due to the disruption 116 immediately after the update completion of the non-volatile memory 32.

Figure 17:
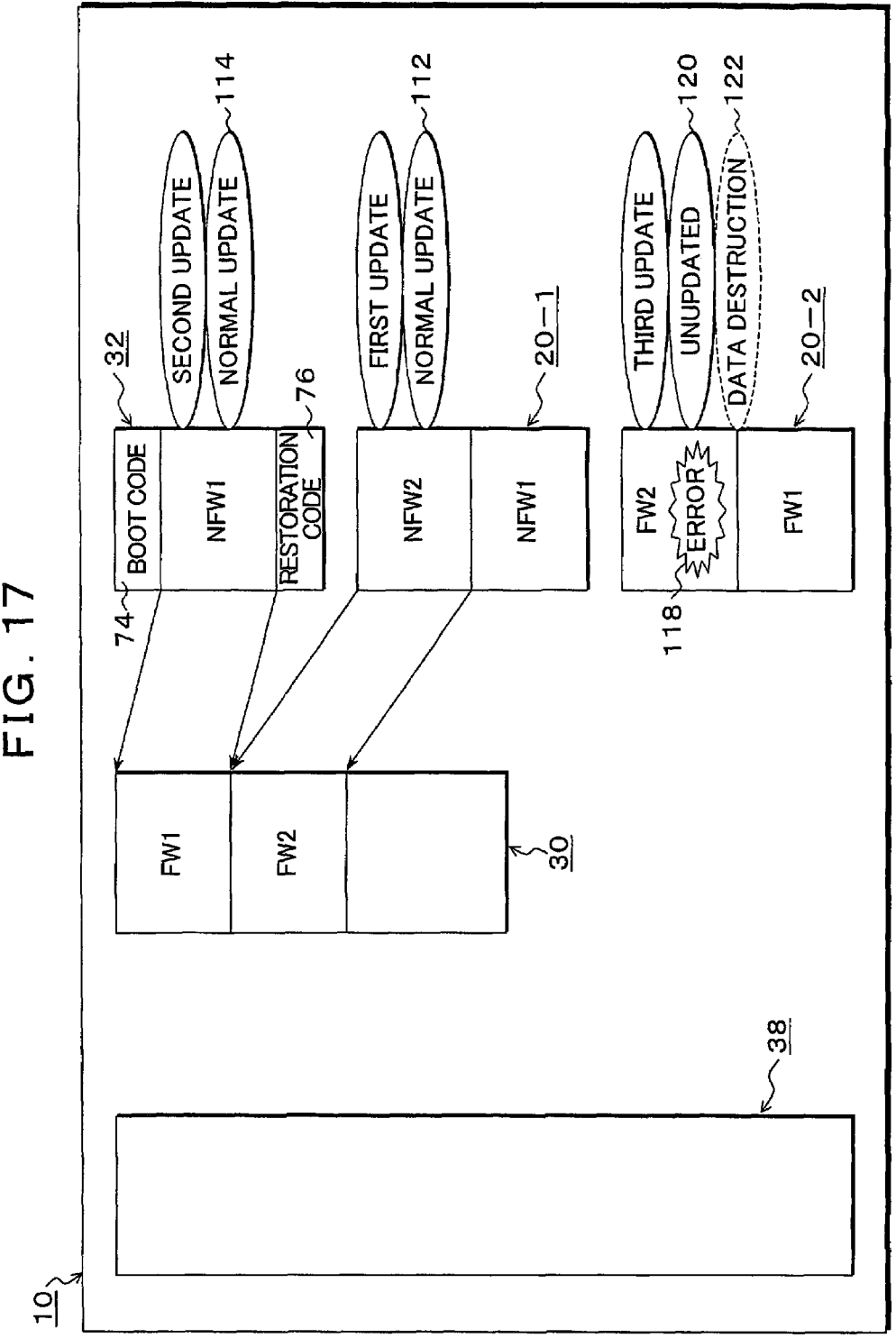
FIG. 17 is an explanatory diagram of a start-up process caused by power supply after the error occurs during the update of FIG. 16.

When the power is turned on after the error occurs during update of FIG. 16 in the above described manner, a start-up process is performed by the start-up processing unit 48 as shown in FIG. 17. In FIG. 17, since the non-volatile memory 32 is normal according to diagnosis upon the power-on, as the first start-up mode, the boot code 74 is executed, and the firmware NFW1 of the non-volatile memory 32 is read and allocated to the volatile memory 30. Then, the first magnetic disk 20-1 is checked, and it is normal; therefore, the firmware NFW2 thereof is read and allocated to the volatile memory 30, and the allocated firmware NFW1 and NFW2 is executed, thereby performing normal update.

Figure 18:
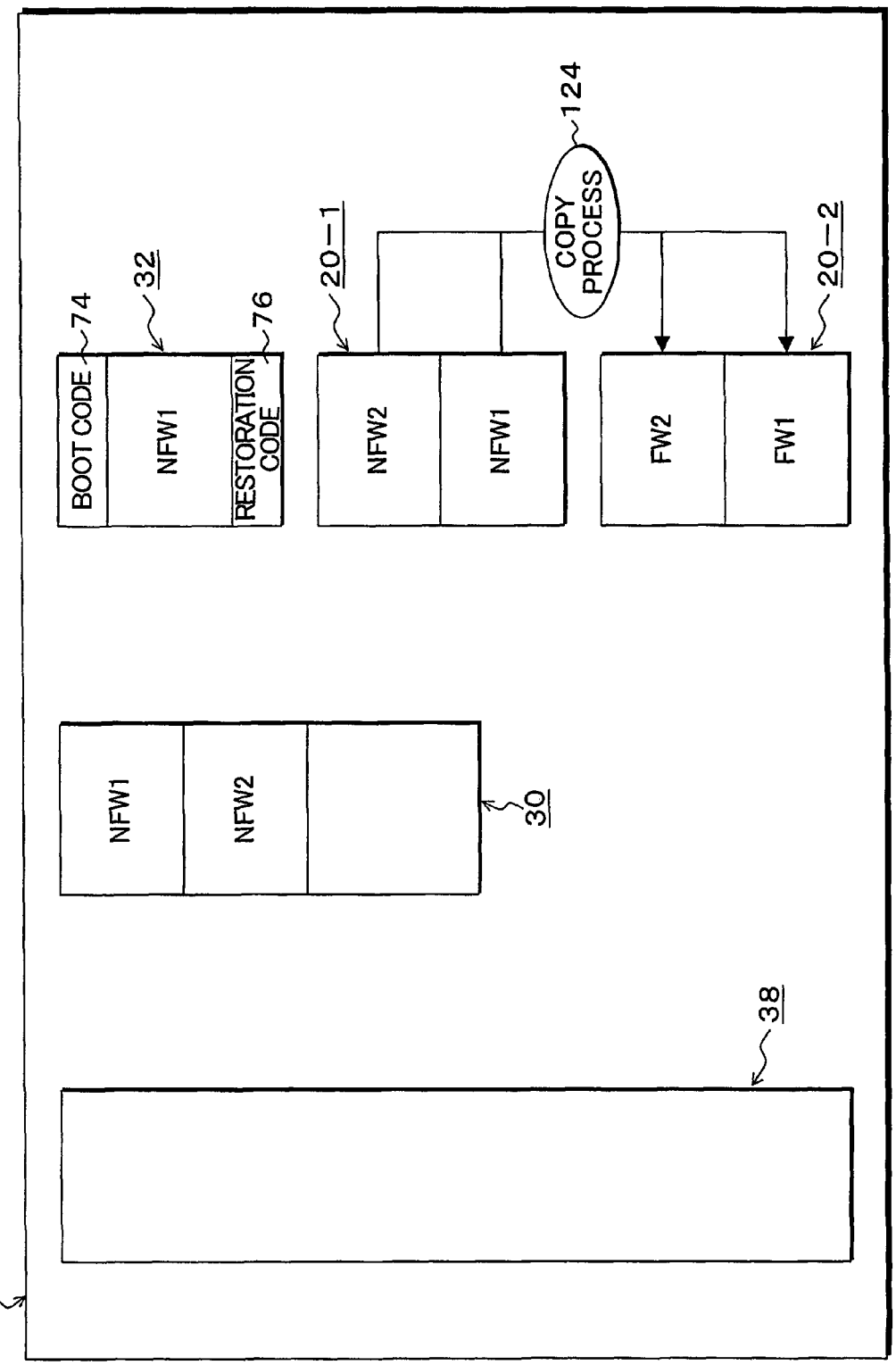
FIG. 18 is an explanatory diagram of a recovery process performed during operation after start-up is performed in the start-up process of FIG. 17.

After the normal operation is performed by the reading allocation of the firmware of FIG. 17, a recovery process shown in FIG. 18 is performed by the recovery processing unit 52. More specifically, as a background process during operation of the apparatus, the recovery processing unit 52 writes the firmware NFW1 and NFW2 of the first magnetic disk 20-1, which is used in the start-up, to the second magnetic disk 20-2 by a copy process 124. Consequently, the data destruction 122 due to the error 118 which has occurred during the firmware update of the second magnetic disk 20-2 of FIG. 16 is solved. At the same time, the copy process 124 practically performs a firmware updating process in which the old firmware FW1 and FW2 of the second magnetic disk 20-2 is written over by the new firmware NFW1 and NFW2 of the first magnetic disk 20-1.

Figure 19:
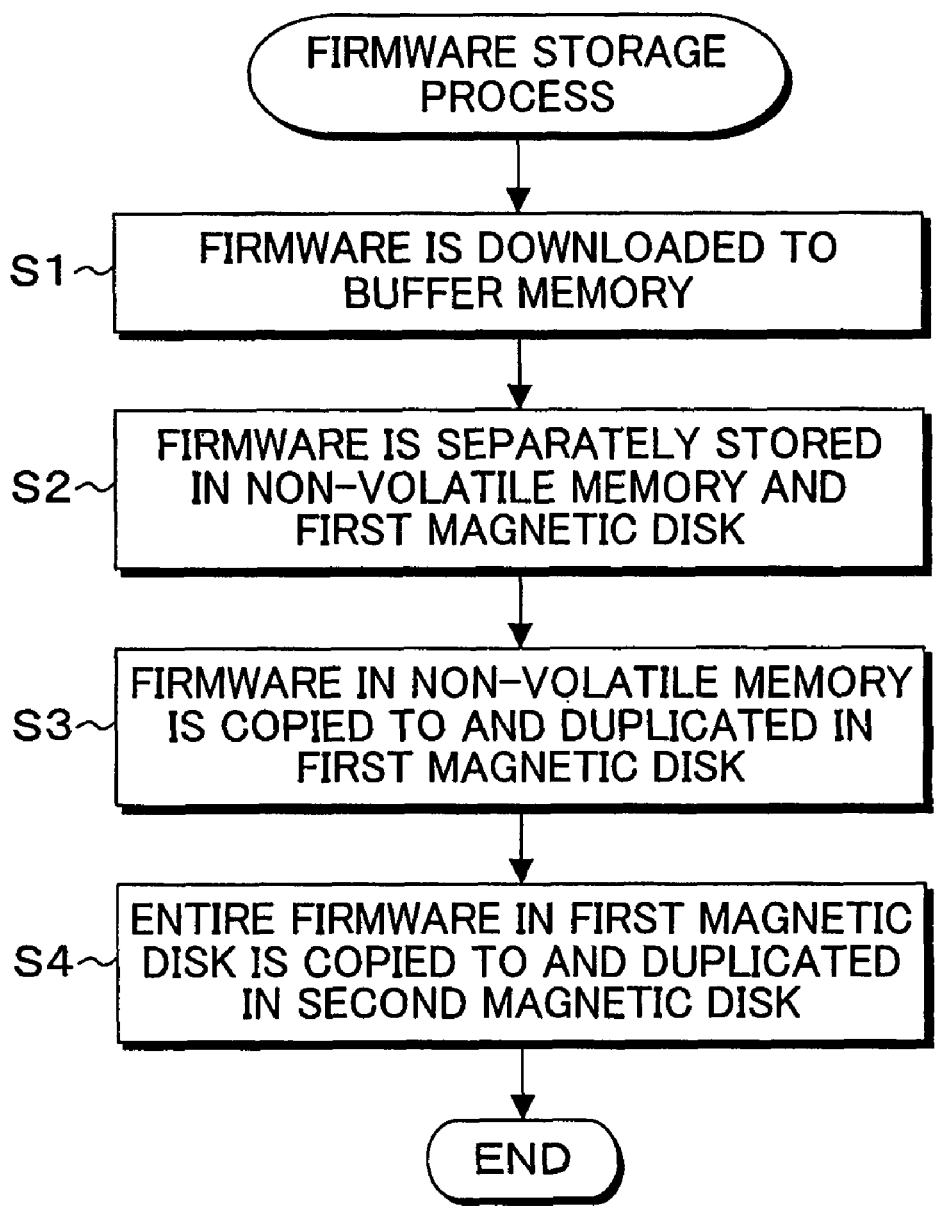
FIG. 19 is a flow chart of a firmware storage process which is performed in a manufacturing stage and according to the present embodiment.

FIG. 19 is a flow chart of a firmware storage process which is performed in a manufacturing stage of the magnetic disk apparatus 10 by the firmware storage processing unit 46 provided in the MPU 26 of FIGS. 1A and 1B. In FIG. 19, in the firmware storage process, after the firmware is downloaded from download equipment or a host to the buffer memory 38 in step S1, the firmware in the buffer is divided for the non-volatile memory 32 and the first magnetic disk 20-1 and stored as the firmware FW1 and FW2 in step S2 for example as shown in FIG. 4. Next, in step S3, the firmware FW1 stored in the non-volatile memory 32 is copied to the firmware storage area 72-3 of the first magnetic disk 20-1, thereby duplicating it. As a matter of course, in the write to the firmware storage area 72-3, the corresponding firmware FW1 may be copied and duplicated from the buffer memory 38. Furthermore, in step S4, the firmware FW1 and FW2 of the first magnetic disk 20-1 is copied to the second magnetic disk 20-2, thereby duplicating it. Also in this case, it goes without saying that the firmware FW1 and FW2 in the buffer memory 38 may be copied to the second magnetic disk 20-2 so as to duplicate it. When such firmware storage process of FIG. 19 is completed, since the function of the firmware storage processing unit 46 of FIGS. 1A and 1B is unnecessary, a firmware storage processing program which realizes this function and is downloaded to the non-volatile memory 32 is deleted.

FIG. 20 is a flow chart showing a processing operation of the embodiment of the magnetic disk apparatus 10 of FIGS. 1A and 1B after the firmware is stored. At first, when the power of the magnetic disk apparatus 10 is turned on, a start-up process is executed by the start-up processing unit 48 in step S1. This start-up process is a start-up process which is in any of the first start-up mode to the fourth start-up mode. When normal start-up is carried out by the start-up process of step S1, and an operation state is achieved, presence of a command from the host is checked in step S2. When the command is received, the command is executed in step S3. This command is a read command or a write command from the host, and, specifically, the command from the host is executed after it is stored in a queue. When there is a firmware update request from the host in step S4 during operation, the process proceeds to step S5, in which a firmware update process by the firmware update processing unit 50 is executed. Meanwhile, idle in which there is no command is determined in step S2, the process proceeds to step S7, in which a recovery process is executed by the recovery processing unit 52 as a background process. When it is determined in step S8 that an update flag is set by the firmware updating process of step S5, an internal updating process in which the firmware is updated by writing the firmware to the first magnetic disk 20-1, the non-volatile memory 32, and the second magnetic disk 20-2 in the described order is executed in step S9 as a background process. Such processes of steps S2 to S5 and S7 to S9 are repeated until there is a stop instruction in step S6.

Figure 21A:
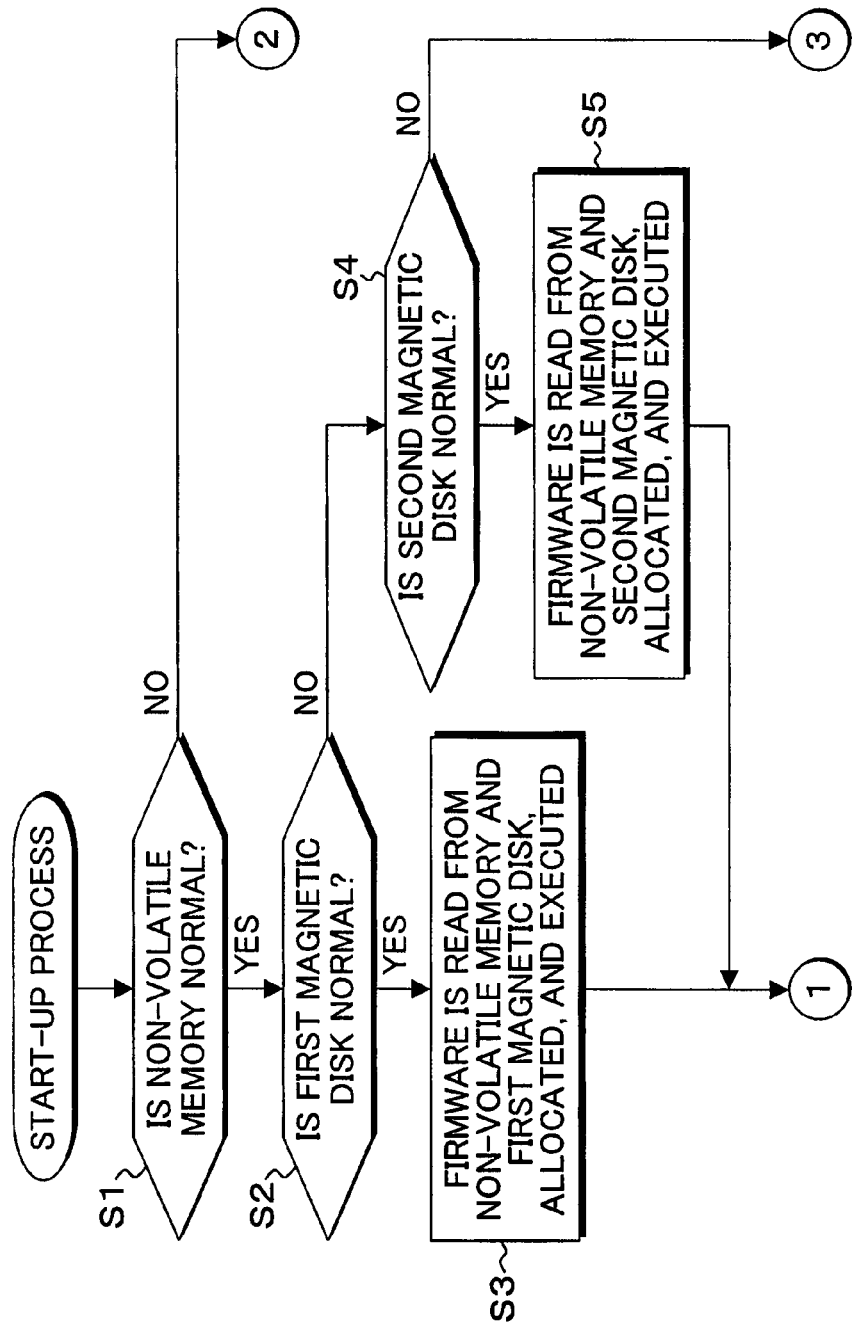
FIGS. 21A and 21B are flow charts showing details of the start-up process of step S1 of FIG. 20.
Figure 21B:
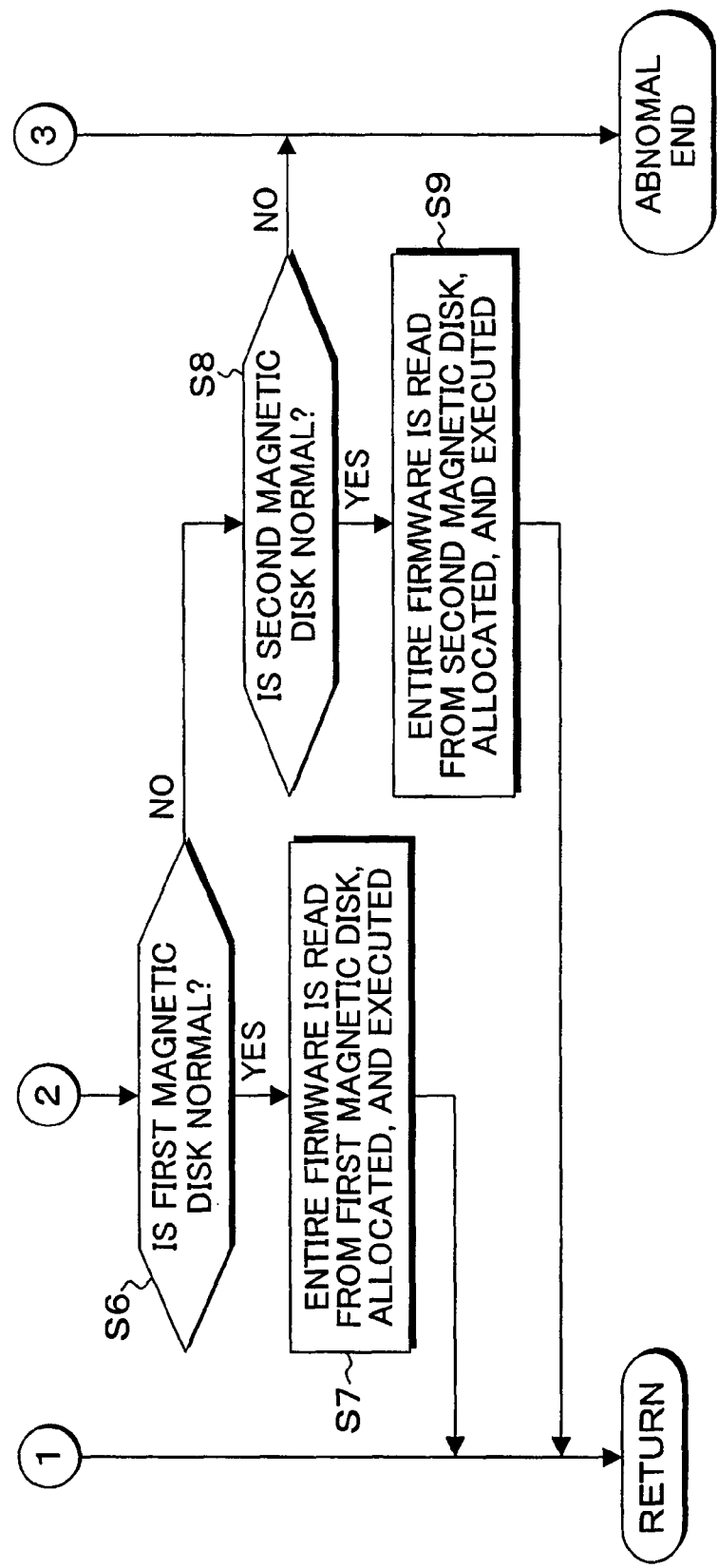

FIGS. 21A and 21B are explanatory diagrams showing details of the start-up process of step S1 of FIG. 20. In FIGS. 21A and 21B, in the start-up process, whether the firmware of the non-volatile memory 32 is normal or not is determined in step S1; and, if normal, the process proceeds to step S2 in which whether the first magnetic disk 20-1 is normal or not is determined. When both the non-volatile memory 32 and the first magnetic disk 20-1 are normal, the process proceeds to step S3, in which the firmware is read from the non-volatile memory 32 and the first magnetic disk 20-1, allocated to the volatile memory 30, and executed according to the first start-up mode. When abnormality of the first magnetic disk 20-1 is determined in step S2, the process proceeds to step S4, in which whether the second magnetic disk 20-2 is normal or not is determined. When the second magnetic disk 20-2 is normal, the process proceeds to step S5, in which the firmware is read from the non-volatile memory 32 and the second magnetic disk 20-2, allocated to the volatile memory 30, and executed according to the second start-up mode. When abnormality of the non-volatile memory 32 is determined in step S1, the process proceeds to step S6, in which whether the first magnetic disk 20-1 is normal or not is determined. When the first magnetic disk 20-1 is normal, the process proceeds to step S7, in which the entire firmware is read from the first magnetic disk 20-1, allocated to the volatile memory 30, and executed according to the third start-up mode. When abnormality of the first magnetic disk 20-1 is determined in step S6, the process proceeds to step S8, in which whether the second magnetic disk 20-2 is normal or not is determined. When the second magnetic disk 20-2 is normal, the process proceeds to step S9, in which the entire firmware is read from the second magnetic disk 20-2, allocated to the volatile memory 30, and executed according to the fourth start-up mode. When abnormality of the second magnetic disk 20-2 is determined in step S8, the process is abnormally ended.

Figure 22:
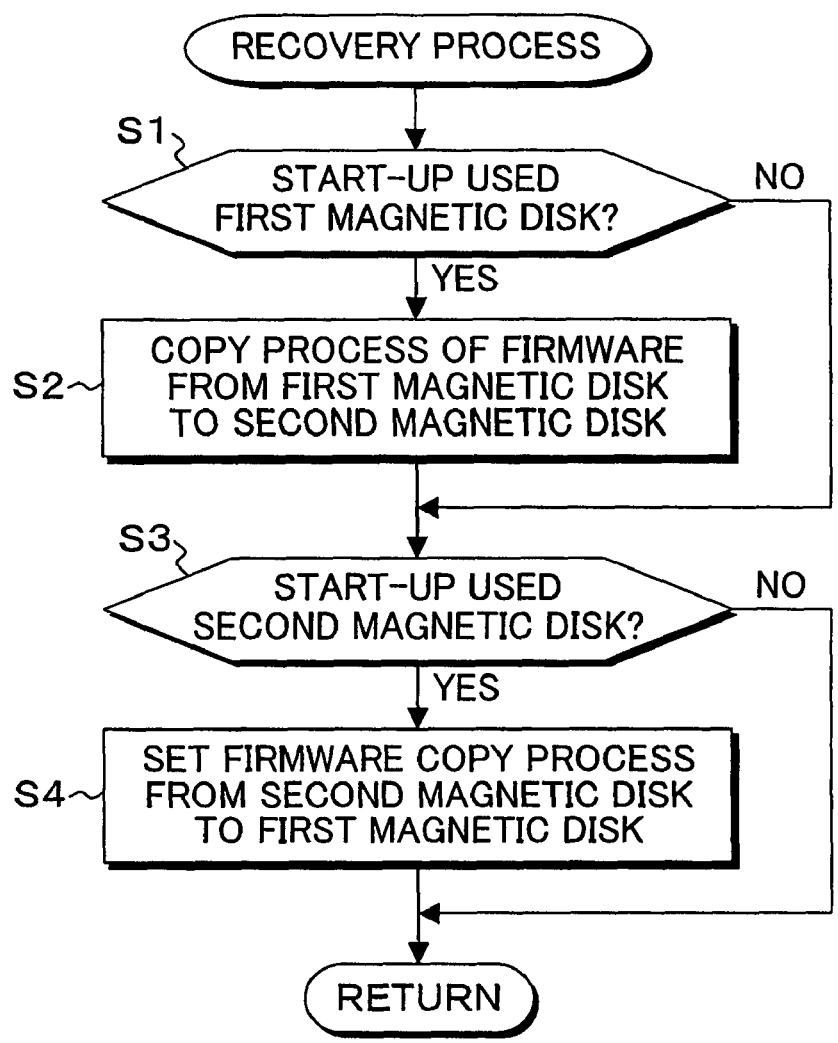
FIG. 22 is a flow chart showing details of the recovery process of step S7 of FIG. 20.

FIG. 22 is a flow chart showing details of the recovery process of step S7 of FIG. 20. In FIG. 22, at first, whether the start-up is performed by using the first magnetic disk 20-1 or not is determined in step S1; and, when the start-up is performed by using the first magnetic disk 20-1, the process proceeds to step S2, in which a process of copying the firmware of the first magnetic disk 20-1 to the second magnetic disk 20-2 is executed. When it is determined in step S1 that it is not the start-up using the first magnetic disk 20-1, the process proceeds to step S3, in which whether the start-up is performed by using the second magnetic disk 20-2 or not is determined. When it is determined that the start-up is performed by using the second magnetic disk 20-2, the process proceeds to step S4, in which a process of copying the firmware of the second magnetic disk 20-2 to the first magnetic disk 20-1 is executed.

Figure 23:
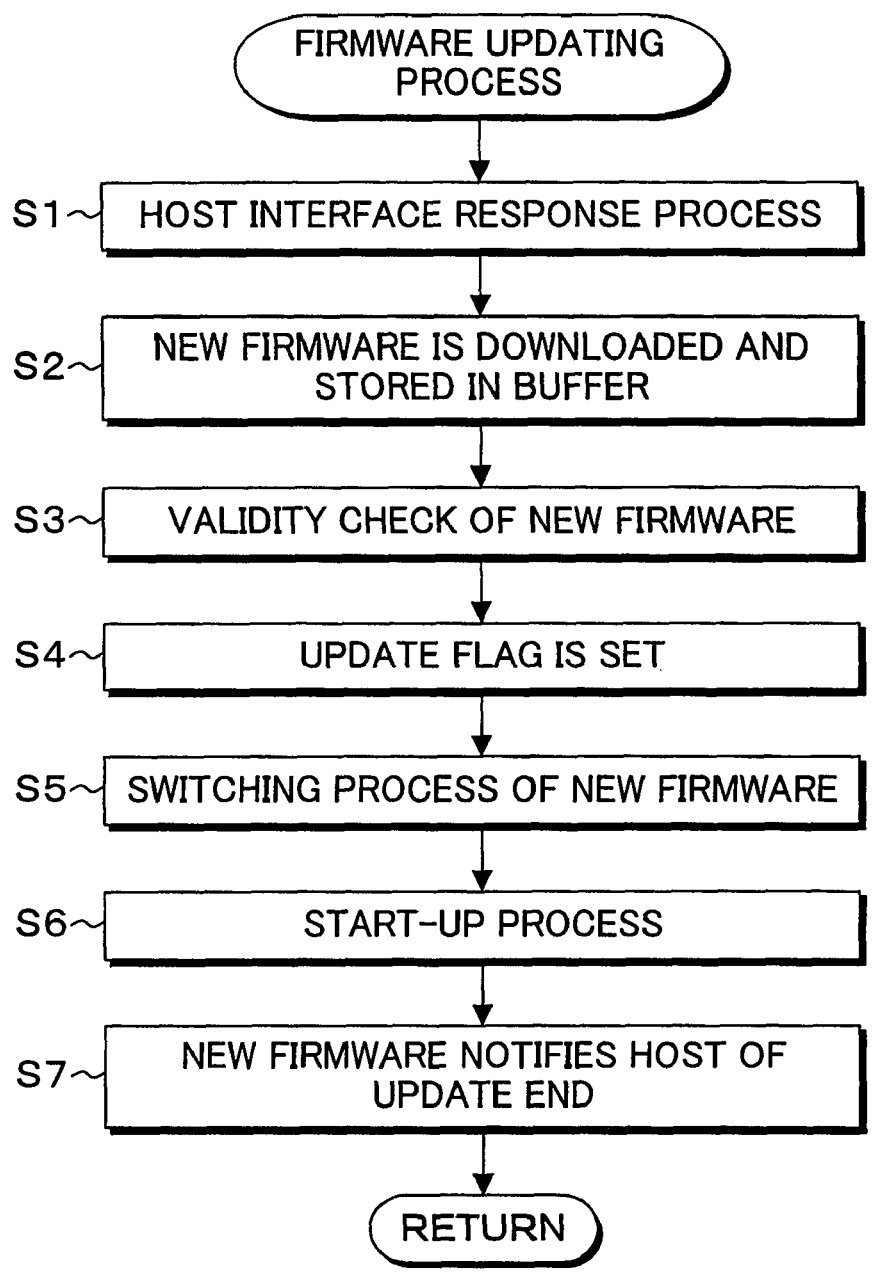
FIG. 23 is a flow chart showing details of the firmware updating process of step S5 of FIG. 20.

FIG. 23 is a flow chart showing details of the firmware updating process of step S5 of FIG. 20. In FIG. 23, in step S1, when the host interface control unit 34 receives a firmware update requesting command from the host, the host interface control unit establishes interface connection with the host by performing a host interface response process; and, in step S2, the new firmware transmitted from the host is received and stored in the buffer memory 38 as shown in FIG. 10. Subsequently, in step S3, validity is confirmed for the received new firmware stored in the buffer memory 38 by a checksum or the like; and, when validity is confirmed, the update flag is set in step S4 for performing an internal updating process as a background process. Then, in step S5, the old firmware of the volatile memory 30 is written over by the new firmware stored in the buffer memory 38, thereby switching the old firmware to the new firmware. Subsequently, the switched new firmware is executed by performing the start-up process which is known as power-on start in step S6, the host is notified of the update completion with respect to the firmware updating request by executing the new firmware in step S7, and the series of firmware downloading processes are completed.

Figure 24:
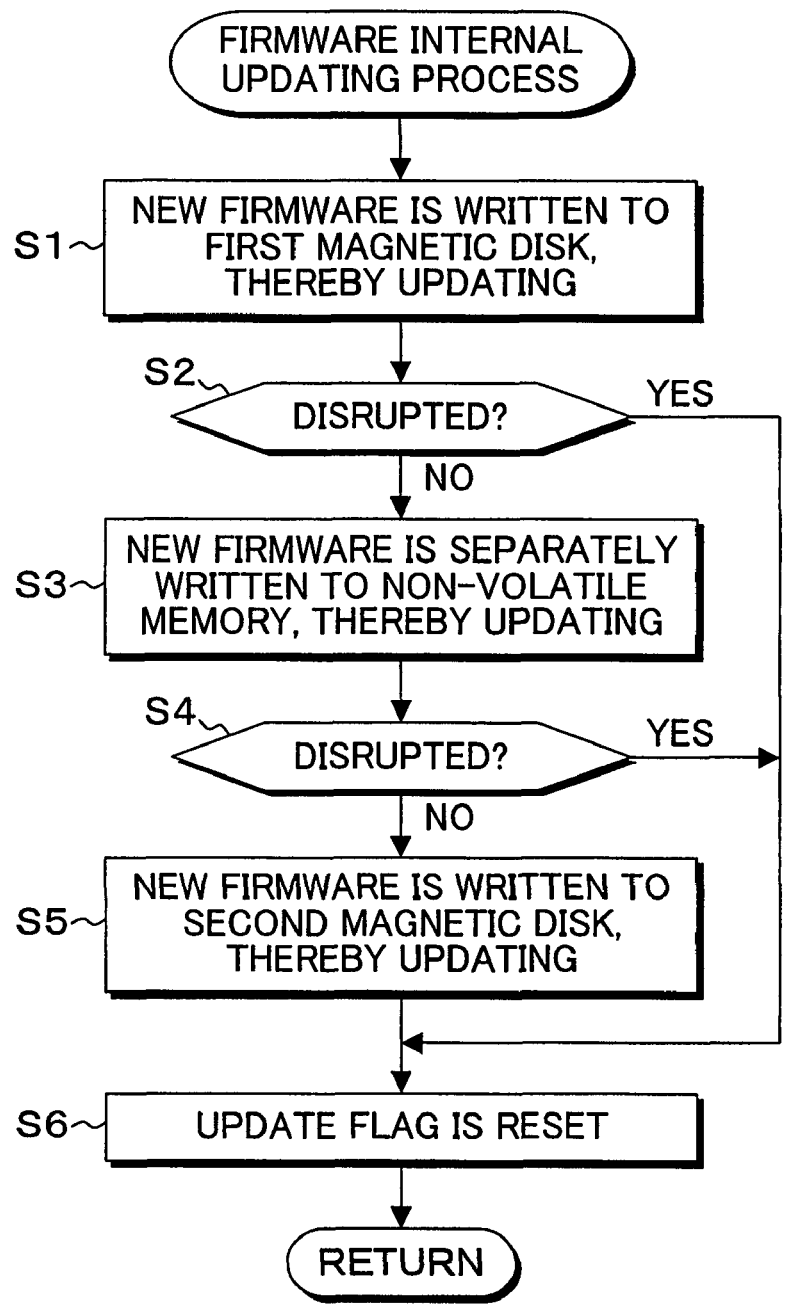
FIG. 24 is a flow chart showing details of the firmware internal updating process of step S9 of FIG. 20.

FIG. 24 is a flow chart showing details of the firmware internal updating process of step S9 of FIG. 20. At first, in step S1, as shown in FIG. 11, the new firmware NFW1 and NFW2 allocated to the volatile memory 30 is written to the first magnetic disk 20-1, thereby performing update. Subsequently, in step S2, whether disruption has occurred or not immediately after the update of the first magnetic disk 20-1 is determined. If there is no disruption, the process proceeds to step S3, in which the new firmware NFW1 allocated to the volatile memory 30 is separately written to the non-volatile memory 32, thereby performing update. Subsequently, in step S4, whether disruption has occurred or not immediately after the update of the non-volatile memory 32 is determined. When it is determined in step S4 that there is no disruption, the process proceeds to step S5, in which the new firmware NFW1 and NFW2 allocated to the volatile memory 30 is written to the second magnetic disk 20-2, thereby performing update. Thus, all the internal update is completed; therefore, the update flag is reset in step S6, and the process returns to the main routine of FIG. 20. When disruption is determined in step S2 or step S4, although the update is uncompleted, the update flag is reset in step S6, and the process returns to the main routine of FIG. 20. Meanwhile, when the disruption is determined in step S2, as a start-up process upon power-on thereafter, if the non-volatile memory 32 is normal, the first start-up mode in which the old firmware is read from the combination of the non-volatile memory 32 and the second magnetic disk 20-1 and allocated to the volatile memory 30, thereby performing start-up is executed. If abnormality of the non-volatile memory 32 is determined, the third start-up mode in which the entire new firmware is read from the first magnetic disk 20-1, allocated to the volatile memory 30, and executed is employed; or, if there is abnormality in the first magnetic disk 20-1, the fourth start-up mode in which the entire old firmware is read from the second magnetic disk 20-2, allocated to the volatile memory 30, and executed is employed; thus, start-up can be reliably performed upon power-on thereafter. When the disruption is determined in step S4, the new firmware is stored in the non-volatile memory 32 and the first magnetic disk 20-1, and the old firmware is saved in the second magnetic disk 20-2; therefore, upon power-on thereafter, start-up can be reliably performed by any of the first to fourth start-up modes. Furthermore, when start-up is performed by using the first magnetic disk 20-1, by the copy process of step S2 in the recovery process of FIG. 22, the recovery process in which the updated new firmware of the first magnetic disk 20-1 is written to the old firmware of the unupdated second magnetic disk 20-2 is performed in background; and, in this stage, firmware update of the second magnetic disk 20-2 is practically performed.

Figure 25:
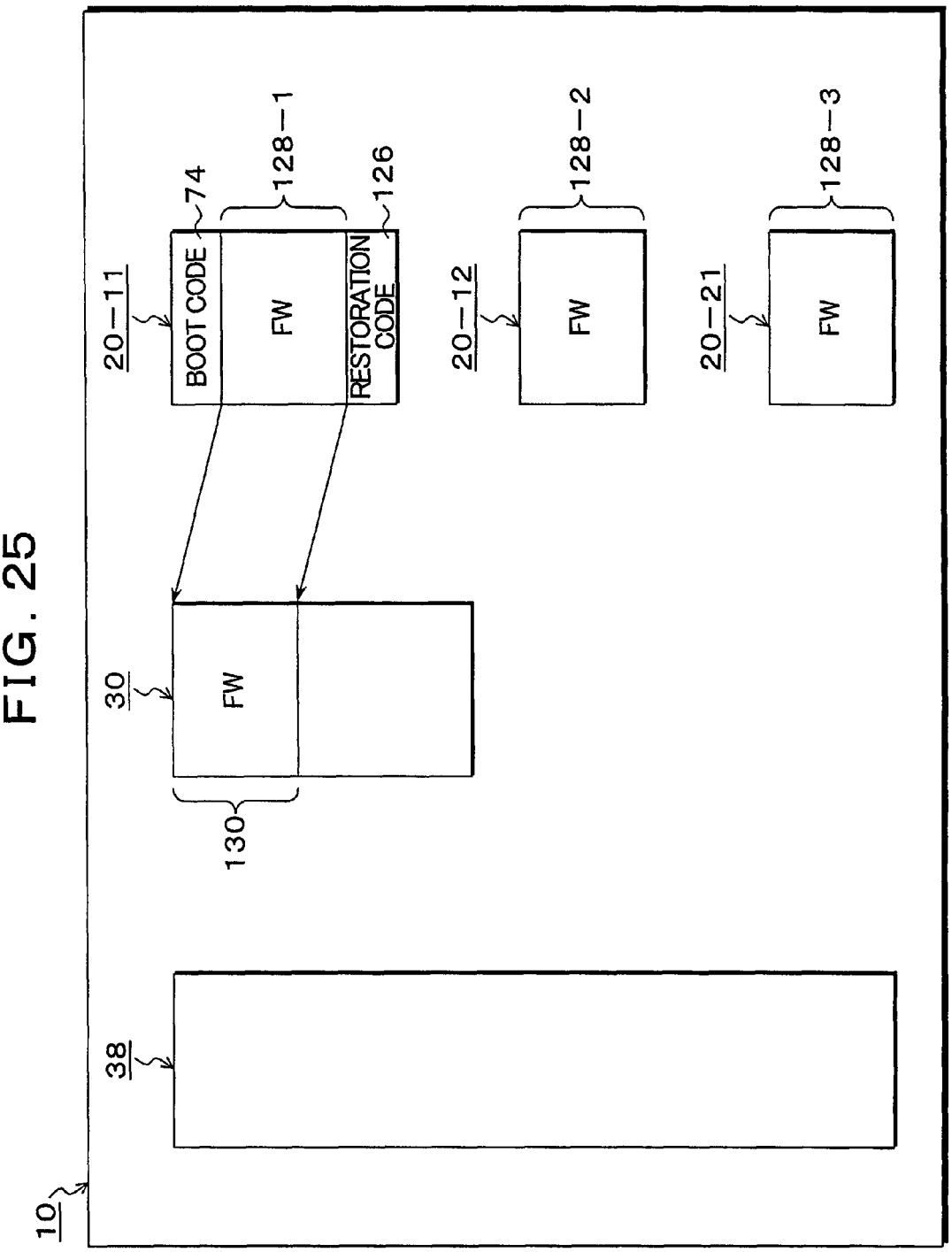
FIG. 25 is an explanatory diagram of storage state of firmware in another embodiment of the present invention which is for an apparatus which does not have non-volatile memory.

FIG. 25 shows an embodiment of the firmware storage state of another embodiment of the present invention which is for a magnetic disk apparatus not having a non-volatile memory such as a flash ROM which is expensive in terms of cost. In the magnetic disk apparatus which is an object of the embodiment of FIG. 25, the non-volatile memory 32 in the magnetic disk apparatus 10 of FIGS. 1A and 1B is not provided, and all the functions of the non-volatile memory 32 is handled by write to the magnetic disks 20-1 and 20-2. The storage of the firmware in this embodiment is performed by using a first magnetic disk 20-11, a second magnetic disk 20-12, and a third magnetic disk 20-21. Note that each of the first magnetic disk 20-11, the second magnetic disk 20-12, and the third magnetic disk 20-21 may be one magnetic disk, or a recording surface corresponds to each of them since a magnetic disk has recording surfaces on both sides. In the first magnetic disk 20-11, the boot code 74 is stored at the top, the firmware FW1 is stored in the firmware storage area 128-1 subsequent to that, and, furthermore, a restoration code 126 is stored. In firmware storage areas 128-2 and 128-3 of the second magnetic disk 20-12 and the third magnetic disk 20-21, copies of the firmware FW of the first magnetic disk 20-11 are stored. Also in the embodiment having the firmware storage allocation of FIG. 25, the functions of the firmware storage processing unit 46, the start-up processing unit 48, the firmware update processing unit 50, and the recovery processing unit 52 are similarly provided in the MPU 26 of FIGS. 1A and 1B. More specifically, in the embodiment of FIG. 25, the firmware storage processing unit 46 stores the firmware FW1 in the first magnetic disk 20-11 in which the boot code 74 serving as a start-up code and the restoration code 126 are stored, and stores a copy of the firmware FW, which is stored in the first magnetic disk 20-11, in each of the second magnetic disk 20-12 and the third magnetic disk 20-21. The start-up processing unit 48 performs start-up in any of a first start-up mode to a third start-up mode upon power-on. In the first start-up mode, when the first magnetic disk 20-11 is normal, the firmware FW of the first magnetic disk 20-11 is read and allocated to the volatile memory 30 and executed based on the start-up code 74. In the second start-up mode, when the first magnetic disk 20-11 is abnormal in the first start-up mode, the firmware FW of the second magnetic disk 20-12 is read and allocated to the volatile memory 30 and executed. In the third start-up mode, when the second magnetic disk 20-12 is abnormal in the second start-up mode, the firmware FW of the third magnetic disk 20-21 is read and allocated to the volatile memory 30 and executed.

Figure 26:
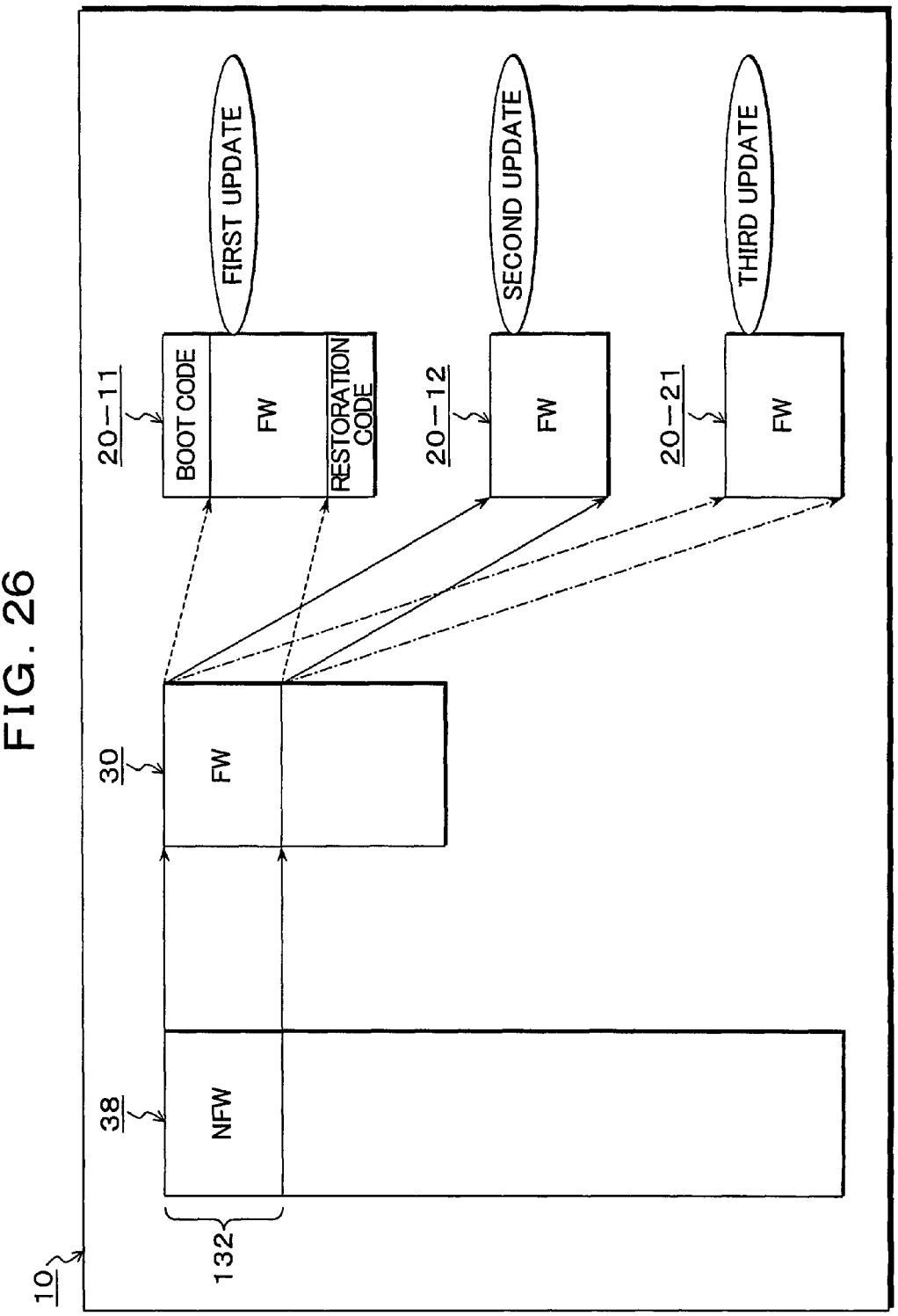
FIG. 26 is an explanatory diagram of a firmware updating process in the embodiment of FIG. 25.

When a firmware update request from the host is received, as shown in FIG. 26, the firmware update processing unit 50 stores the new firmware NFW in a firmware storage area 132 of the buffer memory 38, then overwrites the old firmware FW stored in the volatile memory 30, then performs switch to execution of the new firmware by a start-up process (reboot) caused by power-on start, notifies the host side of completion of the firmware update in this state, and then writes the new firmware NFW of the volatile memory 30 to the first magnetic disk 20-11, the second magnetic disk 20-12, and the third magnetic disk 20-21 in the described order, thereby performing update. Furthermore, the recovery processing unit 52 performs the below copy processes in the background.

(1) When the start-up processing unit 48 performs start-up in the first start-up mode, the firmware of the first magnetic disk 20-11 is copied to the second magnetic disk 20-12 and the third magnetic disk 20-21.

(2) When the start-up processing unit 48 performs start-up in the second start-up mode, the firmware of the second magnetic disk 20-12 is copied to the third magnetic disk 20-21 and the first magnetic disk 20-11.

(3) When the start-up processing unit 48 performs start-up in the third start-up mode, the firmware of the third magnetic disk 20-21 is copied to the first magnetic disk 20-11 and the second magnetic disk 20-12.

Figure 27:
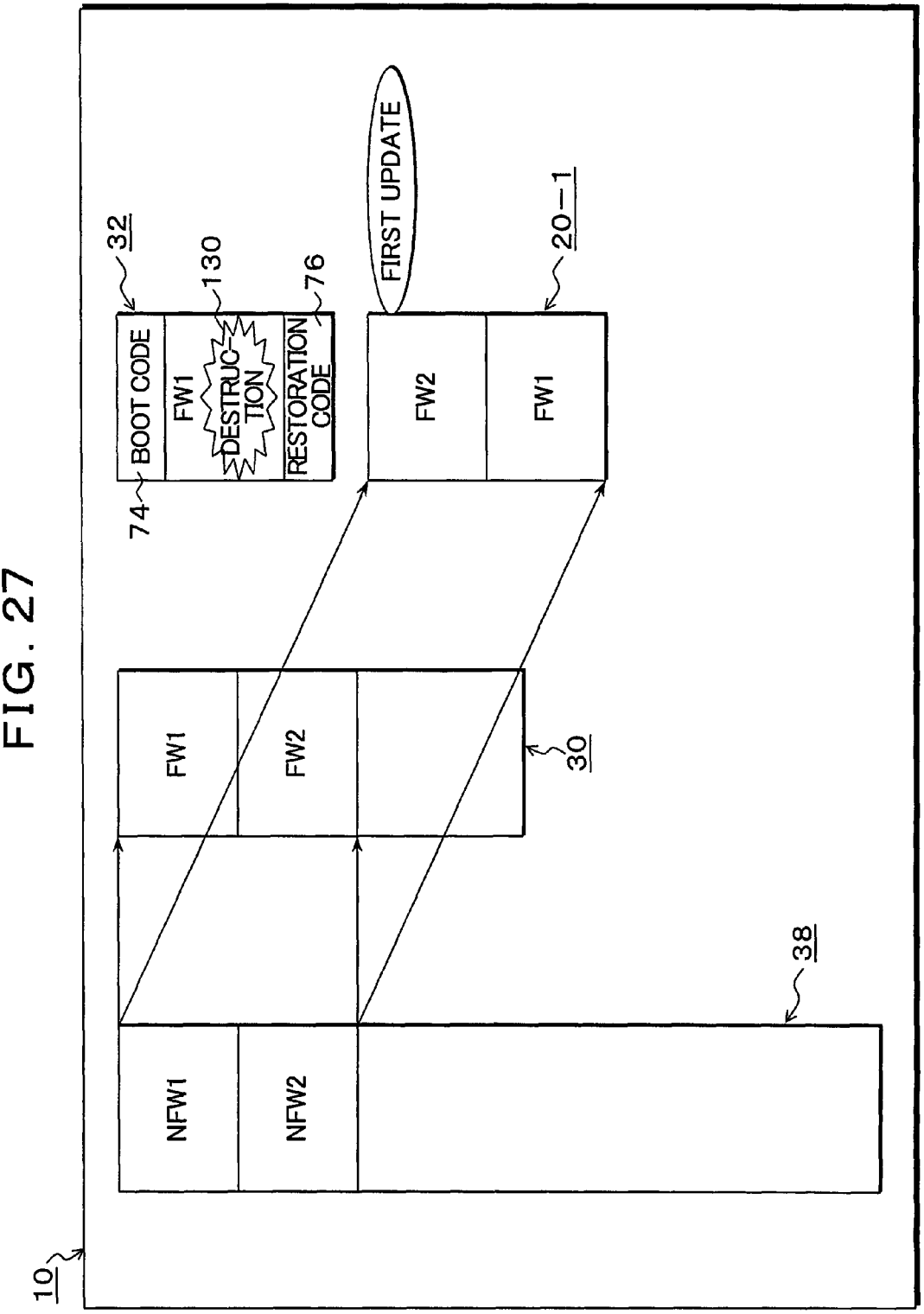
FIG. 27 is an explanatory diagram of allocation and an update process of firmware in another embodiment of the present invention.

FIG. 27 is an explanatory diagram of allocation arrangement and an updating process of firmware in another embodiment of the present invention. In the embodiment of FIG. 27, in a manufacturing stage, the firmware FW1 which is a part of the firmware is stored in the non-volatile memory 32, and the remaining firmware FW2 is stored in the first magnetic disk 20-1. Moreover, the firmware FW1 same as that of the non-volatile memory 32 is stored in the first magnetic disk 20-1. In other words, the entire firmware of the firmware FW1 and FW2 is stored in the first magnetic disk 20-1. Such storage of the firmware with respect to the non-volatile memory 32 and the first magnetic disk 20-1 is performed by the firmware storage processing unit 46 shown in the MPU 26 of FIGS. 1A and 1B. More specifically, in the case of the embodiment of FIG. 27, the firmware storage processing unit 46 stores the firmware FW1 and FW2 separately in the non-volatile memory 32, in which the boot code 74 serving as a start-up code and the restoration code 76 are stored, and the first magnetic disk 20-1 and stores copy of the firmware FW1 that is stored in the non-volatile memory 32 in the first magnetic disk 20-1 as the firmware FW1. Next, a process by the firmware update processing unit 50 shown in the MPU 26 of FIGS. 1A and 1B in the embodiment of FIG. 27 will be explained. When a firmware update command, which is an updating request of firmware, is received from the host serving as an upper-level apparatus, the firmware update processing unit 50 downloads new firmware NFW1 and NFW2 to the firmware storage area 90 of the buffer memory 38 and, then, in the first place, writes the new firmware NFW1 and NFW2 to the first magnetic disk 20-1 as first update. Subsequently, a destruction process 130 of destroying part of the old firmware FW1 of the non-volatile memory 32 is performed. Then, after the old firmware FW1 and FW2 read, allocated to, and executed in the volatile memory 30 is overwritten by the new firmware NFW1 and NFW2 of the buffer memory 38, when a reboot process caused by power supply (power-on start) is performed, switching to execution of the new firmware is performed. When switching in which the thus-downloaded new firmware is allocated to the volatile memory 30 and executed is finished, normal termination of the firmware update command is reported to the host. Then, in the background, an internal updating process in which the new firmware NFW1 of the volatile memory 30 is divided and, at the same time, written to the old firmware FW1 of the non-volatile memory 32 is performed.

Figure 28:
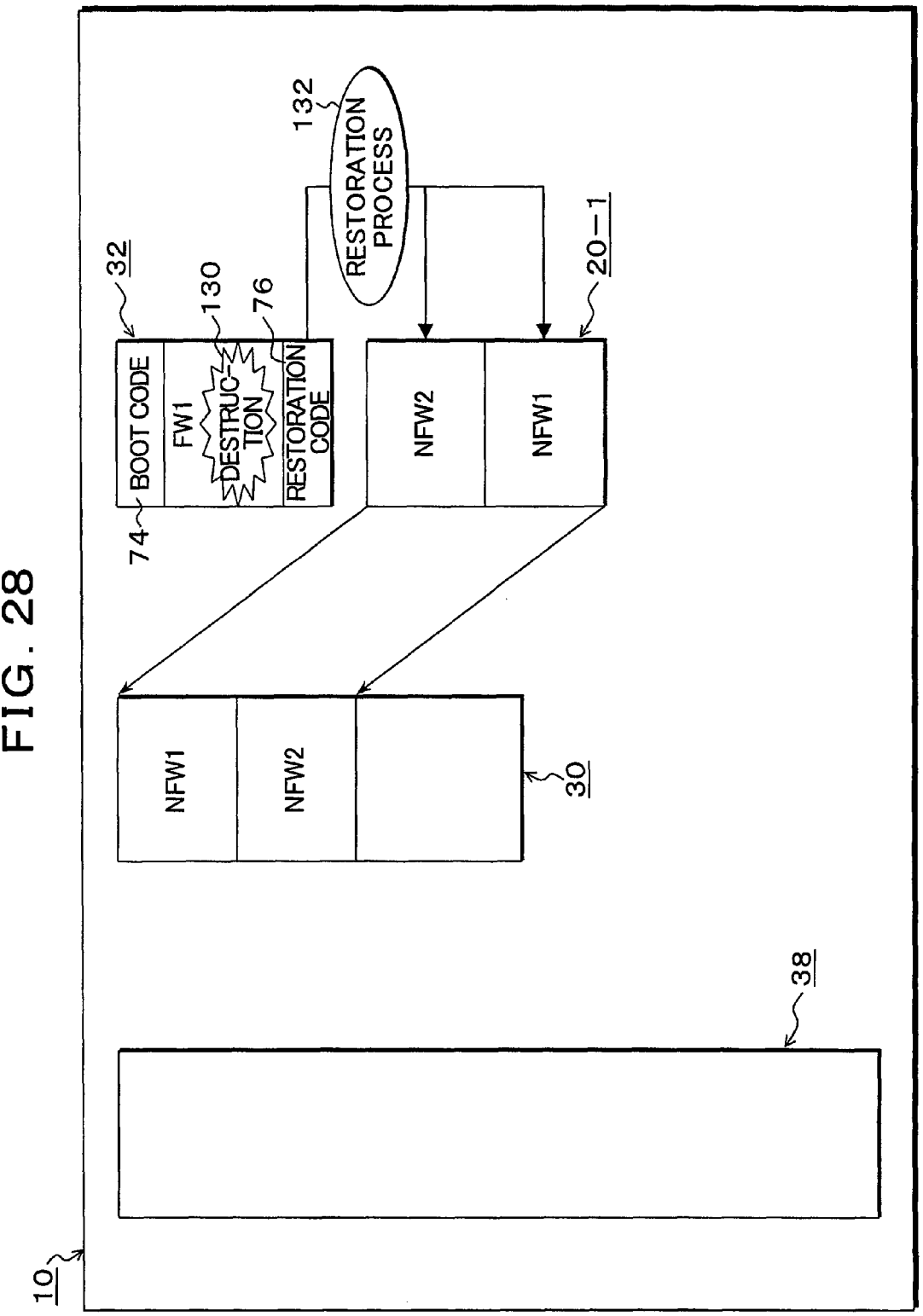
FIG. 28 is an explanatory diagram showing a start-up process of the second start-up mode caused by power supply after power is turned off immediately after update by the firmware update of FIG. 27.

FIG. 28 is an explanatory diagram showing a start-up process according to the second start-up mode that is caused by power supply after power is turned off immediately after the firmware update of FIG. 27. When the firmware updating process is normally terminated as shown in FIG. 27, and the power is turned off immediately after command normal termination is reported to the host, the first magnetic disk 20-1 is in the updated state of the new firmware NFW1 and NFW2 as shown in FIG. 28; however, the non-volatile memory 32 is in the state in which the old firmware FW1 is partially destroyed by the destruction process 130 in the update process. When power is turned on in such state, a start-up process by the start-up processing unit 48 shown in the MPU 26 of FIGS. 1A and 1B is performed. The start-up processing unit 48 performs initialization and diagnosis of each device by a start-up program, which is stored in the non-volatile memory 32 and has a function corresponding to BIOS, and then diagnoses the non-volatile memory 32 by, for example, a checksum of the stored firmware. Herein, the old firmware FW1 of the non-volatile memory 32 is partially destroyed by the destruction process 130 in the firmware update; therefore, a diagnosis error is caused, for example, in diagnosis of the checksum. When the checksum of the firmware FW1 of the non-volatile memory 32 is an error, the start-up processing unit 48 is started up in the second start-up mode. In the second start-up mode, since the non-volatile memory 32 is determined to be abnormal due to the diagnosis error, a start-up process by the boot code 74 cannot be performed, and, in this case, a restoration process 132 is performed by executing the restoration code 76. On the condition that the first magnetic disk 20-1 is normal, the restoration process 132 by the restoration code 76 is executed by reading the new firmware NFW1 and NFW2 from the first magnetic disk 20-1 and allocating it to the volatile memory 30. As a result, in the embodiment having the firmware allocation of FIG. 27, when the power is turned off immediately after normal termination of the firmware update command, start-up is performed in the second start-up mode shown in FIG. 28, and boot-up can be performed by the new firmware NFW1 and NFW2 of the first magnetic disk 20-1.

Figure 29:
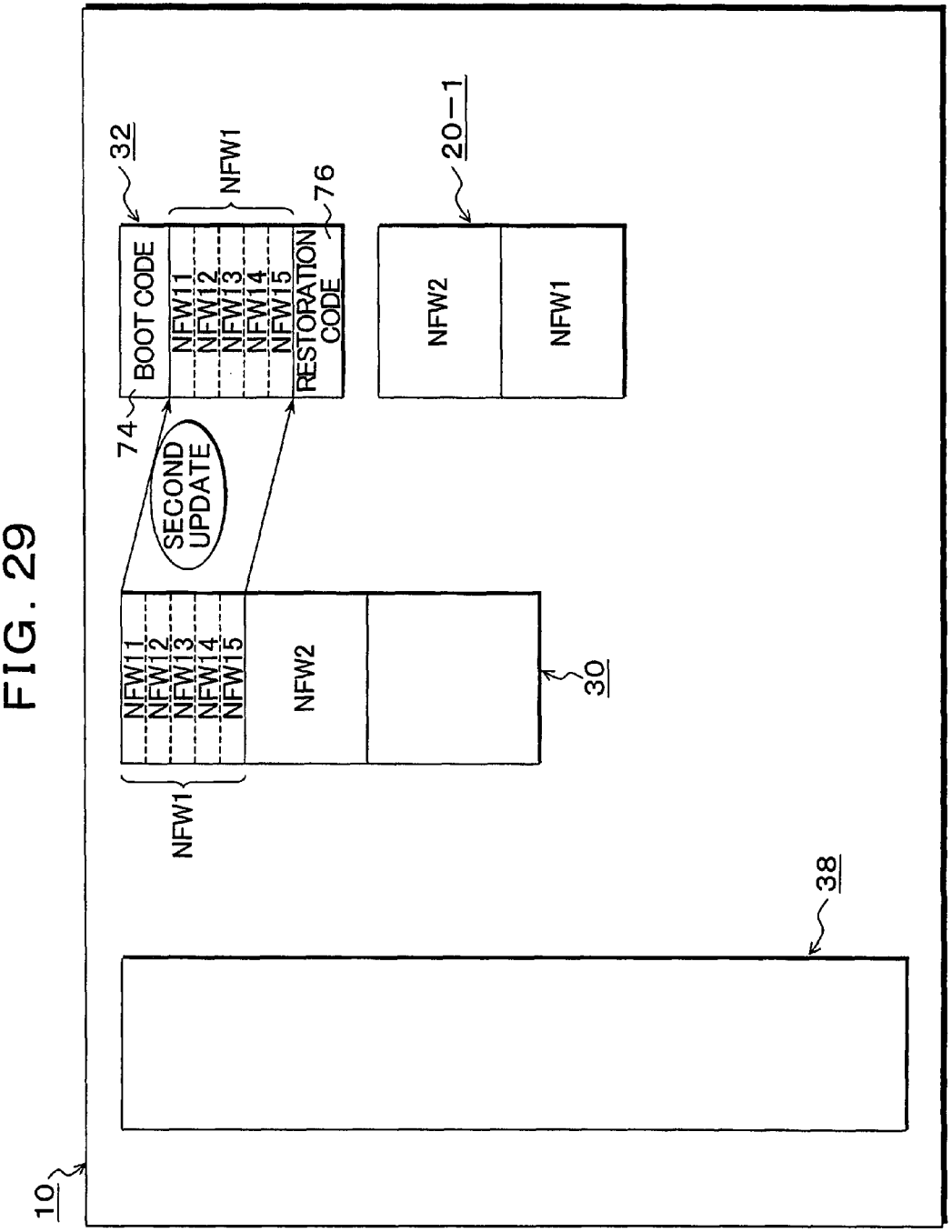
FIG. 29 is an explanatory diagram showing an internal updating process of the non-volatile memory executed in background after the firmware update of FIG. 27.

FIG. 29 is an explanatory diagram showing an internal updating process of the non-volatile memory which is executed in background when operation is continued without turning off the power after the firmware update of FIG. 27. In FIG. 29, since the old firmware FW1 of the non-volatile memory 32 has undergone the destruction process 130 as shown in FIG. 27 through execution of the firmware update command, an internal updating process of dividing the currently-executed firmware NFW1 of the non-volatile memory 32 allocated to the volatile memory 30 into new firmware NFW11 to NFW15 serving as minimum access units and sequentially writing the new firmware NFW11 to NFW15 to the firmware area of the non-volatile memory 32 at the timing of spare time of execution of the command from the host is performed. In the internal updating process of the thus-divided firmware NFW11 to NFW15, every time each update is finished, if a read command or a write command from the host is stored in a command queue and waiting for execution at that point, the read command or the write command waiting for processing is extracted from the command queue and executed when update of the divided new firmware is finished. Therefore, processing of the access commands from the host stored in the command queue does not have to wait until update of all the new firmware with respect to the non-volatile memory 32 is finished, parallel execution of the update process of the new firmware and access commands can be executed, and deterioration in the system processing performance in the host-side in the firmware internal updating process can be suppressed to minimum.

Figure 30:
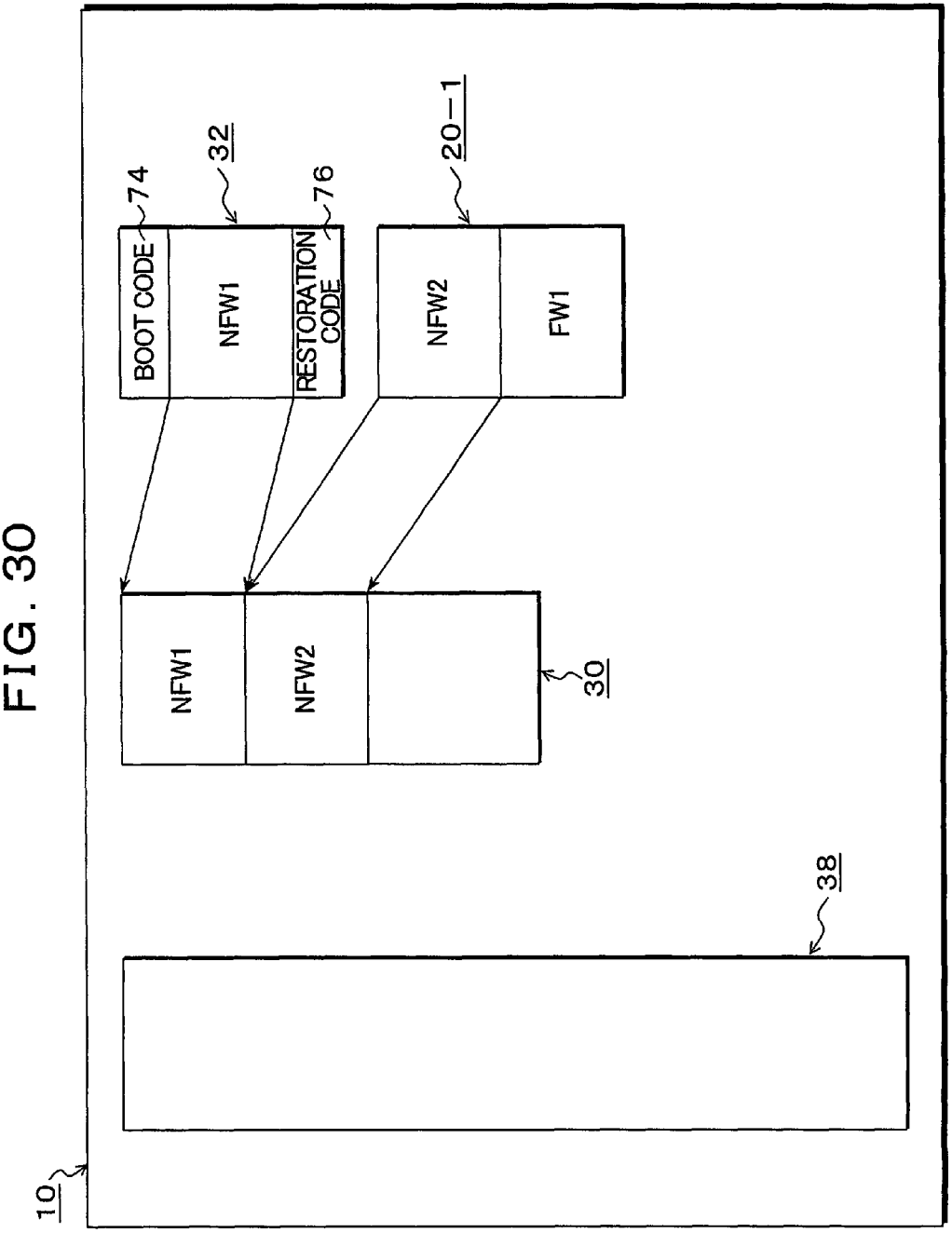
FIG. 30 is an explanatory diagram showing a start-up process of the first start-up mode caused by power supply after the non-volatile memory is updated in FIG. 29.

FIG. 30 is an explanatory diagram showing a start-up process according to the first start-up mode caused by power-on after the firmware of the non-volatile memory 32 is updated in the internal updating process of FIG. 29 in background. In the start-up processing unit 48 provided in the MPU 26 of FIGS. 1A and 1B for firmware allocation of FIG. 27, when the firmware of the non-volatile memory 32 is normal upon power-on, the new firmware NFW1 of the non-volatile memory 32 and the new firmware NFW2 of the first magnetic disk 20-1 is read and allocated to the volatile memory 30 and executed as a start-up process according to the first start-up mode.

Figure 31:
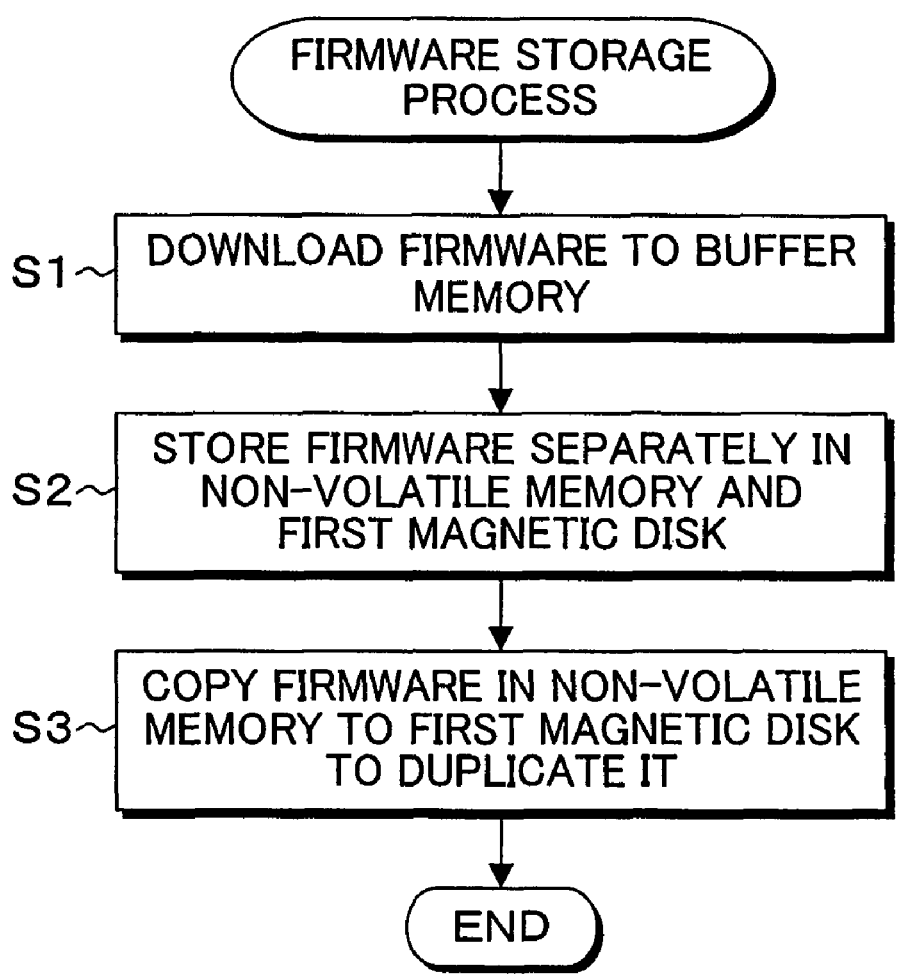
FIG. 31 is a flow chart of a firmware storage process performed in a manufacturing stage in the embodiment of FIG. 27.

FIG. 31 is a flow chart of the firmware storage process performed in a manufacturing stage for the embodiment of FIG. 27, which is executed by the firmware storage processing unit 46 provided in the MPU 26 of FIGS. 1A and 1B. In FIG. 31, in the firmware storage process, after the firmware is downloaded or downloaded from the host to the buffer memory 38 in step S1, the firmware on the buffer is divided for the non-volatile memory 32 and the first magnetic disk 20-1 and stored therein as the firmware FW1 and FW2 in step S2. Subsequently, in step S3, the firmware FW1 of the non-volatile memory 32 is copied to the first magnetic disk 20-1 so as to duplicate it. As a result, the storage state of the firmware FW1 with respect to the non-volatile memory 32 and the storage state of the firmware FW1 and FW2 with respect to the first magnetic disk 20-1 shown in FIG. 27 are attained.

Figure 32:
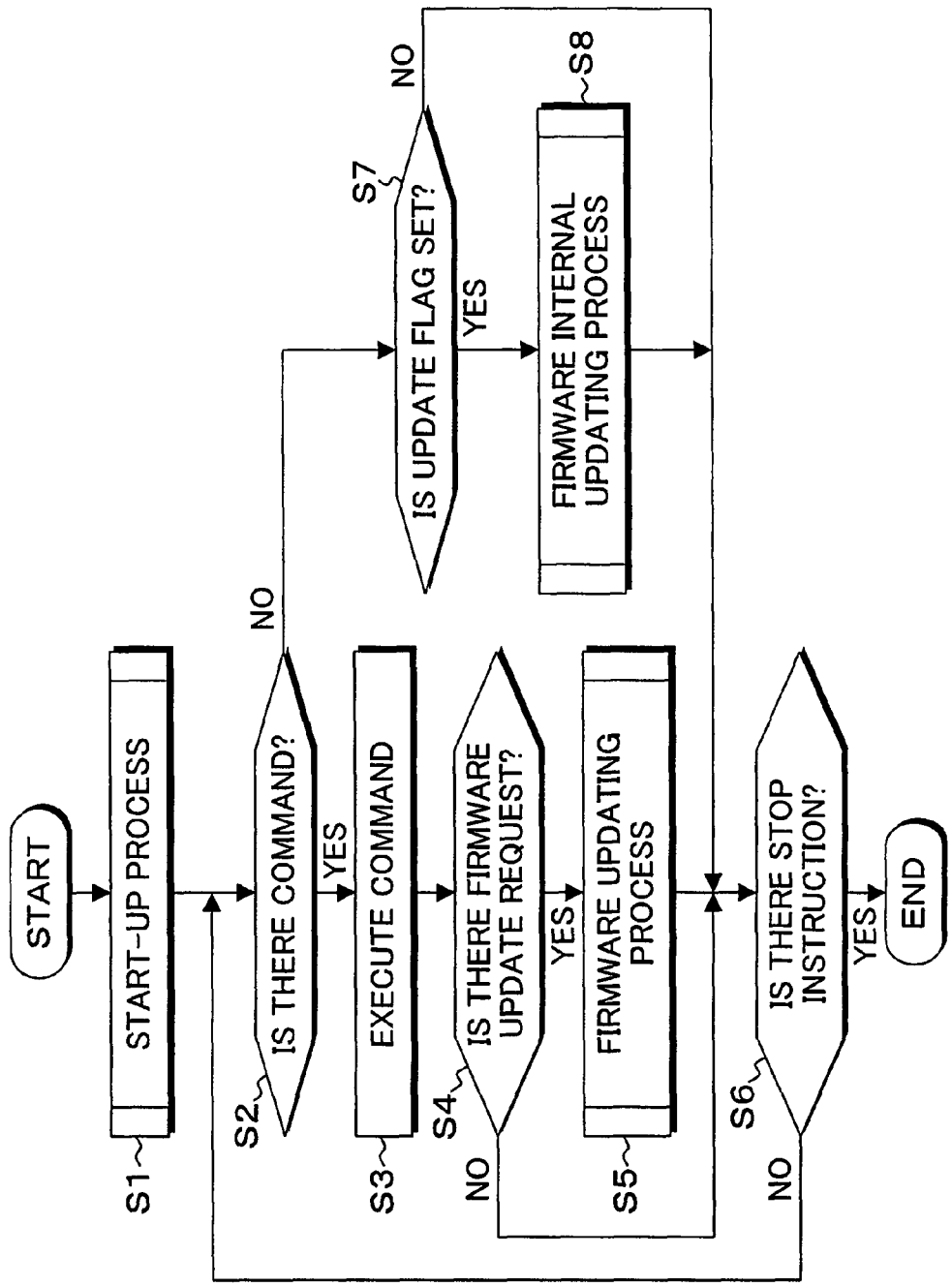
FIG. 32 is a flow chart showing processing operation of the embodiment of FIG. 27.

FIG. 32 is a flow chart showing a processing operation of the embodiment having the firmware allocation of FIG. 27. When the power of the magnetic disk apparatus 10 of FIGS. 1A and 1B is turned on, a start-up process is executed by the start-up processing unit 48 in step S1. This start-up process is a start-up process of either the first start-up mode or the second start-up mode. When normal start-up is performed by the start-up process of step S1 and an operating state is attained, presence of a command from the host is checked in step S2, and, when a command is received, the command is executed in step S3. The command is a read command or a write command from the host, and, specifically, the command from the host is executed after it is stored in a queue. When there is a firmware update request (firmware update command) from the host during operation in step S4, the process proceeds to step S5, in which a firmware updating process by the firmware update processing unit 50 is executed. Meanwhile, when an idle state there is no command is determined in step S2, the process proceeds to step S7, in which whether an update flag is set by a firmware updating process or not is determined. When the update flag is set, the process proceeds to step S8, in which the internal updating process in which the firmware is written to the non-volatile memory 32 so as to perform update is executed in background. Such processes of steps S2 to S5, S7, and S8 are repeated until there is a stop instruction in step S6.

Figure 33:
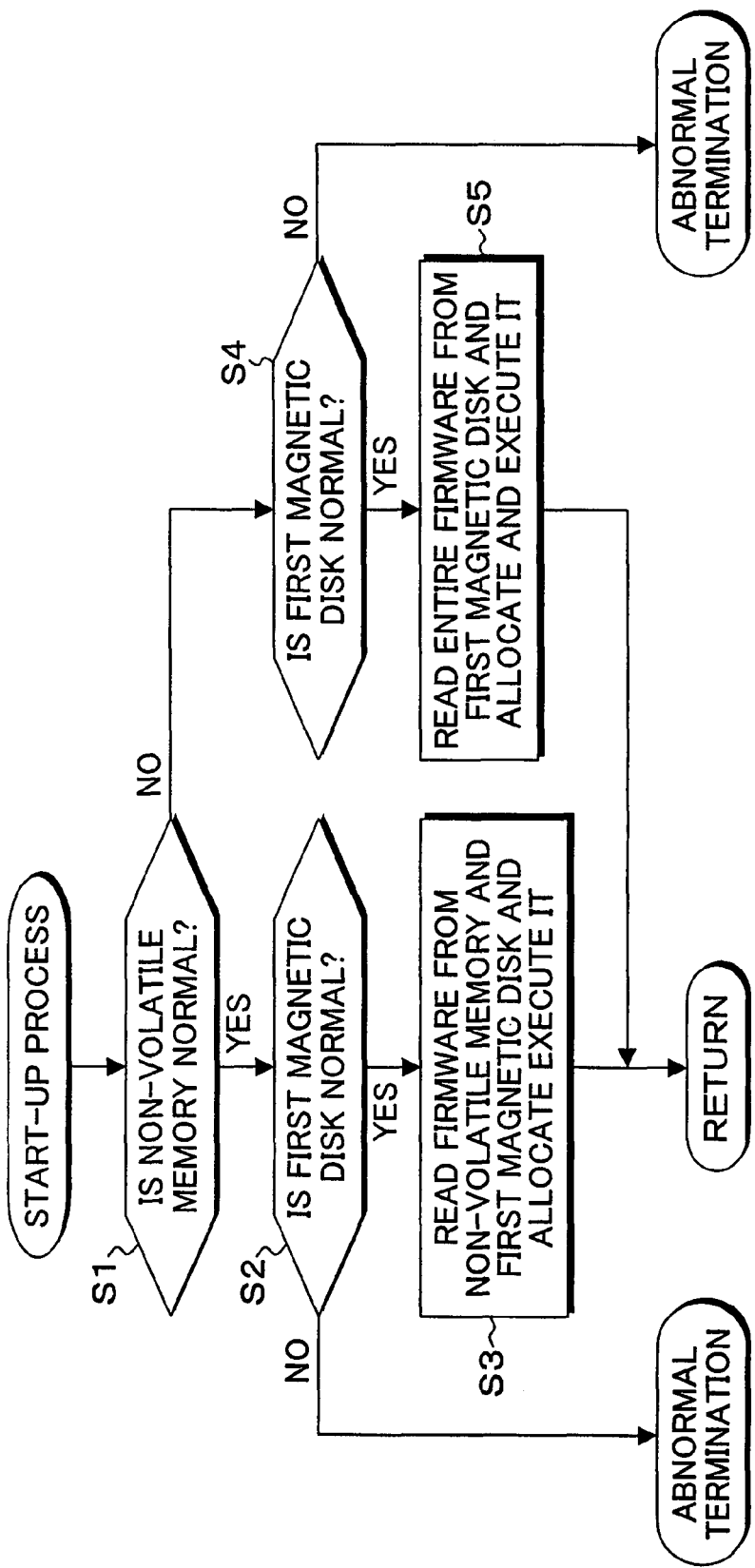
FIG. 33 is a flow chart showing details of the start-up process of step S1 of FIG. 32.

FIG. 33 is an explanatory diagram showing details of the start-up process of step S1 of FIG. 32. In FIG. 33, in the start-up process, whether the firmware of the non-volatile memory 32 is normal or not is determined in step S1, and, when it is normal, the process proceeds to step S2, in which whether the first magnetic disk 20-1 is normal or not is determined. When both the non-volatile memory 32 and the first magnetic disk 20-1 are normal, the process proceeds to step S3, in which, according to the first start-up mode, the firmware is read from the non-volatile memory 32 and the first magnetic disk, allocated to the volatile memory 30, and executed as shown in FIG. 30. Note that when the first magnetic disk is abnormal in step S2, the process is terminated abnormally. Meanwhile, when abnormality of the non-volatile memory is determined in step S1, the process proceeds to step S4, in which whether the first magnetic disk 20-1 is normal or not is determined. If the first magnetic disk 20-1 is normal, the process proceeds to step S5, in which, according to the second start-up mode, the entire firmware is read from the first magnetic disk 20-1 as shown in FIG. 28, allocated to the volatile memory 30, and executed. When there is abnormality in the first magnetic disk in step S2, the process is terminated abnormally.

Figure 34:
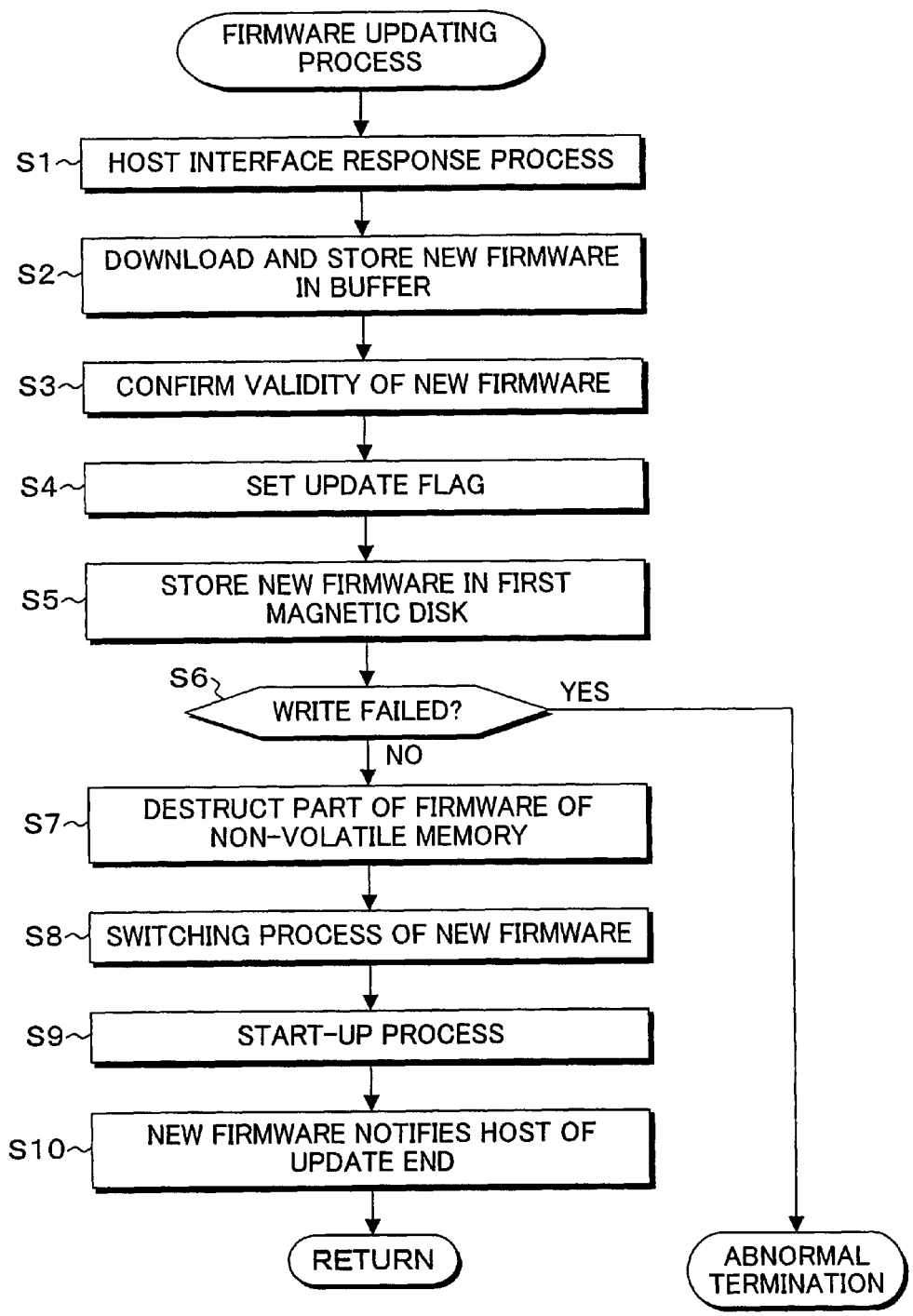
FIG. 34 is a flow chart showing details of the firmware updating process of step S5 of FIG. 32.

FIG. 34 is a flow chart showing details of the firmware updating process of step S5 of FIG. 32. In FIG. 34, in step S1, when the host interface control unit 34 receives a firmware update requesting command from the host, interface connection with the host is established by performing a host interface response process; and, in step S2, new firmware transmitted from the host is received and stored in the buffer memory 38. Subsequently, in step S3, validity of the received new firmware stored in the buffer memory 38 is confirmed by a checksum or the like; and, when validity is confirmed, in step S4, an update flag is set for performing an internal updating process as a background process. Next, in step S5, the old firmware of the first magnetic disk is overwritten by the new firmware stored in the buffer memory 38. Subsequently, in step S6, whether the write of the firmware with respect to the first magnetic disk 20-1 is write failure or not is checked, and, if the write fails, the process is abnormally terminated, and a response of abnormal termination of the firmware update command is transmitted to the host. When it is received, in the host side, an appropriate countermeasure can be quickly made for the new firmware update with respect to the storage apparatus. When there is no failure in the write in step S6, the process proceeds to step S7, in which the destruction process 130 of destroying a part of the old firmware of the non-volatile memory 32 is performed. Subsequently, the process proceeds to step S8, in which the old firmware of the volatile memory 30 is overwritten by the new firmware stored in the buffer memory 38, thereby switching the old firmware to the new firmware. Subsequently, in step S9, switching to the new firmware is performed by performing a start-up process which is known as power-on-start; and, the host is notified of the update completion with respect to the firmware updating request by executing the new firmware in step S10, and the series of firmware downloading processes are completed.

Figure 35:
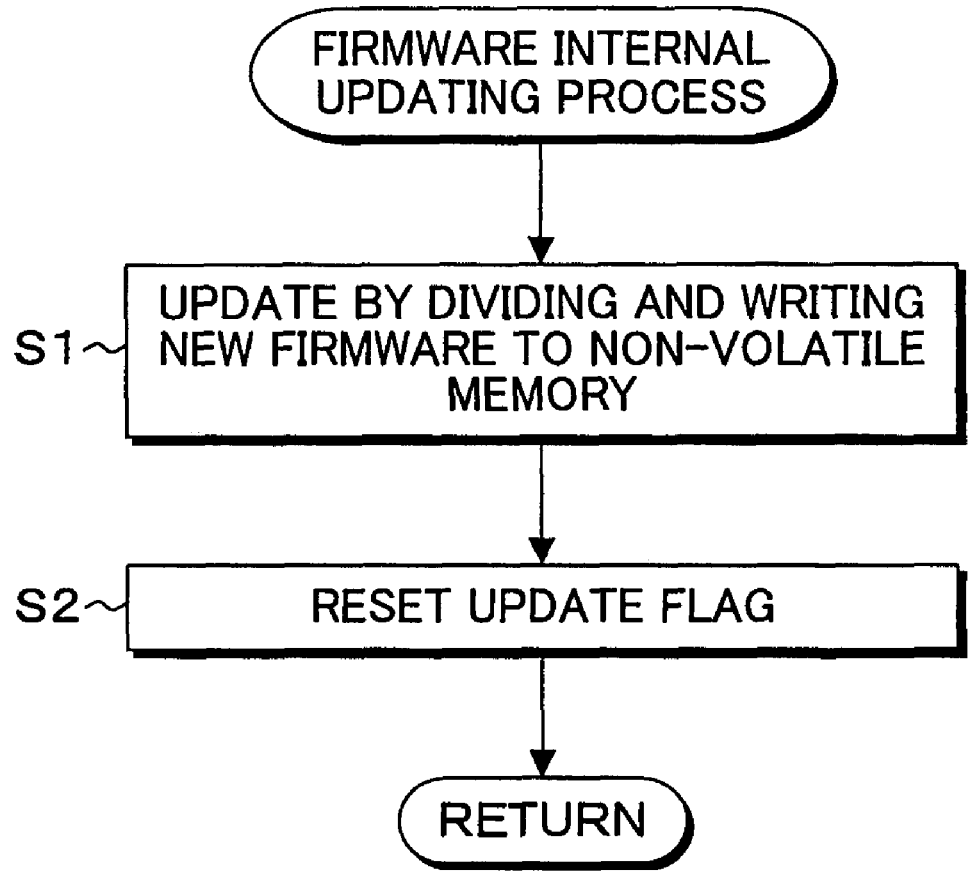
FIG. 35 is a flow chart showing details of the firmware internal updating process of step S8 of FIG. 32.

FIG. 35 is a flow chart showing details of the firmware internal updating process of step S8 of FIG. 32. In FIG. 35, in step S1, the firmware of the volatile memory 30 is divided and sequentially written to the non-volatile memory 32 in divided units by background processes in an idle state so as to perform update as shown in FIG. 29. When the update is finished, the update flag is reset in step S2. In the embodiment in which the firmware is allocated in this manner to the first magnetic disk 20-1 and the non-volatile memory 32 shown in FIG. 27, even when the power of the apparatus is turned off immediately after the firmware update command from the host is normally terminated and the non-volatile memory is not updated, the old firmware of the non-volatile memory becomes always abnormal upon next power supply since a part of the firmware of the non-volatile memory is destroyed in the update process. Therefore, when the new firmware of the first magnetic disk 20-1 is subjected to memory allocation to the volatile memory 30 and executed by executing the restoration code, boot-up can be surely performed by the new firmware. Even if the write to the first magnetic disk 20-1 by the firmware update command fails, the host can be notified of the abnormal termination of the command since it is an error during execution of the command, and the host can detect the abnormality in the storage apparatus side in an early stage and take a necessary countermeasure appropriately.

Figure 36:
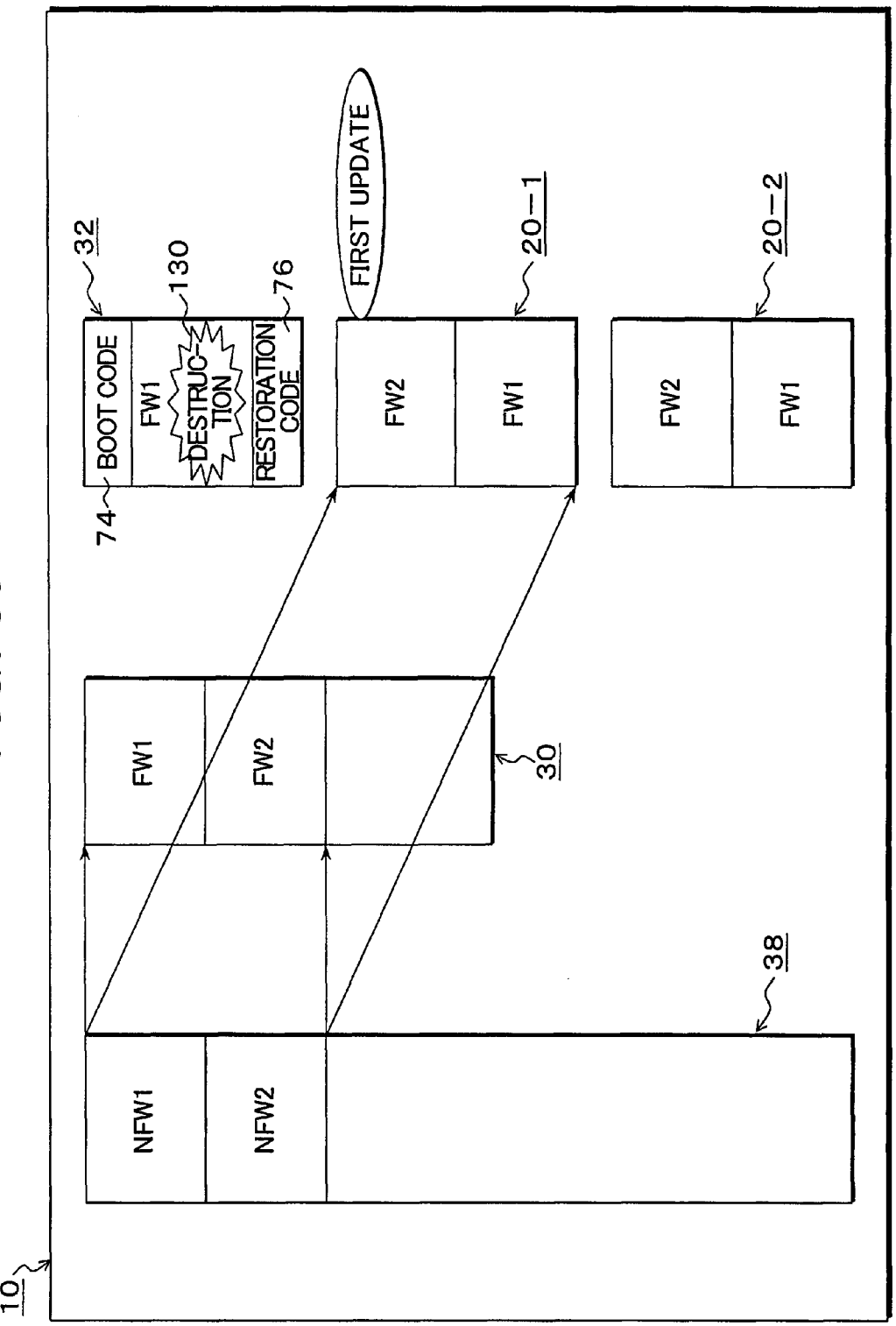
FIG. 36 is an explanatory diagram of allocation and an updating process of firmware in another embodiment of the present invention.

FIG. 36 is an explanatory diagram of allocation and an update process of firmware in another embodiment of the present invention. The embodiment of FIG. 36 is characterized in that the second magnetic disk 20-2 is further added to the embodiment of FIG. 27, and the firmware FW1 and FW2 is also stored in the second magnetic disk 20-2. In the firmware updating process in the embodiment of FIG. 36 in which the second magnetic disk 20-2 is added for firmware storage, when a firmware update command is received, in the first place, the new firmware NFW1 and NFW2 stored in the buffer memory 38 is stored in the first magnetic disk 20-1 as first update. Subsequently, after the destruction process 130 of destroying a part of the old firmware FW1 of the non-volatile memory 32 is performed, the new firmware NFW1 and NFW2 overwrites the volatile memory 30, thereby notifying the host of the command termination. When the power is turned off immediately after the firmware update requesting command is normally terminated and a response about the termination is made to the host, a start-up process according to the second start-up mode is performed in the manner shown in FIG. 37. This point is same as the case in which the power is turned off immediately after the termination response of the firmware update command in the embodiment of FIG. 27 and the start-up process is performed according to the second start-up mode in FIG. 28.

Figure 37:
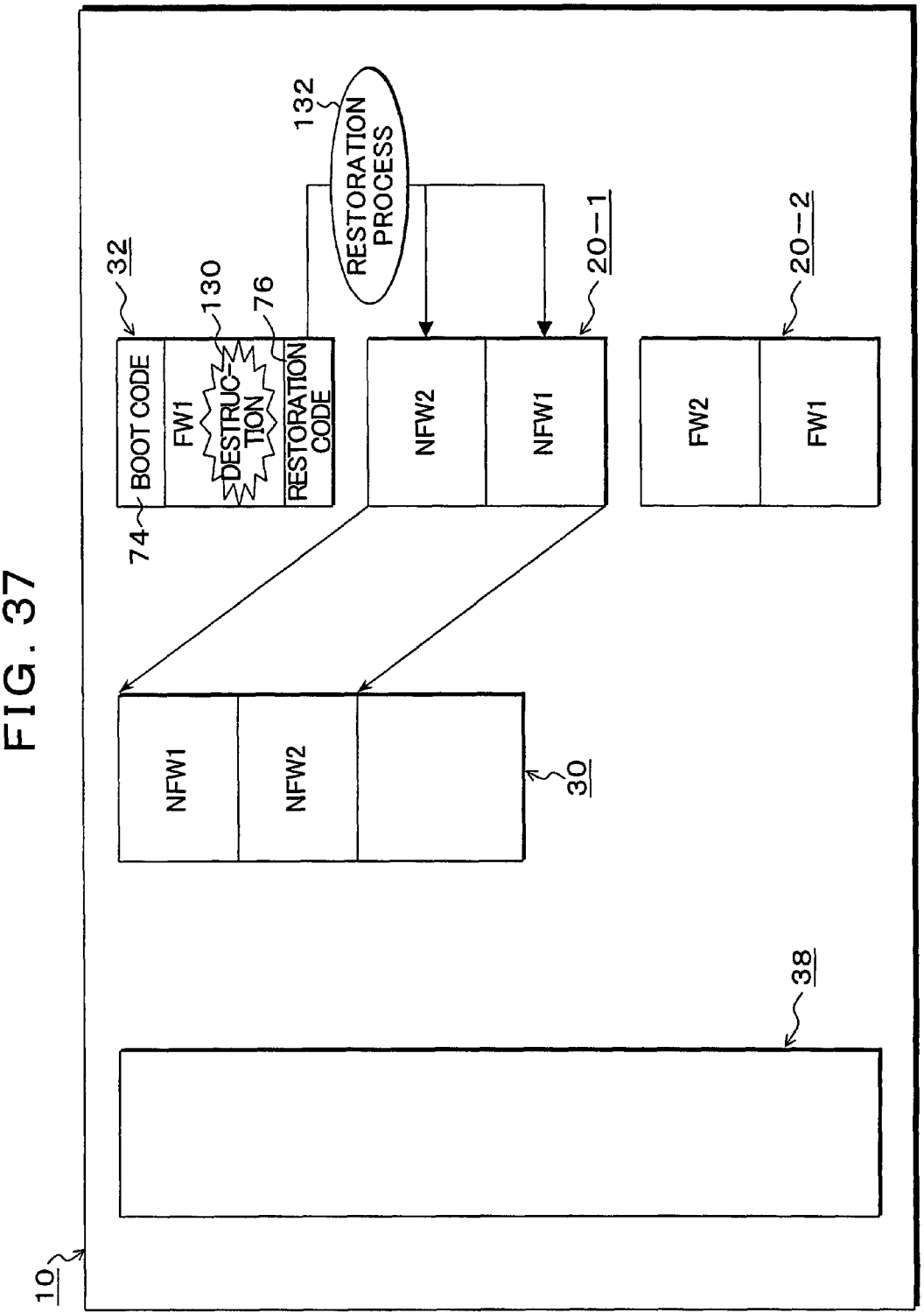
FIG. 37 is an explanatory diagram showing a start-up process of the second start-up mode caused by power supply after power is turned off immediately after update in the firmware update of FIG. 36.
Figure 38:
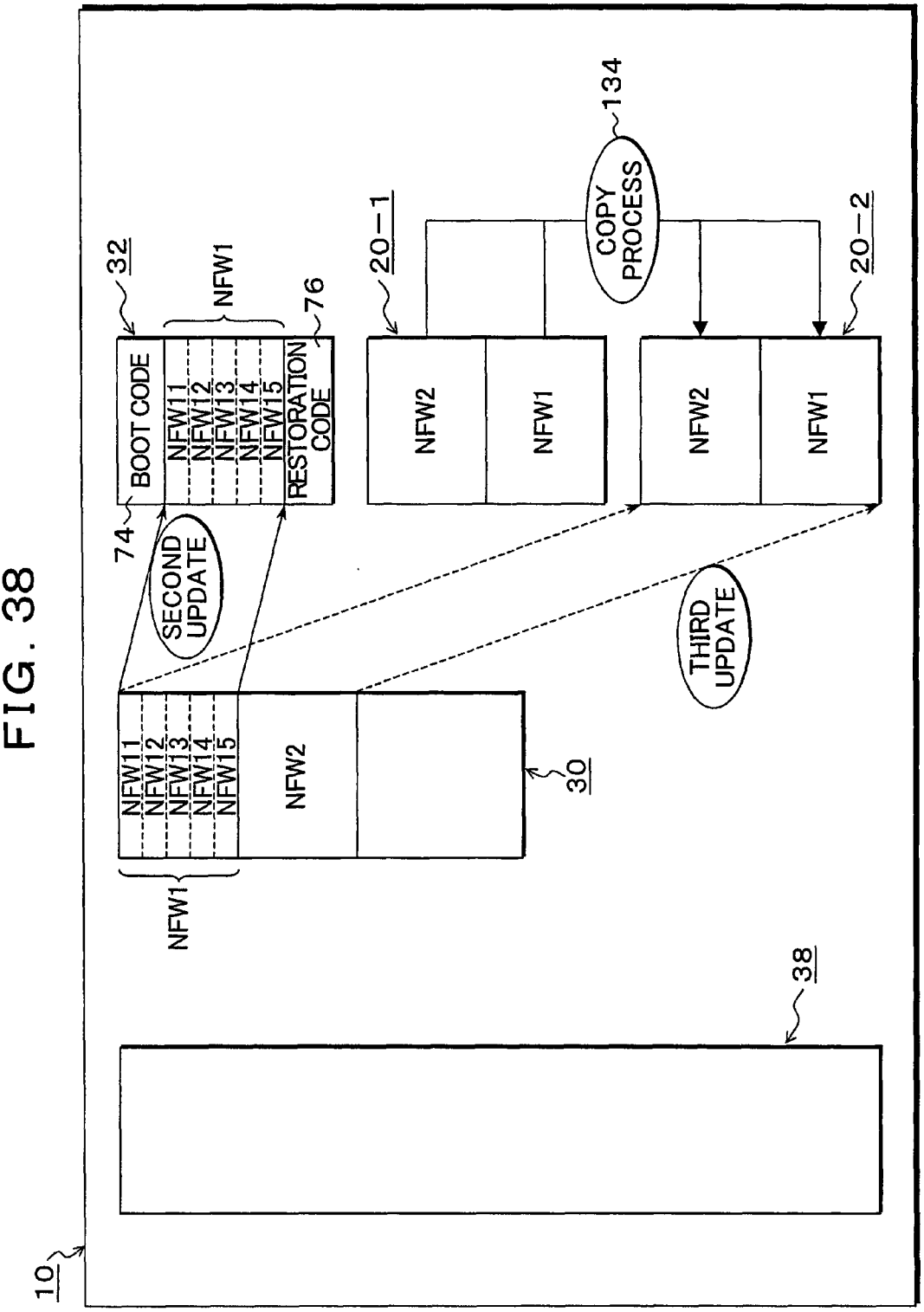
FIG. 38 is an explanatory diagram showing an internal updating process of the non-volatile memory executed in background after the firmware update of FIG. 36.

In the start-up process of FIG. 37 according to the second start-up mode, abnormality due to the destruction process 130 of the old firmware FW1 of the non-volatile memory 32 is detected, the restoration process 132 is executed by the restoration code 76, and the firmware NFW1 and NFW2 of the first magnetic disk 20-1 is read and allocated to the volatile memory 30 and executed, thereby performing boot-up by the new firmware. When the power of the apparatus is not turned off and it is continuously operated after it is normally terminated and a command termination response is made in the firmware update process of FIG. 36, an internal updating process with respect to the non-volatile memory 32 and the second magnetic disk 20-2 is performed in background as shown in FIG. 38. In the internal update process performed in background, since the second magnetic disk 20-2 is newly provided in this embodiment with respect to the embodiment of FIG. 27, a copy process 134 is performed from the first magnetic disk 20-1 to the second magnetic disk 20-2 in the internal updating process of the background process, thereby updating the second magnetic disk 20-2 to the new firmware NFW1 and NFW2 as third update. In the update of the new firmware NFW1 of the non-volatile memory 32 performed in a background process, as well as the case of FIG. 29 in the embodiment of FIG. 27, the new firmware NFW1 of the volatile memory 30 is divided into new firmware NFW11 to NFW15 and sequentially written to the non-volatile memory 32 in the divided units by utilizing spare time of commands from the host. Note that, although the new firmware NFW1 and NFW2 is written to the second disk 20-2 by the copy process 134 from the first magnetic disk 20-1 in FIG. 38, the new firmware NFW1 and NFW2 may be written from the volatile memory 30 to the second magnetic disk 20-2.

Figure 39:
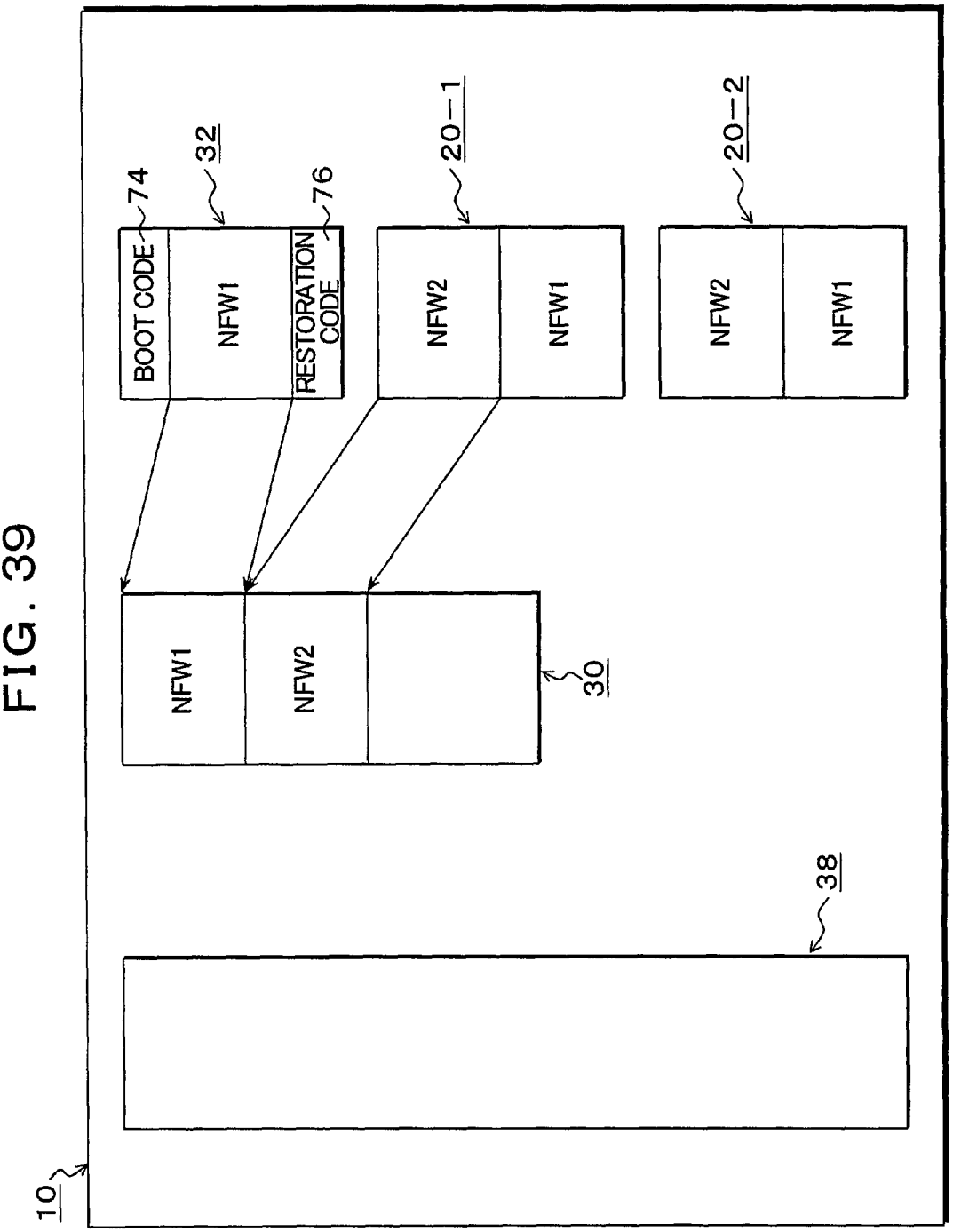
FIG. 39 is an explanatory diagram showing a start-up process of the first start-up mode caused by power supply after the non-volatile memory is updated in FIG. 36.

FIG. 39 shows a start-up process according to the first start-up mode which is performed upon power supply after the non-volatile memory 32 and the second magnetic disk 20-2 are also normally updated to the new firmware in the internal updating process in background after the firmware update as shown in FIG. 38. The start-up process according to the first start-up mode is same as the start-up process of FIG. 30 according to the first start-up mode which is shown for the embodiment of FIG. 27, wherein the new firmware NFW1 and NFW2 is read from the non-volatile memory 32 and the first magnetic disk 20-1, allocated to the volatile memory 30, and executed, thereby performing boot-up.

Figure 40:
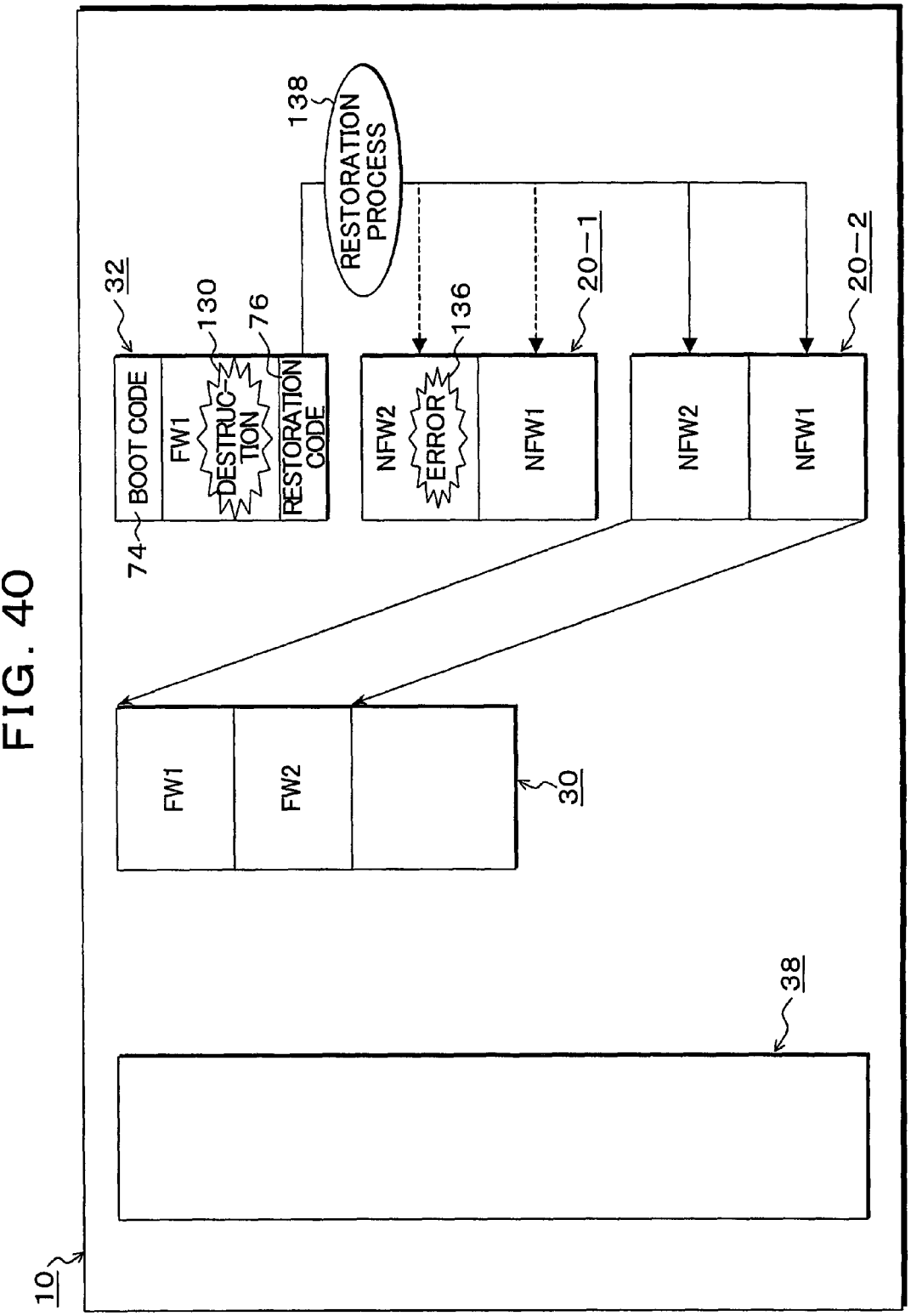
FIG. 40 is an explanatory diagram showing a start-up process of the third start-up mode which uses firmware of a second magnetic disk due to errors of the non-volatile memory and first magnetic disk.

FIG. 40 is an explanatory diagram showing a start-up process according to the third start-up mode which is caused upon power supply after the power is turned off during execution of the firmware update command in the firmware updating process of FIG. 36. When the power is turned off during command execution of the firmware updating process shown in FIG. 36, a response cannot be made due to the command abnormal termination, the firmware of the first magnetic disk 20-1 and the non-volatile memory 32 cannot be ensured since it is during command execution, and it is expected that both the firmware FW1 of the non-volatile memory 32 and the firmware NFW2 of the second magnetic disk 20-2 is in an abnormal state as shown in FIG. 40. In the start-up process in such a case in which the power is turned off during firmware update command execution, first of all, the firmware FW1 of the non-volatile memory 32 is checked, and there is a diagnosis error of a checksum or the like. Therefore, the start-up process according to the second start-up mode is performed, wherein the restoration process 138 is performed by the restoration code 76, and the firmware NFW2 of the first magnetic disk 20-1 is checked. However, when an error 136 occurs also in the firmware NFW2 of the first magnetic disk 20-1, a start-up process according to the third start-up mode is performed, wherein boot-up is performed by reading and allocating the firmware NFW1 and NFW2 of the second magnetic disk 20-2 to the volatile memory 30 and executing it as a restoration process 138. In the start-up process according to the third start-up mode, start-up is performed by the old firmware in the start-up process according to the third start-up mode, while start-up is performed by the new firmware in the start-up process according to the first start-up mode shown in FIG. 39 and the start-up process according to the second start-up mode shown in FIG. 37.

Figure 41:
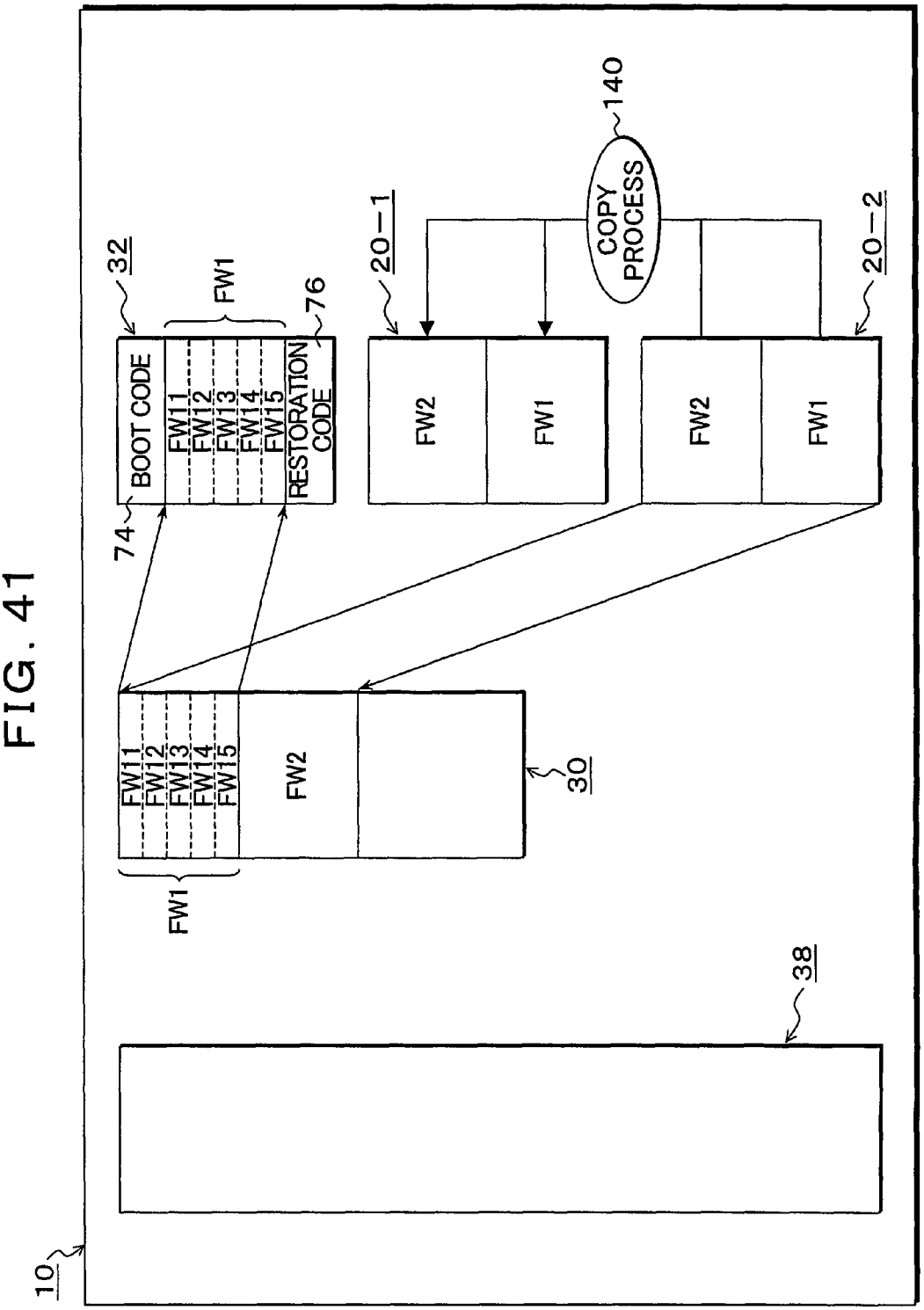
FIG. 41 is an explanatory diagram of a recovery process executed in background after start-up is performed in the third start-up mode of FIG. 40.

FIG. 41 is an explanatory diagram of a recovery process which is executed in background after start-up is performed in the start-up process of FIG. 40 according to the third start-up mode. In the recovery process of FIG. 41, since there is abnormality in the firmware FW1 of the non-volatile memory 32, the firmware FW1 of the volatile memory 30 is divided into firmware FW11 to FW15 and sequentially written to the volatile memory 30 in the divided units. Regarding the first magnetic disk 20-1, the entire old firmware FW1 and FW2 is copied thereto by a copy process 140 from the second magnetic disk 20-2. By the recovery process, the firmware of the non-volatile memory 32 and the first magnetic disk 20-1 which became abnormal due to the power outage during execution of the firmware update command can be recovered to the old firmware before update. Such processes shown in FIG. 36 to FIG. 41 can be executed as functions of the firmware storage processing unit 46, the start-up processing unit 48, the firmware update processing unit 50, and the recovery processing unit 52 shown in the MPU 26 of FIGS. 1A and 1B.

Figure 42:
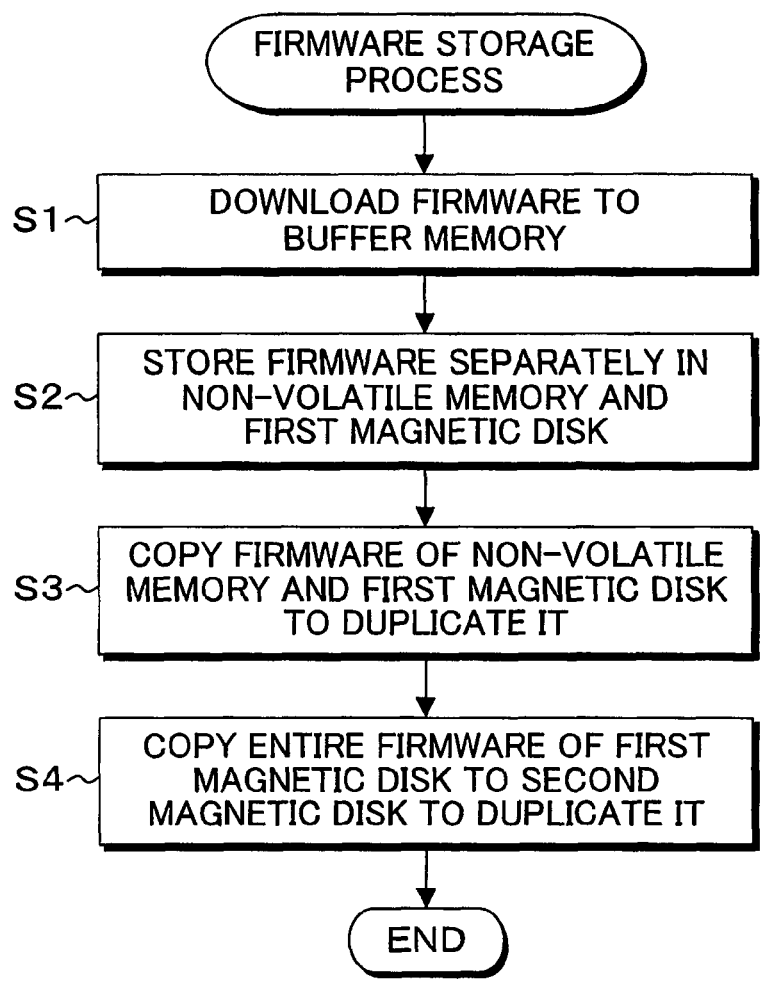
FIG. 42 is a flow chart of a firmware storage process according to the present embodiment performed in a manufacturing stage in the embodiment of FIG. 36.

FIG. 42 is a flow chart of a firmware storage process which is performed in a manufacturing stage for the embodiment having the firmware allocation of FIG. 36. In FIG. 42, the processes of steps S1 to S3 are same as those of FIG. 31; and, furthermore, in the present embodiment, the second magnetic disk 20-2 is provided as a storage location of the firmware, and the entire firmware of the first magnetic disk 20-1 is copied to the second magnetic disk 20-2 so as to duplicate it in step S4.

Figure 43:
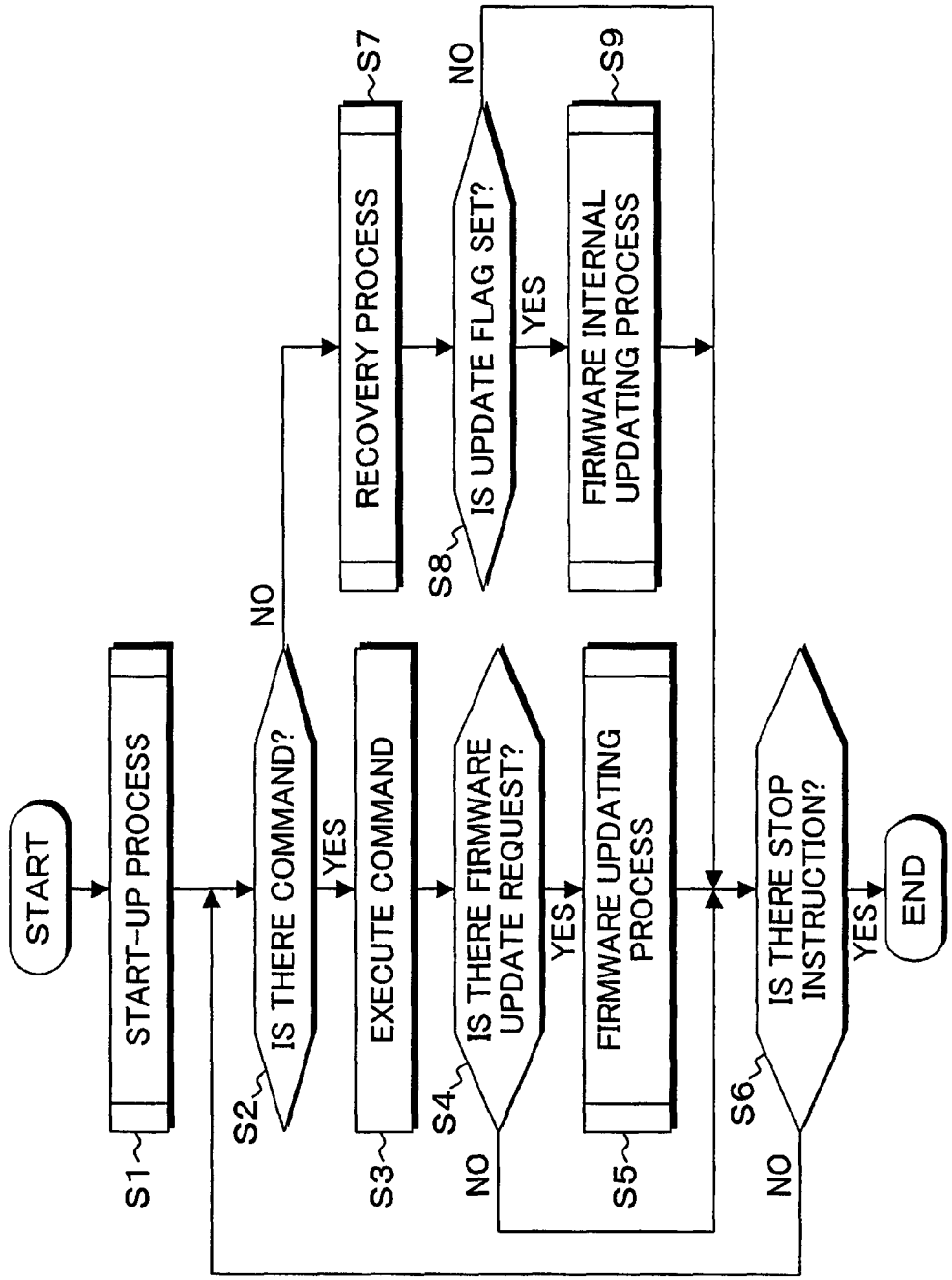
FIG. 43 is a flow chart showing processing operation of the embodiment of FIG. 36.

FIG. 43 is a flow chart showing a processing operation of the embodiment of FIG. 36. In FIG. 43, when the power of the magnetic disk apparatus 10 shown in FIGS. 1A and 1B is turned on, a start-up process is executed by the start-up processing unit 48 in step S1. The start-up process is a start-up process of any of the first start-up mode, the second start-up mode, and the third start-up mode. Subsequently, presence of a write command or a read command from the host is checked in step S2, and, when a command is received, the received command is executed in step S3. Subsequently, when a firmware update requesting command is determined in step S4, the process proceeds to step S5, in which a firmware updating process by the firmware update processing unit 50 is executed. Meanwhile, when an idle state in which there is no command is determined in step S2, the process proceeds to step S7, in which a recovery process by the recovery processing unit 52 is executed in background. When it is determined in step S8 that an update flag is set by the firmware updating process of step S5, an internal updating process of sequentially writing and updating the firmware in the order of the non-volatile memory 32 and the second magnetic disk 20-2 is executed in background in step S9. Then, such processes of steps S2 to S5 and S7 to S9 are repeated until there is a stop instruction in step S6.

Figure 44:
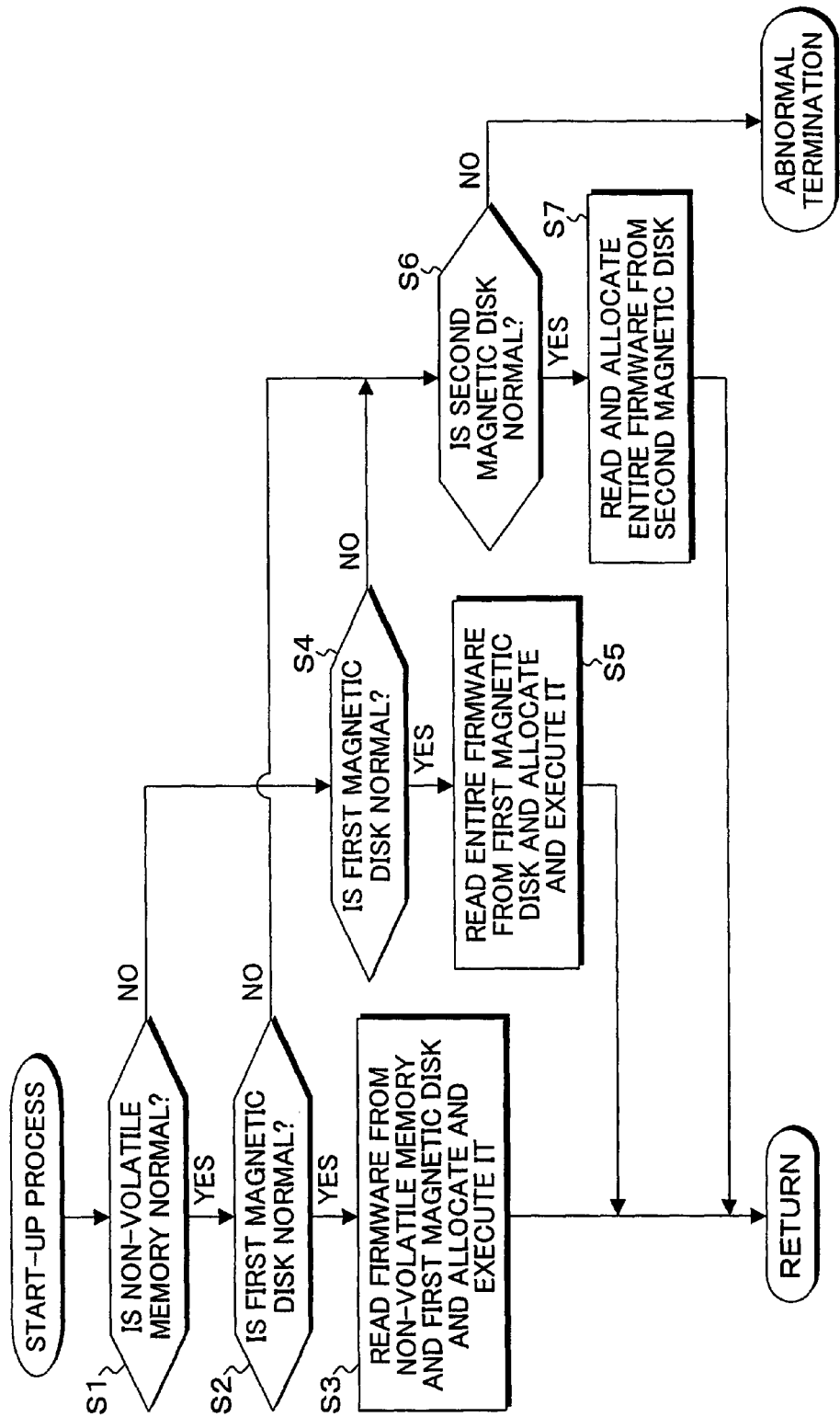
FIG. 44 is a flow chart showing details of the start-up process of step S1 of FIG. 43.

FIG. 44 is a flow cart showing details of the firmware updating process of step S5 of FIG. 43. In FIG. 44, the start-up process of the first mode of steps S1 to S3 and the start-up process of the second mode of steps S4 and S5 are same as those of the embodiment of FIG. 27 shown in FIG. 33. Steps S6 and S7 are start-up processes according to the third start-up mode. In the start-up processes according to the third start-up mode, when abnormality of the non-volatile memory 32 is determined in step S1 and abnormality of the first magnetic disk 20-1 is further determined, the process proceeds to step S6, and, on the condition that the second magnetic disk 20-2 is normal, the entire firmware is read from the second magnetic disk 20-2, allocated to the volatile memory 30, and executed in step S7.

Figure 45:
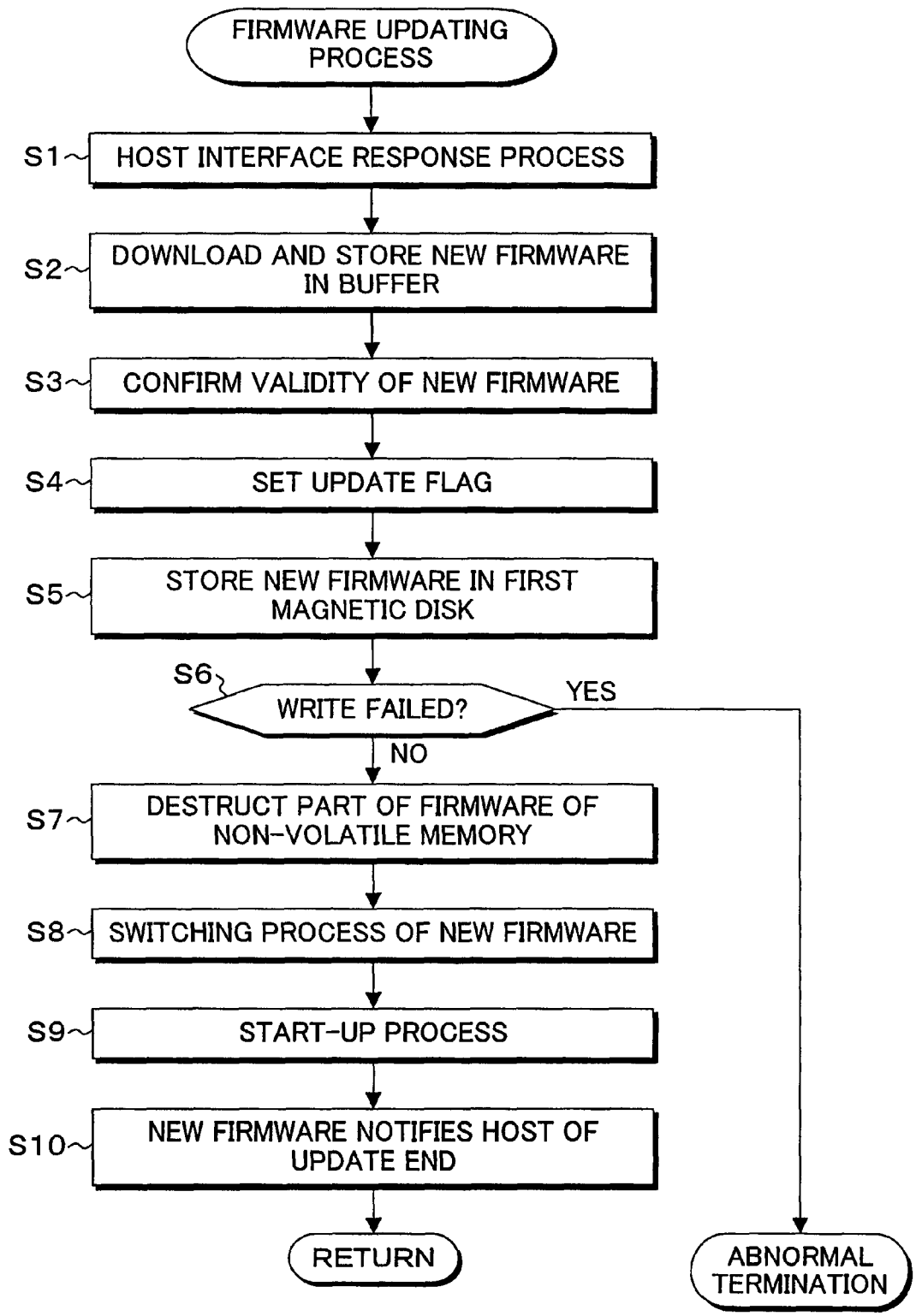
FIG. 45 is a flow chart showing details of the firmware updating process of step S5 of FIG. 43.

FIG. 45 is a flow chart showing details of the firmware updating process of step S5 of FIG. 43, and the processing procedure is same as that of the flow chart of FIG. 34.

Figure 46:
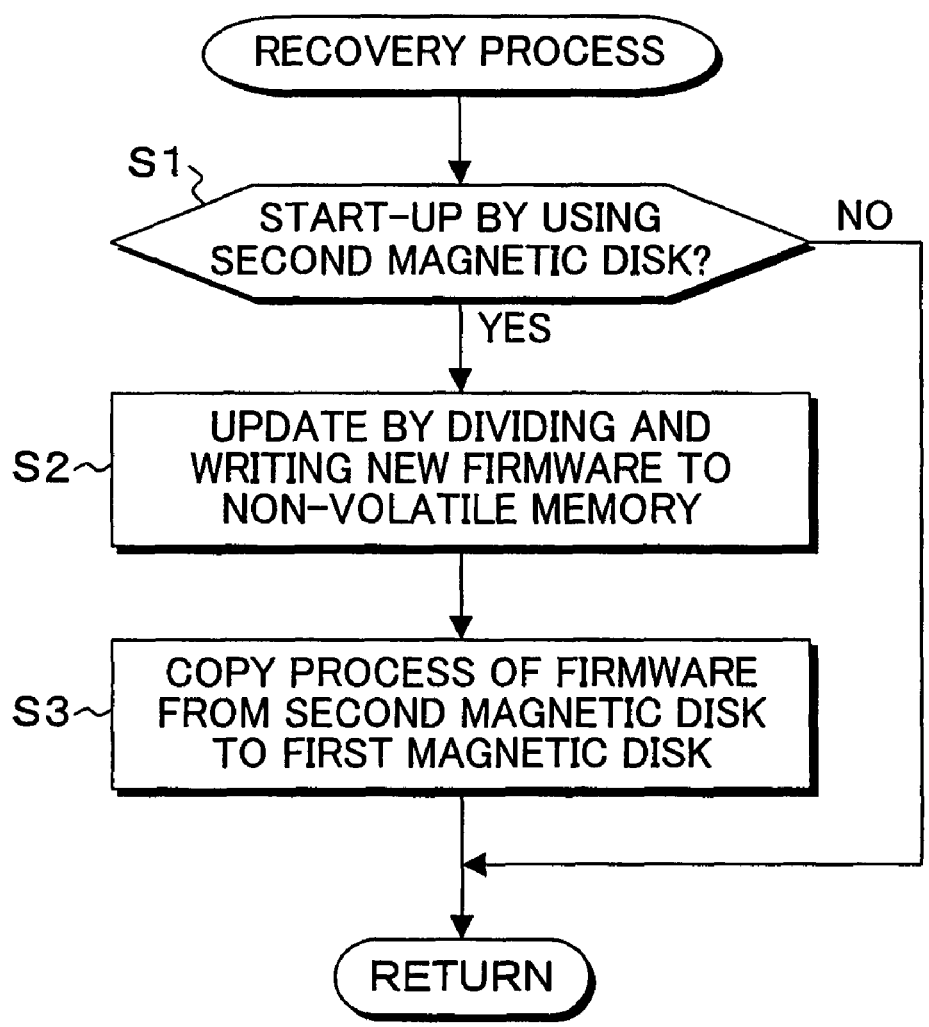
FIG. 46 is a flow chart showing details of the recovery process of step S7 of FIG. 43.

FIG. 46 is a flow chart showing details of the recovery process of step S7 of FIG. 43. The recovery process is a process which is executed in background as shown in FIG. 41 after start-up is performed in the second start-up mode in which the firmware of the second magnetic disk 20-2 is read and allocated to the volatile memory 30 and executed as shown in FIG. 40. More specifically, whether start-up is performed by using the second magnetic disk 20-2 or not is checked in step S1; and, when it is determined that start-up is performed by using the second magnetic disk 20-2, the process proceeds to step S2, in which the firmware FW1 of the volatile memory 30 is divided into the hardware FW11 to FW15 as shown in FIG. 41 and sequentially written to the non-volatile memory 32 as a background process of an idle state, thereby performing update. Subsequently, in step S3, the entire firmware is copied from the second magnetic disk 20-2 to the first magnetic disk 20-1.

Figure 47:
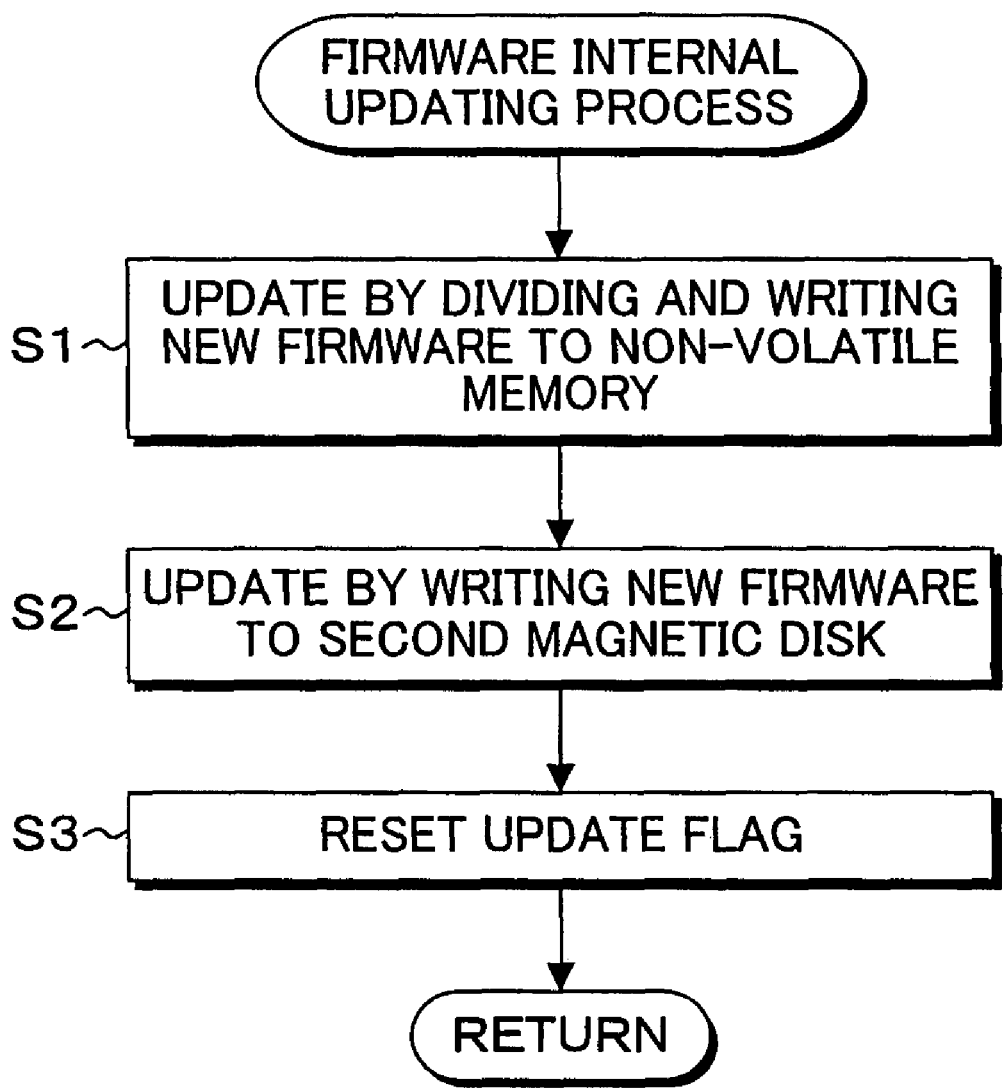
FIG. 47 is a flow chart showing details of the firmware internal updating process of step S8 of FIG. 43.

FIG. 47 is an explanatory diagram showing details of the firmware internal updating process of step S9 of FIG. 43. In the firmware internal updating process, in step S1, as shown in FIG. 38, the new firmware is divided for the non-volatile memory 32 and sequentially written to the non-volatile memory 32 in the divided units as a background process of an idle state, thereby performing update. Subsequently, in step S2, the entire firmware is copied from the first magnetic disk 20-1 to the second magnetic disk 20-2. Then, the update flag is reset in step S3. In the embodiment in which the firmware is further stored in the second magnetic disk 20-2 in addition to the non-volatile memory 32 and the first magnetic disk 20-1 shown in FIG. 36 to FIG. 47, when power is out during command execution of the firmware update command, boot-up can be performed by the old firmware by the start-up process according to the third start-up mode, and this point is advantageous compared with the case shown in the embodiment of FIG. 27 in which the firmware is not stored in the second magnetic disk. However, the possibility that the power outage occurs during execution of the firmware update command is extremely low; therefore, the embodiment of FIG. 27 to FIG. 35 in which the firmware is not stored in the second magnetic disk 20-2 can be considered to be advantageous in practice since the apparatus configuration and processes thereof are simpler. The present invention also provides control programs executed by the MPU 26, which is provided in the magnetic disk apparatus 10 of FIGS. 1A and 1B, and the control programs have contents shown in the flow charts of FIG. 19 to FIG. 24, FIG. 31 to FIG. 35, and FIG. 42 to FIG. 47.

The present invention also provides a computer-readable storage medium in which the programs executed by the MPU 26 are stored. Examples of the storage medium include portable-type storage media such as a CD-ROM, a floppy disk (R), a DVD disk, a magneto-optical disk, and an IC card; storage apparatuses such as a hard disk drive provided inside/outside a computer system; a database which retains programs via a line and another computer system and a database thereof; and online transmission media. Furthermore, the present invention provides a control device which is realized by the control board 14 of the magnetic disk apparatus 10 of FIGS. 1A and 1B. Note that the present invention is not limited to the above described conditions and includes arbitrary modifications that do not impair the object and advantages thereof. Furthermore, the preset invention is not limited by the numerical values shown in the above described embodiments.

What is claimed is:

1. A storage apparatus characterized by having
a firmware storage processing unit which stores firmware, which is drive control software which records/reproduces data to or from a disk medium, separately in a non-volatile memory, in which a start-up code and a restoration code are stored, and a first disk medium, stores a copy of the firmware, which is stored in the non-volatile memory, in the first disk medium, and stores a copy of the entire firmware, which is stored in the first disk medium, in a second disk medium; and
a start-up processing unit which executes, upon power-on, any of a first start-up mode in which the firmware of the non-volatile memory and the first disk medium is read and allocated to a volatile memory so as to perform start-up based on the start-up code when the non-volatile memory is normal, a second start-up mode in which the firmware of the non-volatile memory and the second disk medium is read and allocated to the volatile memory so as to perform start-up when the first disk medium is abnormal in the first start-up mode, a third start-up mode in which the entire firmware is read and allocated from the first disk medium to the volatile memory so as to perform start-up based on the restoration code when the non-volatile memory is abnormal, and a fourth start-up mode in which the entire firmware is read and allocated from the second disk medium to the volatile memory so as to perform start-up when the first disk medium is abnormal in the third start-up mode.

2. The storage apparatus according to claim 1, characterized by having a firmware update processing unit which switches old firmware, which is allocated to the volatile memory, to new firmware transferred from an upper-level apparatus and executes the new firmware when an update request of the firmware is received from the upper-level apparatus, and then writes the new firmware of the volatile memory to the first disk medium, the non-volatile memory, and the second disk medium in the described order so as to perform update.

3. The storage apparatus according to claim 1, characterized in that a recovery processing unit which operates by a background process is further provided; and
the recovery processing unit copies the firmware of the first disk medium to the second disk medium when the start-up processing unit performs start-up by the first start-up mode, and copies the firmware of the second disk medium to the first disk medium when the start-up processing unit performs start-up by the second start-up mode.

4. The storage apparatus according to claim 3, characterized in that the recovery processing unit further copies the firmware of the first disk medium to the second disk medium when the start-up processing unit performs start-up by the third start-up mode, and copies the firmware of the second disk medium to the first disk medium when the start-up processing unit performs start-up by the fourth start-up mode.

5. The storage apparatus according to claim 1, characterized in that the start-up processing unit
confirms validity of the firmware stored in the non-volatile memory and determines normal or otherwise determines abnormality in the first to the fourth start-up modes;
determines normal when the firmware stored in the first disk medium and the second disk medium is readable, valid, and a version of the firmware is same as the firmware of the non-volatile memory or otherwise determines abnormality in the first or the second start-up mode; and
confirms that the firmware stored in the first disk medium and the second disk medium is readable and valid and determines normal, or otherwise determines abnormality in the third or fourth start-up mode.

6. The storage apparatus according to claim 2, characterized in that the firmware update processing unit
writes the new firmware stored in the buffer memory over and updates the old firmware allocated to the volatile memory, and then starts up the apparatus so as to switch to a process of the new firmware;
notifies the upper-level apparatus of update completion by executing the new firmware after the switch; and
writes the new firmware of the volatile memory to the first disk medium, the non-volatile memory, and the second disk medium in the described order by a background process so as to perform update.

7. A control method of a storage apparatus characterized by including
a firmware storage processing step in which firmware, which is drive control software which records/reproduces data to or from a disk medium, is separately stored in a non-volatile memory, in which a start-up code and a restoration code are stored, and a first disk medium, a copy of the firmware, which is stored in the non-volatile memory, is stored in the first disk medium, and a copy of the entire firmware, which is stored in the first disk medium, is stored in a second disk medium; and
a start-up processing step in which, upon power-on, any of a first start-up mode in which the firmware of the non-volatile memory and the first disk medium is read and allocated to a volatile memory so as to perform start-up based on the start-up code when the non-volatile memory is normal, a second start-up mode in which the firmware of the non-volatile memory and the second disk medium is read and allocated to the volatile memory so as to perform start-up when the first disk medium is abnormal in the first start-up mode, a third start-up mode in which the entire firmware is read and allocated from the first disk medium to the volatile memory so as to perform start-up based on the restoration code when the non-volatile memory is abnormal, and a fourth start-up mode in which the entire firmware is read and allocated from the second disk medium to the volatile memory so as to perform start-up when the first disk medium is abnormal in the third start-up mode is executed.

8. The control method of the storage apparatus according to claim 7, characterized by including a firmware update processing step in which old firmware, which is allocated to the volatile memory, is switched to new firmware transferred from an upper-level apparatus and the new firmware is executed when an update request of the firmware is received from the upper-level apparatus, and then the new firmware of the volatile memory is written to the first disk medium, the non-volatile memory, and the second disk medium in the described order so as to perform update.

9. The control method of the storage apparatus according to claim 7, characterized in that, a recovery processing step which operates by a background process is further provided; and,
in the recovery processing step, the firmware of the first disk medium is copied to the second disk medium when the start-up processing step performs start-up by the first start-up mode, and the firmware of the second disk medium is copied to the first disk medium when the start-up processing step performs start-up by the second start-up mode.

10. The control method of the storage apparatus according to claim 9, characterized in that, in the recovery processing step, furthermore, the firmware of the first disk medium is copied to the second disk medium when the start-up processing step performs start-up by the third start-up mode, and the firmware of the second disk medium is copied to the first disk medium when the start-up processing step performs start-up by the fourth start-up mode.

11. The control method of the storage apparatus according to claim 8, characterized in that, in the firmware update processing step,
the new firmware stored in the buffer memory is written over to update the old firmware allocated to the volatile memory, and then the apparatus is started up so as to switch to a process of the new firmware;
the upper-level apparatus is notified of update completion by executing the new firmware after the switch; and
the new firmware of the volatile memory is written to the first disk medium, the non-volatile memory, and the second disk medium in the described order by a background process so as to perform update.

12. A control device of a storage apparatus characterized by having
a firmware storage processing unit which stores firmware, which is drive control software which records/reproduces data to or from a disk medium, separately in a non-volatile memory, in which a start-up code and a restoration code are stored, and a first disk medium, stores a copy of the firmware, which is stored in the non-volatile memory, in the first disk medium, and stores a copy of the entire firmware, which is stored in the first disk medium, in a second disk medium; and
a start-up processing unit which executes, upon power-on, any of a first start-up mode in which the firmware of the non-volatile memory and the first disk medium is read and allocated to a volatile memory so as to perform start-up based on the start-up code when the non-volatile memory is normal, a second start-up mode in which the firmware of the non-volatile memory and the second disk medium is read and allocated to the volatile memory so as to perform start-up when the first disk medium is abnormal in the first start-up mode, a third start-up mode in which the entire firmware is read and allocated from the first disk medium to the volatile memory so as to perform start-up based on the restoration code when the non-volatile memory is abnormal, and a fourth start-up mode in which the entire firmware is read and allocated from the second disk medium to the volatile memory so as to perform start-up when the first disk medium is abnormal in the third start-up mode.

13. The control device of the storage apparatus according to claim 12, characterized by having a firmware update processing unit which switches old firmware, which is allocated to the volatile memory, to new firmware transferred from an upper-level apparatus and executes the new firmware when an update request of the firmware is received from the upper-level apparatus, and then writes the new firmware of the volatile memory to the first disk medium, the non-volatile memory, and the second disk medium in the described order so as to perform update.

14. The control device of the storage apparatus according to claim 12, characterized in that a recovery processing unit which operates by a background process is further provided; and
the recovery processing unit copies the firmware of the first disk medium to the second disk medium when the start-up processing unit performs start-up by the first start-up mode, and copies the firmware of the second disk medium to the first disk medium when the start-up processing unit performs start-up by the second start-up mode.

15. The control device of the storage apparatus according to claim 13, characterized in that the recovery processing unit further copies the firmware of the first disk medium to the second disk medium when the start-up processing unit performs start-up by the third start-up mode, and copies the firmware of the second disk medium to the first disk medium when the start-up processing unit performs start-up by the fourth start-up mode.

16. The control device of the storage apparatus according to claim 13, characterized in that the start-up processing unit
confirms validity of the firmware stored in the non-volatile memory and determines normal or otherwise determines abnormality in the first to the fourth start-up modes;
determines normal when the firmware stored in the first disk medium and the second disk medium is readable, valid, and a version of the firmware is same as the firmware of the non-volatile memory or otherwise determines abnormality in the first or the second start-up mode; and
confirms that the firmware stored in the first disk medium and the second disk medium is readable and valid and determines normal, or otherwise determines abnormality in the third or fourth start-up mode.

17. The control device of the storage apparatus according to claim 13, characterized in that the firmware update processing unit
writes the new firmware stored in the buffer memory over and updates the old firmware allocated to the volatile memory, and then starts up the apparatus so as to switch to a process of the new firmware;
notifies the upper-level apparatus of update completion by executing the new firmware after the switch; and
writes the new firmware of the volatile memory to the first disk medium, the non-volatile memory, and the second disk medium in the described order by a background process so as to perform update.

18. The storage apparatus according to claim 1, characterized in that a recovery processing unit which operates by a background process is further provided; and
the recovery processing unit
copies the firmware of the first disk medium to the second disk medium and a third disk medium when the start-up processing unit performs start-up by the first start-up mode,
copies the firmware of the second disk medium to the third disk medium and the first disk medium when the start-up processing unit performs start-up by the second start-up mode, and
copies the firmware of the third disk medium to the first disk medium and the second disk medium when the start-up processing unit performs start-up by the third start-up mode.

19. A storage apparatus characterized by having
a firmware storage processing unit which stores firmware, which is drive control software which records/reproduces data to or from a disk medium, separately in a non-volatile memory, in which a start-up code and a restoration code are stored, and a disk medium, and stores a copy of the firmware, which is stored in the non-volatile memory, in the disk medium;

a start-up processing unit which executes, upon power-on, either a first start-up mode in which the firmware of the non-volatile memory and the disk medium is read and allocated to a volatile memory so as to perform start-up based on the start-up code when the non-volatile memory is normal, or a second start-up mode in which the entire firmware is read from the disk medium and allocated to the volatile memory based on the restoration code so as to perform start-up when the non-volatile memory is abnormal in the first start-up mode; and a firmware updating unit which, when an update request of the firmware is received from an upper-level apparatus, writes new firmware stored in a buffer memory to the disk medium so as to perform update, then destroys old firmware of the non-volatile memory, switches old firmware, which is allocated to the volatile memory, to the new firmware so as to execute the new firmware, then notifies the upper-level apparatus of update termination, and then writes the new firmware of the volatile memory to the non-volatile memory by a background process so as to perform update.

20. A storage apparatus characterized by having a firmware storage processing unit which stores firmware, which is drive control software which records/reproduces data to or from a disk medium, separately in a non-volatile memory, in which a start-up code and a restoration code are stored, and a first disk medium, stores a copy of the firmware, which is stored in the non-volatile memory, in the first disk medium, and stores a copy of the entire firmware, which is stored in the first disk medium, in a second disk medium;

a start-up processing unit which executes, upon power-on, any of a first start-up mode in which the firmware of the non-volatile memory and the disk medium is read and allocated to a volatile memory so as to perform start-up based on the start-up code when the non-volatile memory is normal, a second start-up mode in which the firmware of the non-volatile memory and the second disk medium is read and allocated to the volatile memory so as to perform start-up when the first disk medium is abnormal in the first start-up mode, a third start-up mode in which the entire firmware is read and allocated from the first disk medium to the volatile memory so as to perform start-up based on the restoration code when the non-volatile memory is abnormal in the first start-up mode, and a fourth start-up mode in which the entire firmware is read and allocated from the second disk medium to the volatile memory so as to perform start-up when the first disk medium is abnormal in the third start-up mode; and a firmware updating unit which, when an update request of the firmware is received from an upper-level apparatus, writes new firmware stored in a buffer memory to the first disk medium so as to perform update, then destroys old firmware of the non-volatile memory, switches old firmware, which is allocated to the first disk medium, to the new firmware so as to execute the new firmware, then notifies the upper-level apparatus of update termination, and then writes the new firmware of the volatile memory sequentially to the non-volatile memory and then the second disk medium by a background process so as to perform update.

21. A storage method characterized by including a firmware storage processing step in which firmware, which is drive control software which records/reproduces data to or from a disk medium, is stored separately in a non-volatile memory, in which a start-up code and a restoration code are stored, and a disk medium, and a copy of the firmware, which is stored in the non-volatile memory, is stored in the disk medium;

a start-up processing step in which, upon power-on, a first start-up mode in which the firmware of the non-volatile memory and the disk medium is read and allocated to a volatile memory so as to perform start-up based on the start-up code is executed when the non-volatile memory is normal, or a second start-up mode in which the entire firmware is read from the disk medium and allocated to the volatile memory based on the restoration code so as to perform start-up is executed when the non-volatile memory is abnormal in the first start-up mode; and a firmware updating step in which, when an update request of the firmware is received from an upper-level apparatus, new firmware stored in a buffer memory is written to the disk medium so as to perform update, then old firmware of the non-volatile memory is destroyed, old firmware, which is allocated to the volatile memory, is switched to the new firmware so as to execute the new firmware, then the upper-level apparatus is notified of update termination, and then the new firmware of the volatile memory is written to the non-volatile memory by a background process so as to perform update.

22. A storage method characterized by including a firmware storage processing step in which firmware, which is drive control software which records/reproduces data to or from a disk medium, is stored separately in a non-volatile memory, in which a start-up code and a restoration code are stored, and a first disk medium, a copy of the firmware, which is stored in the non-volatile memory, is stored in the first disk medium, and a copy of the entire firmware, which is stored in the first disk medium, is stored in a second disk medium;

a start-up processing step in which, upon power-on, any of a first start-up mode in which the firmware of the non-volatile memory and the disk medium is read and allocated to a volatile memory so as to perform start-up based on the start-up code when the non-volatile memory is normal, a second start-up mode in which the firmware of the non-volatile memory and the second disk medium is read and allocated to the volatile memory so as to perform start-up when the first disk medium is abnormal in the first start-up mode, a third start-up mode in which the entire firmware is read and allocated from the first disk medium to the volatile memory so as to perform start-up based on the restoration code when the non-volatile memory is abnormal in the first start-up mode, and a fourth start-up mode in which the entire firmware is read and allocated from the second disk medium to the volatile memory so as to perform start-up when the first disk medium is abnormal in the third start-up mode is executed; and a firmware updating step in which, when an update request of the firmware is received from an upper-level apparatus, new firmware stored in a buffer memory is written to the first disk medium so as to perform update, then old firmware of the non-volatile memory is destroyed, old firmware, which is allocated to the volatile memory, is switched to the new firmware so as to execute the new firmware, then the upper-level apparatus is notified of update termination, and then the new firmware of the first disk medium is written sequentially to the non-volatile memory and then the second disk medium by a background process so as to perform update.

23. A control device of a storage apparatus characterized by including a firmware storage processing step in which firmware, which is drive control software which records/reproduces data to or from a disk medium, is stored separately in a non-volatile memory, in which a start-up code and a restoration code are stored, and a disk medium, and a copy of the firmware, which is stored in the non-volatile memory, is stored in the disk medium;

a start-up processing step in which, upon power-on, a first start-up mode in which the firmware of the non-volatile memory and the disk medium is read and allocated to a volatile memory so as to perform start-up based on the start-up code is executed when the non-volatile memory is normal, or a second start-up mode in which the entire firmware is read from the disk medium and allocated to the volatile memory based on the restoration code so as to perform start-up is executed when the non-volatile memory is abnormal in the first start-up mode; and a firmware updating step in which, when an update request of the firmware is received from an upper-level apparatus, new firmware stored in a buffer memory is written to the disk medium so as to perform update, then old firmware of the non-volatile memory is destroyed, old firmware, which is allocated to the volatile memory, is switched to the new firmware so as to execute the new firmware, then the upper-level apparatus is notified of update termination, and then the new firmware of the volatile memory is written to the non-volatile memory by a background process so as to perform update.

24. A control device of a storage apparatus characterized by including a firmware storage processing step in which firmware, which is drive control software which records/reproduces data to or from a disk medium, is stored separately in a non-volatile memory, in which a start-up code and a restoration code are stored, and a first disk medium, a copy of the firmware, which is stored in the non-volatile memory, is stored in the first disk medium, and a copy of the entire firmware, which is stored in the first disk medium, is stored in a second disk medium;

a start-up processing step in which, upon power-on, any of a first start-up mode in which the firmware of the non-volatile memory and the disk medium is read and allocated to a volatile memory so as to perform start-up based on the start-up code when the non-volatile memory is normal, a second start-up mode in which the firmware of the non-volatile memory and the second disk medium is read and allocated to the volatile memory so as to perform start-up when the first disk medium is abnormal in the first start-up mode, a third start-up mode in which the entire firmware is read and allocated from the first disk medium to the volatile memory so as to perform start-up based on the restoration code when the non-volatile memory is abnormal in the first start-up mode, and a fourth start-up mode in which the entire firmware is read and allocated from the second disk medium to the volatile memory so as to perform start-up when the first disk medium is abnormal in the third start-up mode is executed; and a firmware updating step in which, when an update request of the firmware is received from an upper-level apparatus, new firmware stored in a buffer memory is written to the first disk medium so as to perform update, then old firmware of the non-volatile memory is destroyed, old firmware, which is allocated to the volatile memory, is switched to the new firmware so as to execute the new firmware, then the upper-level apparatus is notified of update termination, and then the new firmware of the volatile memory or the first disk medium is written sequentially to the non-volatile memory and then the second disk medium by a background process so as to perform update.

* * * * *